US010237688B2

United States Patent
Smith

(10) Patent No.: US 10,237,688 B2
(45) Date of Patent: Mar. 19, 2019

(54) METHOD AND SYSTEM FOR IMPROVING THE LOCATION OF FIXED WIRELESS CBSD NODES

(71) Applicant: Rivada Research, LLC, Colorado Springs, CO (US)

(72) Inventor: Clint Smith, Warwick, NY (US)

(73) Assignee: RIVADA RESEARCH, LLC, Colorado Springs, CO (US)

( * ) Notice: Subject to any disclaimer, the term of this patent is extended or adjusted under 35 U.S.C. 154(b) by 0 days.

(21) Appl. No.: 15/455,092

(22) Filed: Mar. 9, 2017

(65) Prior Publication Data

US 2017/0180938 A1    Jun. 22, 2017

Related U.S. Application Data

(63) Continuation-in-part of application No. 15/431,274, filed on Feb. 13, 2017, which is a continuation of
(Continued)

(51) Int. Cl.
*H04M 7/00* (2006.01)
*H04W 4/02* (2018.01)
(Continued)

(52) U.S. Cl.
CPC ......... *H04W 4/023* (2013.01); *G01C 21/165* (2013.01); *G01S 5/0072* (2013.01); *G01S 5/0263* (2013.01);
(Continued)

(58) Field of Classification Search
CPC .... G01S 5/0263; G01S 5/0289; G01S 5/0072; G01S 5/0284; G01S 5/0294; H04W 4/02;
(Continued)

(56) References Cited

U.S. PATENT DOCUMENTS 6,397,147 B1   5/2002   Whitehead
7,224,984 B2   5/2007   Argwala et al.
(Continued)

FOREIGN PATENT DOCUMENTS

CN    1688892 A    10/2005
CN   101305567 A   11/2008
(Continued)

OTHER PUBLICATIONS

Notification of Transmittal of the International Search Report and the Written Opinion of the International Searching Authority, or the Declaration issued for International Application No. PCT/US2017/021739 dated Jun. 21, 2017.
(Continued)

*Primary Examiner* — Nhan T Le
(74) *Attorney, Agent, or Firm* — The Marbury Law Group, PLLC

(57) ABSTRACT

Methods, systems and devices for determining a more precise location of a fixed wireless device and providing an enhanced location based service (eLBS). A fixed wireless device may be configured to determine its approximate location (e.g., a current location waypoint, etc.), communicate with other fixed or mobile wireless devices to receive location information, and determine a more precise location of the fixed wireless device based on the approximate location and the received location information. The fixed wireless device may use the computed location information to provide a location based service and/or send the more precise location to another wireless device for use in providing a location based service.

39 Claims, 56 Drawing Sheets

Related U.S. Application Data application No. 15/083,760, filed on Mar. 29, 2016, now Pat. No. 9,609,616, which is a continuation of application No. 14/823,244, filed on Aug. 11, 2015, now Pat. No. 9,332,386, which is a continuation of application No. 14/293,056, filed on Jun. 2, 2014, now Pat. No. 9,232,354, which is a continuation of application No. 13/585,125, filed on Aug. 14, 2012, now Pat. No. 8,787,944.

(60) Provisional application No. 62/306,797, filed on Mar. 11, 2016, provisional application No. 61/575,300, filed on Aug. 18, 2011, provisional application No. 61/573,636, filed on Sep. 9, 2011.

(51) Int. Cl.
| | |
|---|---|
| G01S 19/13 | (2010.01) |
| G01C 21/16 | (2006.01) |
| G01S 19/48 | (2010.01) |
| G01S 5/00 | (2006.01) |
| G01S 5/02 | (2010.01) |
| H04M 1/725 | (2006.01) |
| H04W 4/021 | (2018.01) |
| H04W 4/08 | (2009.01) |
| H04W 4/029 | (2018.01) |
| H04W 4/90 | (2018.01) |
| H04W 64/00 | (2009.01) |

(52) U.S. Cl.
CPC .......... *G01S 5/0284* (2013.01); *G01S 5/0289* (2013.01); *G01S 5/0294* (2013.01); *G01S 19/13* (2013.01); *G01S 19/48* (2013.01); *H04M 1/72538* (2013.01); *H04M 1/72572* (2013.01); *H04W 4/02* (2013.01); *H04W 4/021* (2013.01); *H04W 4/025* (2013.01); *H04W 4/026* (2013.01); *H04W 4/027* (2013.01); *H04W 4/029* (2018.02); *H04W 4/08* (2013.01); *H04W 4/90* (2018.02); *H04M 2250/10* (2013.01); *H04W 64/006* (2013.01)

(58) Field of Classification Search
CPC ....... H04W 4/90; H04W 4/023; H04W 4/025; H04W 4/029; H04W 4/021; H04W 4/026; H04W 4/027; H04W 64/006; H04W 4/08; H04M 1/72538; H04M 1/72572
See application file for complete search history.

(56) References Cited

U.S. PATENT DOCUMENTS

| | | | |
|---|---|---|---|
| 7,764,231 B1 | 7/2010 | Karr et al. | |
| 8,224,984 B2 | 7/2012 | Bloch et al. | |
| 8,359,643 B2 | 1/2013 | Low et al. | |
| 8,508,361 B2 | 8/2013 | Paolini | |
| 9,232,354 B2 | 1/2016 | Smith | |
| 9,332,386 B2 | 5/2016 | Smith | |
| 9,609,616 B2 | 3/2017 | Smith | |
| 2004/0008138 A1* | 1/2004 | Hockley, Jr. .......... | G01S 5/0072 342/357.48 |
| 2005/0221843 A1 | 10/2005 | Friedman et al. | |
| 2007/0049266 A1 | 3/2007 | Voss | |
| 2007/0049286 A1 | 3/2007 | Kim et al. | |
| 2007/0161380 A1 | 7/2007 | Fok et al. | |
| 2007/0232319 A1 | 10/2007 | Bells et al. | |
| 2007/0275730 A1 | 11/2007 | Bienas et al. | |
| 2008/0227462 A1 | 9/2008 | Freyman et al. | |
| 2008/0280624 A1* | 11/2008 | Wrappe ..................... | G01S 1/68 455/456.1 |
| 2009/0047973 A1 | 2/2009 | Macnaughtan et al. | |
| 2009/0079622 A1 | 3/2009 | Seshadri et al. | |
| 2009/0149202 A1 | 6/2009 | Hill et al. | |
| 2009/0209266 A1 | 8/2009 | Ha et al. | |
| 2010/0062792 A1 | 3/2010 | Han et al. | |
| 2011/0009130 A1 | 1/2011 | Wu | |
| 2011/0025494 A1 | 2/2011 | Adcook et al. | |
| 2011/0117934 A1 | 5/2011 | Mate | |
| 2011/0124347 A1 | 5/2011 | Chen et al. | |
| 2011/0151892 A1 | 6/2011 | Vengroff et al. | |
| 2011/0171973 A1 | 7/2011 | Beck et al. | |
| 2011/0227788 A1 | 9/2011 | Lundgren et al. | |
| 2011/0276556 A1 | 11/2011 | Meler et al. | |
| 2011/0288771 A1 | 11/2011 | Mazium et al. | |
| 2012/0052836 A1 | 3/2012 | Buratti et al. | |
| 2012/0286997 A1 | 11/2012 | Lin et al. | |
| 2012/0295636 A1 | 11/2012 | Drucker | |
| 2013/0030931 A1 | 1/2013 | Moshfeghi | |
| 2013/0063611 A1* | 3/2013 | Papakipos ............ | G06F 1/1686 348/207.11 |
| 2013/0231130 A1 | 9/2013 | Cherian et al. | |
| 2013/0281115 A1 | 10/2013 | Dupray et al. | |
| 2014/0080514 A1 | 3/2014 | Das et al. | |
| 2014/0273920 A1 | 9/2014 | Smith | |
| 2014/0368382 A1 | 12/2014 | Vartanian et al. | |
| 2015/0168561 A1 | 6/2015 | Vartanian et al. | |
| 2015/0382145 A1 | 12/2015 | Smith et al. | |

FOREIGN PATENT DOCUMENTS

| | | |
|---|---|---|
| CN | 101720058 A | 6/2010 |
| JP | 2005-331423 A | 12/2005 |
| JP | 2010-69910 A | 4/2010 |
| WO | 2004008171 A1 | 1/2004 |
| WO | 2011/037214 A1 | 3/2011 |
| WO | 2013-025824 A1 | 2/2013 |

OTHER PUBLICATIONS

Notification of Transmittal of the International Search Report and the Written Opinion of the International Search Authority issued for International Application No. PCT/US2016/036231 dated Sep. 21, 2016.

Chinese Office Action Decision of Rejection for Chinese Application No. 201280050710.4 entitled "Method and System for Providing Enhanced Location Based Information for Wireless Handsets"; dated May 5, 2016.

PCT Notification of Transmittal of the International Search Report and the Written Opinion of the International Searching Authority, issued for International Application No. PCT/US2016/028240 dated Jul. 26, 2016.

First Office Action issued by State Intellectual Property Office for Chinese Application No. 201280050710.4 dated Oct. 31, 2014.

Mexican Office Action issued by the Mexican Patent Office for Mexican Application No. MX/a/2014/001745 dated May 19, 2015.

Japanese Office Action issued by the Japanese Patent Office for Japanese Application No. 2014-526179 dated May 12, 2015 corresponding to PCT/US2012/050981.

Russian Office Action issued by the Russian Patent Office for Russian Application No. 201409421/07(014916) dated May 16, 2015 corresponding to PCT/US2012/050981.

Chinese Office Action issued by the Chinese Patent Office for Chinese Application No. 201280050710.4 dated Mar. 20, 2015.

Communication Pursuant to Rules 70(1) and 70a(2) EPC issued by the European Patent Office for European Application No. 12824068. 6-1812 dated Mar. 5, 2015.

Extended European Search Report issued by the European Patent Office for European Application on 12824068.6-1815 dated Feb. 16, 2015.

International Search Report and Written Opinion issued in PCT Application No. PCT/US2012/050981 dated Jan. 29, 2013.

International Preliminary Report on Patentability and Written Opinion for PCT/US2012/050981 dated Feb. 18, 2014.

Zyren, "Overview of the 3GPP Long Term Evolution Physical Layer", Freescale Semiconductor, 3GPPEVOLUTIONWPP, pp. 1-27, Jul. 2007.

(56) References Cited

OTHER PUBLICATIONS

Keithley, "OFDM.MIMO Master Cass Understanding the Physical Layer Principles of WPLAM, WiMAX and LTE", www.keithley.com, pp. 1-119, 2004.
Xiong et al., "SecureAngle: Improving Wireless Security Using Angle-of-Arrival Information", Hotnets, pp. 1-6, Oct. 20-21, 2010.
GPP, " 3rd Generation Partnership Project; Technical Specification Group Radio Access Network; Evolved Universal Radio Access Network (E-UTRAN); Stage 2 functional specification of User Equipment (UE) positioning in E-UTRAN (Release 9)", 3GPP TS 36.305, V9.3.0, pp. 1-52, Jun. 2010.
MultiService Forum, MSF Whitepaper on Location Services in LTE Networks, MultiService Forum, MSF-TR-SERVICES-005-FINAL, pp. 1-19, 2009.
"Comments of Motorola Mobility, Inc. and Motorola Soluctions, Inc." before the Federal Communications Commission, Washington, DC 20554, Matter of Wireless E911 Location Accuracy Requirements vs E911 Requirements for IP-Enabled Service Providers, pp. 1-20, Jan. 19, 2011.
3GPP, "3rd Generation Partnership Project; Technical Specification Group Core Network; Universal Geographical Area Description (GAD), Release 1999" 3G TS 23.032. V3.1.0 pp. 1-29, Mar. 2000.
3GPP, LTE: Evolved Universal Terrestrial Radio Access (E-UTRA); Physical Layer Procedures (3GPP TS 36.213 version 10.1.0 Release 10), ETSI TS 136 213 V10.1.0 p. 1-117, Apr. 2010.
3GPP,LTE NAS Signaling for Control Plane LCS in Evolved Packet System (EPS), (3gpp ts 24.171 version 9.0.0 Release 9) ETSI TS 124 171, V9.0.0, pp. 1-19, Apr. 2010.
International Preliminary Report on Patentability received in connection with International Application No. PCT/US2017/021739; dated Sep. 20, 2018.

\* cited by examiner

Multiple Layer
Antenna

METHOD AND SYSTEM FOR IMPROVING THE LOCATION OF FIXED WIRELESS CBSD NODES

RELATED APPLICATIONS

This application claims the benefit of priority to U.S. Provisional Application No. 62/306,797 entitled "Method and System for Improving the Location of Fixed Wireless CBSD Nodes" filed Mar. 11, 2016, and is a continuation in part of U.S. patent application Ser. No. 15/431,274, entitled "Method and System for Providing Enhanced Location Based Information for Wireless Handsets" filed Feb. 13, 2017, which is a continuation of U.S. patent application Ser. No. 15/083,760 entitled "Method and System for Providing Enhanced Location Based Information for Wireless Handsets" filed Mar. 30, 2016, which is a continuation of U.S. patent application Ser. No. 14/823,244 entitled "Method and System for Providing Enhanced Location Based Information for Wireless Handsets" filed Aug. 11, 2015, which is a continuation of U.S. patent application Ser. No. 14/293,056 entitled "Method and System for Providing Enhanced Location Based Information for Wireless Handsets" filed Jun. 2, 2014 and issued Jan. 5, 2016 as U.S. Pat. No. 9,232,354, which is a continuation of U.S. patent application Ser. No. 13/585,125 entitled "Method and System for Providing Enhanced Location Based Information for Wireless Handsets" filed Aug. 14, 2012 and issued Jul. 22, 2014 as U.S. Pat. No. 8,787,944, which claims the benefit of priority of U.S. Provisional Application No. 61/575,300, entitled "Method and System for Providing Enhanced Location Based Information for Wireless Handsets" filed Aug. 18, 2011, and U.S. Provisional Application No. 61/573,636, entitled "Method and System for Providing Enhanced Location Based Information for Wireless Handsets" filed Sep. 9, 2011, the entire contents of all of which are hereby incorporated by reference.

This application is also related to U.S. patent application Ser. No. 15/345,441, entitled "Method and System for Enhanced Location Based Information for Fixed Platforms" filed Nov. 7, 2016, U.S. patent application Ser. No. 15/434,024, entitled "Method and System for Performing Trilateration for Fixed Infrastructure Nodes (FIN) Based On Enhanced Location Based Information" filed Feb. 15, 2017, and U.S. patent application Ser. No. 15/434,017, entitled "Method and System for Performing Trilateration for Fixed Infrastructure Nodes (FIN) Based On Enhanced Location Based Information" filed Feb. 15, 2017, the entire contents of all of which are also hereby incorporated by reference for all purposes.

BACKGROUND

Wireless communication technologies and mobile electronic devices (e.g., cellular phones, tablets, laptops, etc.) have grown in popularity and use over the past several years. To keep pace with increased consumer demands, mobile electronic devices have become more powerful and feature rich, and now commonly include global positioning system (GPS) receivers, sensors, and many other components for connecting users to friends work, leisure activities and entertainment. However, despite these advancements, wireless devices remain lacking in their ability to provide effective location based services, information, or communications. As wireless devices and technologies continue to grow in popularity and use, generating enhanced location information for wireless devices is expected to become an important and challenging design criterion for wireless device manufactures and network engineers.

SUMMARY

The various aspects include methods of determining a more precise location of the fixed wireless device and providing an enhanced location based service (eLBS), including determining, via a processor in a fixed wireless device, an approximate location of the fixed wireless device, receiving, via the processor, location information from a wireless device, and determining a more precise location of the fixed wireless device based on the approximate location and the location information received from the wireless device. In an aspect, determining the more precise location of the fixed wireless device based on the approximate location and the location information received from the wireless device includes generating a longitude value, a latitude value, and an altitude value. In a further aspect, determining the more precise location of the wireless device based on the approximate location and the location information received from the fixed wireless device includes generating location information for each of a plurality of individual antennas in a distributed antenna system of the fixed wireless device. In a further aspect, receiving location information from the fixed wireless device includes receiving location information from another fixed wireless device.

In a further aspect, the wireless device is a mobile computing device, and the fixed wireless device is a citizen band service device. In a further aspect, the fixed wireless device is an eNodeB, small cell device, a femto cell device, or a beacon device that has GPS capabilities. In a further aspect, the fixed wireless device is an eNodeB, small cell device, a femto cell device, or a beacon device that does not have GPS capabilities. In a further aspect, the fixed wireless device includes a sensor hub, and determining the approximate location of the fixed wireless device includes determining the approximate location based on information received from the sensor hub. In a further aspect, the information received from sensor hub includes information collected from one or more of an accelerometer, a two-axis gyroscope, a three-axis compasses, altimeters, or barometers. In a further aspect, the fixed wireless device includes a distributed antenna, and the distributed antenna includes one or more sensor hubs.

In a further aspect, the method may include determining whether new location information is available, computing a variance estimate value that considers an accuracy of the more precise location in response to determining that new location information is available, and extrapolating the more precise location and increasing a variance value that considers the age of the location in response to determining new location information is not available. In a further aspect, determining whether new location information is available includes determining whether new dead reckoning location information is available, whether new GPS location information is available, whether new network-provided location information is available, and whether new trilateration location information is available. In a further aspect, the method may include determining via a processor of a fixed wireless device whether information obtained via a geospatial system of the fixed wireless device is accurate, collecting location information from a plurality of fixed wireless devices in a communication group in response to determining that the information obtained via the geospatial system of the fixed wireless device is not accurate, computing more precise location information for the fixed wireless device based on the location information collected from the plurality of fixed wireless devices, the more precise location information including three-dimensional location and position information, and using the generated location and position information to provide the location based service.

Further aspects include a fixed wireless device that includes a processor configured with processor-executable instructions to perform operations including determining an approximate location of the fixed wireless device, receiving location information from a wireless device, and determining a more precise location of the fixed wireless device based on the approximate location and the location information received from the wireless device. In an aspect, the processor may be configured with processor-executable instructions to perform operations such that determining the more precise location of the fixed wireless device based on the approximate location and the location information received from the wireless device includes generating a longitude value, a latitude value, and an altitude value. In a further aspect, the processor may be configured with processor-executable instructions to perform operations such that determining the more precise location of the wireless device based on the approximate location and the location information received from the fixed wireless device includes generating location information for each of a plurality of individual antennas in a distributed antenna system of the fixed wireless device.

In a further aspect, the processor may be configured with processor-executable instructions to perform operations such that receiving location information from the fixed wireless device includes receiving location information from another fixed wireless device. In a further aspect, the processor may be configured with processor-executable instructions to perform operations such that receiving the location information from the wireless device includes receiving in a citizen band service device location information from a mobile computing device. In a further aspect, the processor may be configured with processor-executable instructions to perform operations such that receiving the location information from the wireless device includes receiving in an eNodeB, small cell device, a femto cell device, or a beacon device that has GPS capabilities from the wireless device. In a further aspect, processor may be configured with processor-executable instructions to perform operations such that receiving the location information from the wireless device includes receiving the location information in an eNodeB, small cell device, a femto cell device, or a beacon device that does not have GPS capabilities from the wireless device. In a further aspect, including a sensor hub, in which the processor may be configured with processor-executable instructions to perform operations such that determining the approximate location of the fixed wireless device includes determining the approximate location based on information received from the sensor hub.

In a further aspect, the processor may be configured with processor-executable instructions to perform operations such that determining the approximate location based on information received from the sensor hub includes determining the approximate location based on information collected from one or more of an accelerometer, a two-axis gyroscope, a three-axis compasses, altimeters, or barometers. In a further aspect, including a distributed antenna coupled to the processor, in which the distributed antenna includes one or more sensor hubs. In a further aspect, the processor may be configured with processor-executable instructions to perform operations further including determining whether new location information is available, computing a variance estimate value that considers an accuracy of the more precise location in response to determining that new location information is available, and extrapolating the more precise location and increasing a variance value that considers the age of the location in response to determining new location information is not available. In a further aspect, the processor may be configured with processor-executable instructions to perform operations such that determining whether new location information is available includes determining whether new dead reckoning location information is available, whether new GPS location information is available, whether new network-provided location information is available, and whether new trilateration location information is available.

In a further aspect, the processor may be configured with processor-executable instructions to perform operations further including determining whether information obtained via a geospatial system of the fixed wireless device is accurate, collecting location information from a plurality of fixed wireless devices in a communication group in response to determining that the information obtained via the geospatial system of the fixed wireless device is not accurate, computing more precise location information for the fixed wireless device based on the location information collected from the plurality of fixed wireless devices, the more precise location information including three-dimensional location and position information, and using the generated location and position information to provide the location based service.

Further aspects include a non-transitory computer readable storage medium having stored thereon processor-executable software instructions configured to cause a processor in a fixed wireless device to perform operations that may include determining an approximate location of the fixed wireless device, receiving location information from a wireless device, and determining a more precise location of the fixed wireless device based on the approximate location and the location information received from the wireless device. In an aspect, the stored processor-executable instructions may be configured to cause a processor to perform operations such that determining the more precise location of the fixed wireless device based on the approximate location and the location information received from the wireless device includes generating a longitude value, a latitude value, and an altitude value. In a further aspect, the stored processor-executable instructions may be configured to cause a processor to perform operations such that determining the more precise location of the wireless device based on the approximate location and the location information received from the fixed wireless device includes generating location information for each of a plurality of individual antennas in a distributed antenna system of the fixed wireless device.

In a further aspect, the stored processor-executable instructions may be configured to cause a processor to perform operations such that receiving location information from the fixed wireless device includes receiving location information from another fixed wireless device. In a further aspect, the stored processor-executable instructions may be configured to cause a processor to perform operations such that receiving the location information from the wireless device includes receiving in a citizen band service device location information from a mobile computing device. In a further aspect, the stored processor-executable instructions may be configured to cause a processor to perform operations such that receiving the location information from the wireless device includes receiving in an eNodeB, small cell device, a femto cell device, or a beacon device that has GPS capabilities from the wireless device.

In a further aspect, the stored processor-executable instructions may be configured to cause a processor to perform operations such that receiving the location information from the wireless device includes receiving the location information in an eNodeB, small cell device, a femto cell device, or a beacon device that does not have GPS capabilities from the wireless device. In a further aspect, the fixed wireless device includes a sensor hub, and the stored processor-executable instructions may be configured to cause a processor to perform operations such that determining the approximate location of the fixed wireless device includes determining the approximate location based on information received from the sensor hub. In a further aspect, the stored processor-executable instructions may be configured to cause a processor to perform operations such that determining the approximate location based on information received from the sensor hub includes determining the approximate location based on information collected from one or more of an accelerometer, a two-axis gyroscope, a three-axis compasses, altimeters, or barometers.

In a further aspect, the fixed wireless device includes a distributed antenna, the distributed antenna includes one or more sensor hubs, and the stored processor-executable instructions may be configured to cause a processor to perform operations such that determining the approximate location of the fixed wireless device includes determining the approximate location based on information received from the one or more sensor hubs. In a further aspect, the stored processor-executable instructions may be configured to cause a processor to perform operations further including determining whether new location information is available, computing a variance estimate value that considers an accuracy of the more precise location in response to determining that new location information is available, and extrapolating the more precise location and increasing a variance value that considers the age of the location in response to determining new location information is not available.

In a further aspect, the stored processor-executable instructions may be configured to cause a processor to perform operations such that determining whether new location information is available includes determining whether new dead reckoning location information is available, whether new GPS location information is available, whether new network-provided location information is available, and whether new trilateration location information is available. In a further aspect, the stored processor-executable instructions may be configured to cause a processor to perform operations further including determining whether information obtained via a geospatial system of the fixed wireless device is accurate, collecting location information from a plurality of fixed wireless devices in a communication group in response to determining that the information obtained via the geospatial system of the fixed wireless device is not accurate, computing more precise location information for the fixed wireless device based on the location information collected from the plurality of fixed wireless devices, the more precise location information including three-dimensional location and position information, and using the generated location and position information to provide the location based service.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1:
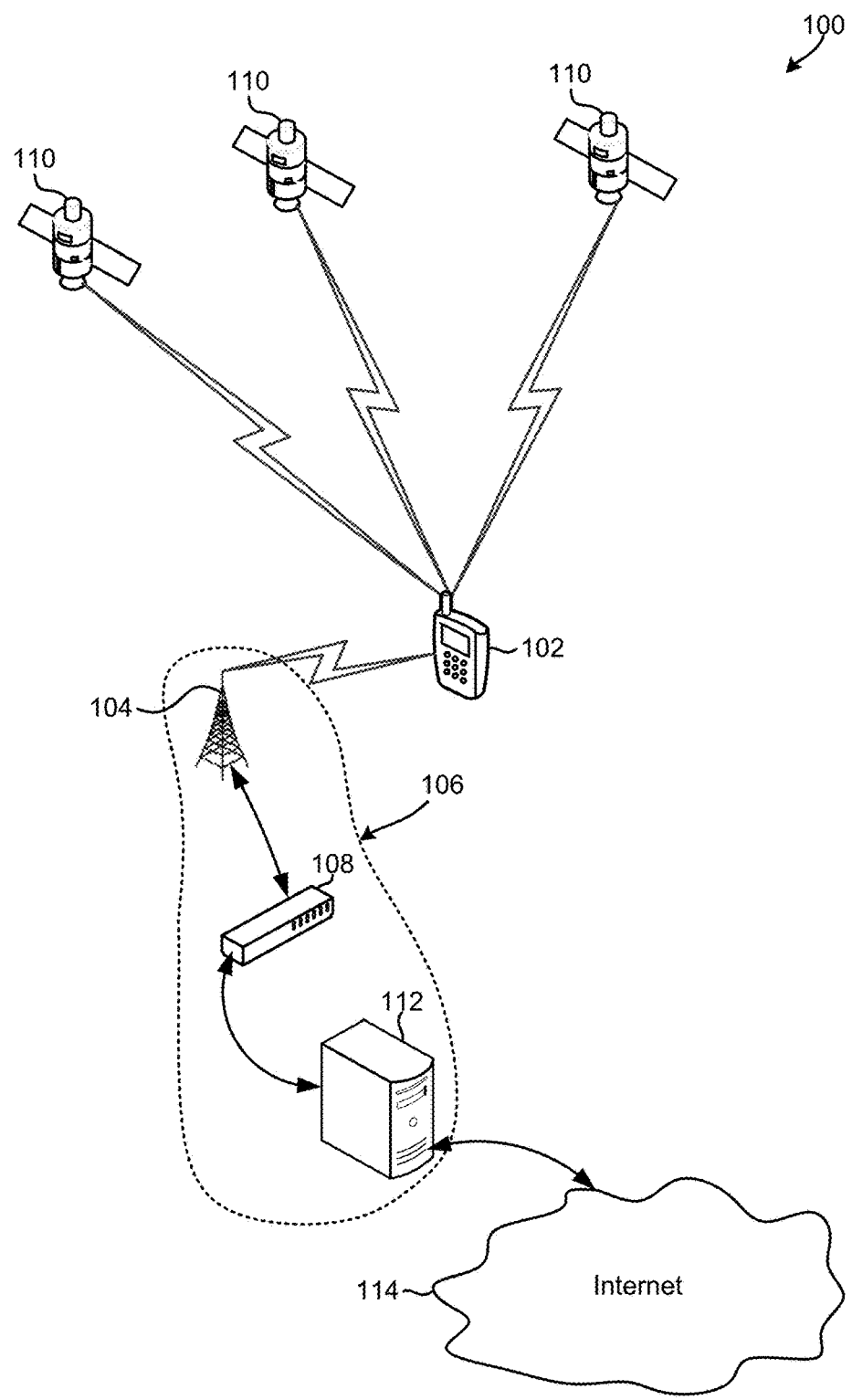
FIG. 1 is a communication system block diagram illustrating network components of an example telecommunication system suitable for use in a mobile-device centric approach for determining the location of a wireless device in accordance with various embodiments.

The various embodiments are described in detail with reference to the accompanying drawings. Wherever possible, the same reference numbers are used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "wireless device," "mobile device," "cellular telephone," and "cell phone" may be used interchangeably herein to refer to any one or all of cellular telephones, smartphones, personal data assistants (PDA's), laptop computers, tablet computers, ultrabooks, palm-top computers, wireless electronic mail receivers, multimedia Internet enabled cellular telephones, wireless gaming controllers, and similar personal electronic devices which include a programmable processor, a memory and circuitry for sending and/or receiving wireless communication signals. While the various embodiments are particularly useful in wireless devices, such as cellular telephones, which have limited battery life, the embodiments are generally useful in any computing device that may be used to wirelessly communicate information.

The terms "wireless network", "network", "cellular system", "cell tower" and "radio access point" may be used generically and interchangeably to refer to any one of various wireless mobile systems. In an embodiment, wireless network may be a radio access point (e.g., a cell tower), which provides the radio link to the wireless device so that the wireless device can communicate with the core network.

The term "fixed wireless device" is used herein to refer to any wireless device, component, or system designed for use in a fixed location. Examples of fixed wireless devices may include wireless fixed infrastructure nodes (FINs) and wireless fixed infrastructure devices (FIDs), such as femtocells, small cells, WiFi access nodes, Bluetooth™ beacons, antennas attached to masts or buildings, fixed appliances, and other such devices.

Location information may include any one or more of latitude, longitude, altitude, velocity, GPS data, and/or GPS timing information for a device. Coordinates and measurements may be relative between the providing device and the receiving device, or they may be based upon a grid or other coordinate system. The devices may be a mobile device and/or a fixed infrastructure device.

The term enhanced location based services (eLBS) may include enhanced location based operations, and operations which improve upon the location based services (LBS) provided by generic network which include a two-dimensional location. Generally, eLBS include a longitude, latitude, and altitude measurements. These may be expressed in various formats.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), public switched telephone network (PSTN), Wi-Fi Protected Access I & II (WPA, WPA2), Bluetooth®, integrated digital enhanced network (iden), and land mobile radio (LMR). Each of these technologies involves, for example, the transmission and reception of voice, data, signaling and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

A number of different methods, technologies, solutions, and/or techniques (herein collectively "solutions") are currently available for determining the location of wireless device, any or all of which may be implemented by, included in, and/or used by the various embodiments. Such solutions include, e.g., global positioning system (GPS) based solutions, assisted GPS (A-GPS) solutions, and cell-based positioning solutions such as cell of origin (COO), time of arrival (TOA), observed time difference of arrival (OT-DOA), augmentation of a global navigation satellite system (A-GNSS), advanced forward link trilateration (AFLT), and angle of arrival (AOA). In various embodiments, such solutions may implemented in conjunction with one or more wireless communication technologies and/or networks, including wireless wide area networks (WWANs), wireless local area networks (WLANs), wireless personal area networks (WPANs), and other similar networks or technologies. By way of example, a WWAN may be a Code Division Multiple Access (CDMA) network, a Frequency Division Multiple Access (FDMA) network, an OFDMA network, a 3GPP LTE network, a WiMAX (IEEE 802.16) network, and so on. The WPAN may be a Bluetooth network, an IEEE 802.15x network, and so on. A WLAN may be an IEEE 802.11x network, and so on. A CDMA network may implement one or more radio access technologies (RATs) such as CDMA2000, Wideband-CDMA (W-CDMA), and so on.

Various embodiments discussed herein may generate, compute, and/or make use of location information pertaining to one or more wireless devices. Such location information may be useful for providing and/or implementing a variety of location-based services, including emergency location services, commercial location services, internal location services, and lawful intercept location services. By way of example: emergency location services may include services relating to the provision of location and/or identification information to emergency service personal and/or emergency systems (e.g., to 911 system); commercial location services may include any general or value-added service (e.g., asset tracking services, navigation services, location-based advertising services, etc.); internal location services may include services pertaining to the management of the wireless service provider network (e.g., radio resource management services, message delivery services, paging services, call delivery services, services for providing position/location network enhancements, etc.); and lawful intercept location services may include any service that provides public safety and/or law enforcement agencies with identification and/or location information pertaining to a wireless device or a wireless device user. While the various embodiments are particularly useful in applications that fall within one or more of the categories/types of location based services discussed above, the embodiments are generally useful in any application or service that benefits from location information.

Modern mobile electronic devices (e.g., mobile phones) typically include one or more geospatial positioning systems/components for determining the geographic location of the wireless device. Location information obtained by these geospatial systems may be used by location-aware mobile software applications (e.g., Google® Maps, Yelp®, "Find my Friends" on Apple®, etc.) to provide users with information regarding the wireless device's physical location at a given point in time. In recent years, such location-based services and software applications have increased in popularity, and now enable wireless device users to navigate cities, read reviews of nearby restaurants and services, track assets or friends, obtain location-based safety advice, and/or take advantage of many other location-based services on their wireless devices.

Consumers of modern wireless devices now demand more advanced, robust, and feature-rich location-based services than that which is currently available on their wireless devices. However, despite many recent advances in mobile and wireless technologies, wireless devices remain lacking in their ability to provide their users/consumers with location based services that are accurate or powerful enough to meet the demands of these consumers. For example, while existing location-aware mobile software applications (e.g., "Find my Friends" on Apple®, etc.) enable a wireless device user to view the approximate geographical position of other wireless devices on a two-dimensional map, they lack the capability to accurately, efficiently and consistently pin point the precise location and/or position of the other wireless devices in all three dimensions and/or within a wireless communication network. The various embodiments overcome these and other limitations of existing solutions by collecting information from multiple wireless devices, generated more precise location information on or about one or more wireless devices, generating advanced three-dimensional location and position information on or about one or more wireless devices, and using the generated location/position information to provide wireless device users with more accurate, more powerful, and more reliable location based services.

One of the challenges associated with using geo-spatial positioning technology on a wireless device is that the wireless device's ability to acquire satellite signals and navigation data to calculate its geospatial location (called "performing a fix") may be hindered when the wireless device is indoors, below grade, and/or when the satellites are obstructed (e.g., by tall buildings, etc.). The presence of physical obstacles, such as metal beams or walls, may cause multipath interference and signal degradation of the wireless communication signals when the wireless device is indoors or in urban environments that include tall buildings or skyscrapers. In rural environments, the wireless device may not have sufficient access to satellite communications (e.g., to a global positioning system satellite) to effectively ascertain the wireless device's current location. These and other factors often cause existing geo-spatial technologies to function inaccurately and/or inconsistently on wireless devices, and hinder the wireless device user's ability to fully utilize location-aware mobile software applications and/or other location based services and applications on his/her wireless device.

Another problem with using existing geo-spatial positioning technologies is that position accuracy afforded by existing technologies is not sufficient for use in emergency services due to the relatively high level of position accuracy required by these services.

The various embodiments include improved location determination solutions that determine the location of a wireless device at the level of position accuracy which is suitable for use in emergency location services, commercial location services, internal location services, and lawful intercept location services.

Generally, there are three basic approaches for determining the location of wireless devices in a communication network: a mobile-device centric approach, a network centric approach and a hybrid approach that may include aspects of both the wireless device centric approach and the network centric approach.

FIG. 1 illustrates an example communication system 100 suitable for implementing a mobile-device centric approach for determining the location of a wireless device 102 in accordance with various embodiments. The wireless device 102 may include a global positioning system (GPS) receiver in communication with multiple geo-spatial positioning and navigation satellites 110 and a base tower 104 of a communication network 106. The wireless device 102 may receive (e.g., via the GPS receiver) radio signals emitted by the navigation satellites 110, measure the time required for the signals to reach the wireless device 102, and use trilateration techniques to determine the geographical coordinates (e.g., latitude and longitude coordinates) of the wireless device 102. The wireless device 102 may send the geographical coordinates to the communication network 106 at various times and/or in response to various conditions or events, such as upon initial acquisition with the communication network 106, in response to network-based requests, in response to third party requests, etc.

In an embodiment, the communication network may be a cellular telephone network. A typical cellular telephone network includes a plurality of cellular base stations/base towers 104 coupled to a network operations center 108, which operates to connect voice and data calls between wireless devices 102 (e.g., mobile phones) and other network destinations, such as via telephone land lines (e.g., a POTS network, not shown) and the Internet 114. Communications between the wireless devices 102 and the cellular telephone network may be accomplished via two-way wireless communication links, such as 4G, 3G, CDMA, TDMA, and other cellular telephone communication technologies. The communication network 106 may also include one or more servers 112 coupled to or within the network operations center 108 that provide connections to the Internet 114.

In various embodiments, the wireless device 102 may be configured to communicate with a radio access node, which can include any wireless base station or radio access point such as LTE, CDMA2000/EVDO, WCDMA/HSPA, IS-136, GSM, WiMax, WiFi, AMPS, DECT, TD-SCDMA, or TD-CDMA and switch, Land Mobile Radio (LMR) interoperability equipment, a satellite Fixed Service Satellite (FSS) for remote interconnection to the Internet and PSTN.

Figure 2:
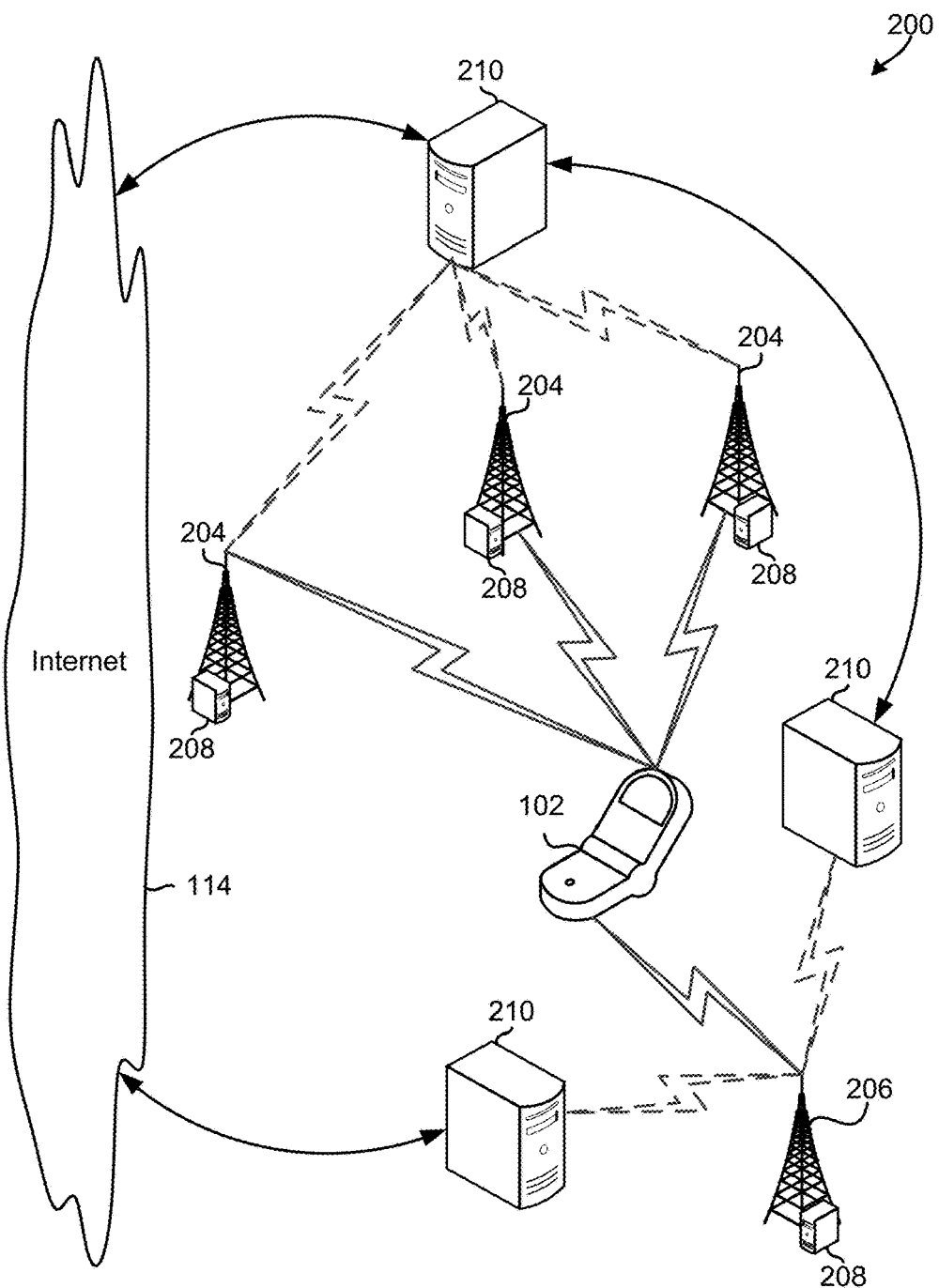
FIG. 2 is a communication system block diagram illustrating network components of an example telecommunication system suitable for use in a network centric approach for determining the location of a wireless device in accordance with various embodiments.

FIG. 2 illustrates an example communication system 200 suitable for implementing a network centric approach for determining the location of a wireless device 102 in accordance with various embodiments. The wireless device 102 may include a circuitry for wirelessly sending and receiving radio signals. The communication system 200 may include a plurality of radio access points 204, 206 having installed thereon additional radio equipment 208 for measuring the location of the wireless devices in the communication system. For example, the wireless device 102 may transmit radio signals for reception by one or more (e.g., typically three) radio access points 204, and the radio access points may receive the transmitted signals and measure the signal strength and/or radio energy of the received signals to identify the location of the wireless device 102.

In an embodiment, the radio access points 204 may be configured to determine the location of the wireless device relative to a known location of a network component, such as the illustrated radio access point 206. In this manner, the additional radio equipment 208 installed on the radio access points 204, 206 provides the communication system 200 with similar functionality as is provided by a GPS receiver for signals received from the wireless device. For example, the radio equipment on one or more of the radio access points 204 may measure how long it takes for the radio signal to travel from the wireless device 102 to another radio access point 206, and using trilateration techniques (e.g., time of arrival, angle of arrival, or a combination thereof), the wireless device 102 or a network server 210 may estimate the location of the wireless device 102 to within an accuracy of 100 to 300 meters. Once the network has estimated the latitude and longitude coordinates of the wireless device 102, this information can be used to determine the geo-spatial location of the wireless device 102, which may be communicated to other systems, servers or components via the Internet 114.

Various embodiments may implement and/or make use of a hybrid approach for determining the location of wireless devices in a communication network, which may include aspects of both the device-centric and the network-centric approaches discussed above with reference to FIGS. 1 and 2. For example, an embodiment may implement a hybrid approach in which the GPS capabilities of wireless devices, the measured signal strengths and/or radio energy of radio signals transmitted from the wireless devices, and known locations of network components are used in combination to estimate the locations of one or more wireless devices in a network. In a further embodiment, the wireless devices and/or network components (e.g., severs, radio access points, etc.) may be configured to dynamically determine which factors (e.g., radio signal strength, GPS, etc.) to measure and/or use in determining the location of the wireless devices.

Figure 3:
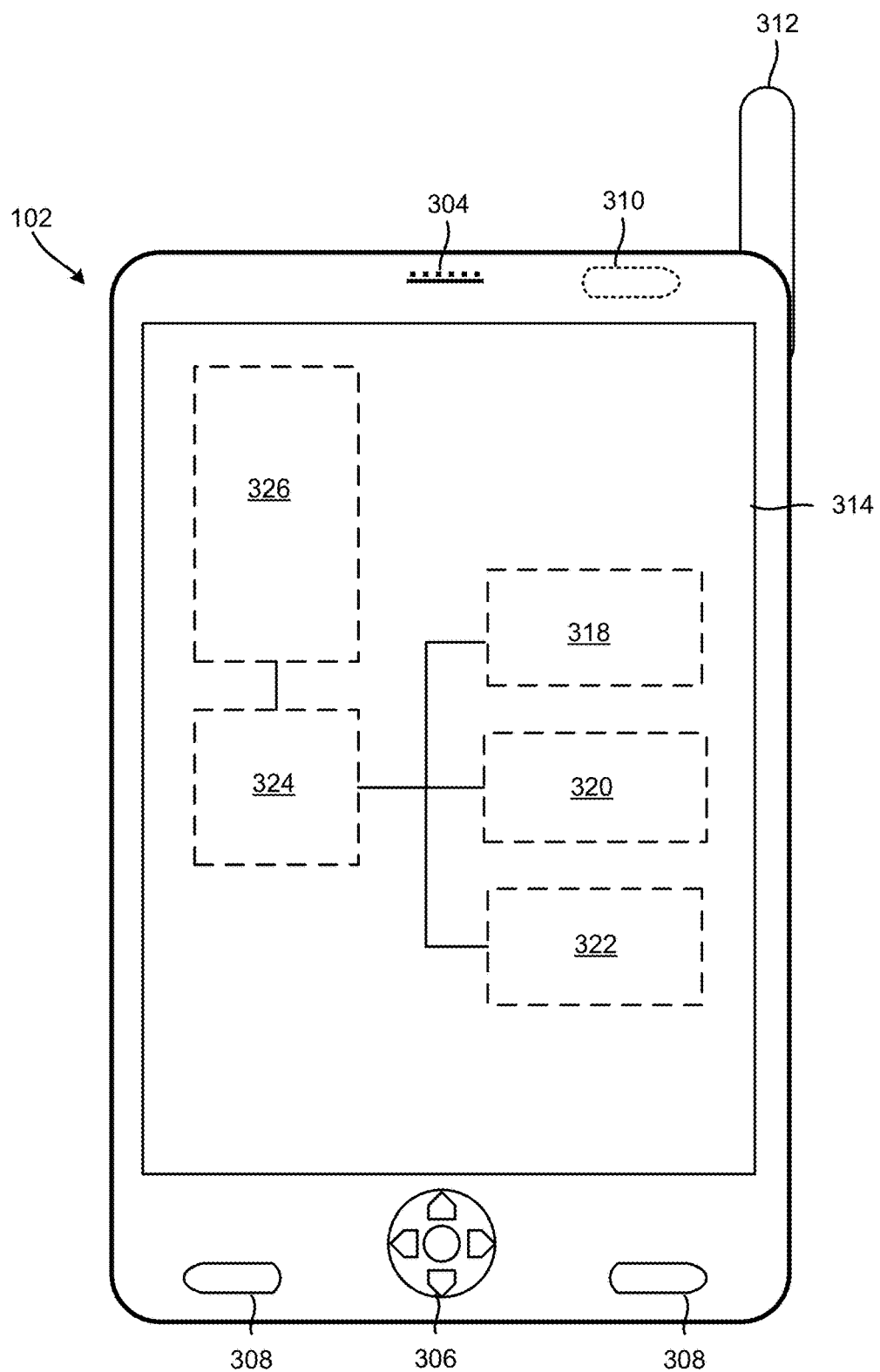
FIG. 3 is an illustration of an example wireless device suitable for use in grouping with other wireless devices and computing precise location information in accordance with the various embodiments.

FIG. 3 illustrates sample components of a wireless device 102 in the foil of a phone that may be used with the various embodiments. The wireless device 102 may include a speaker 304, user input elements 306, microphones 308, an antenna 312 for sending and receiving electromagnetic radiation, an electronic display 314, a processor 324, a memory 326 and other well known components of modern electronic devices.

The wireless device 102 may also include one or more sensors 310 for monitoring physical conditions (e.g., location, motion, acceleration, orientation, altitude, etc.). The sensors may include any or all of a gyroscope, an accelerometer, a magnetometer, a magnetic compass, an altimeter, an odometer, and a pressure sensor. The sensors may also include various bio-sensors (e.g., heart rate monitor, body temperature sensor, carbon sensor, oxygen sensor, etc.) for collecting information pertaining to environment and/or user conditions. The sensors may also be external to the wireless device and paired or grouped to the wireless device via a wired or wireless connection (e.g., Bluetooth®, etc.). In embodiment, the wireless device 102 may include two or more of the same type of sensor (e.g., two accelerometers, etc.).

The wireless device 102 may also include a GPS receiver 318 configured to receive GPS signals from GPS satellites to determine the geographic location of the wireless device 102. The wireless device 102 may also include circuitry 320 for transmitting wireless signals to radio access points and/or other network components. The wireless device 102 may further include other components/sensors 322 for determining the geographic position/location of the wireless device 102, such as components for determining the radio signal delays (e.g., with respect to cell-phone towers and/or cell sites), performing trilateration and/or multilateration operations, identifying proximity to known networks (e.g., Bluetooth® networks, WLAN networks, WiFi, etc.), and/or for implementing other known geographic location technologies.

The wireless device 102 may also include a system acquisition function configured to access and use information contained in a subscriber identity module (SIM), universal subscriber identity module (USIM), and/or preferred roaming list (PRL) to, for example, determine the order in which listed frequencies or channels may be attempted when the wireless device 102 is to acquire/connect to a wireless network or system. In various embodiments, the wireless device 102 may be configured to attempt to acquire network access (i.e., attempt to locate a channel or frequency with which it can access the wireless/communication network) at initial power-on and/or when a current channel or frequency is lost (which may occur for a variety of reasons).

The wireless device 102 may include pre-built in USIM, SIM, PRL or access point information. In an embodiment, the wireless device may be configured for first responders and/or public safety network by, for example, setting the incident radio system as the default and/or preferred communication system.

As mentioned above, despite recent advances in mobile and wireless communication technologies, determining the specific location of a wireless device in a wireless network remains a challenging task for a variety of reasons, including the variability of environmental conditions in which wireless devices are often used by consumers, deficiencies in existing technologies for computing and/or measuring location information on wireless devices, and the lack of uniform standards. For example, there is currently no universally accepted standard for implementing or providing location-based services. As a result, wireless device designers and wireless network operators, in conjunction with local public safety and third party providers, are using a variety of inefficient, incoherent, and sometimes incompatible methods, technologies, solutions, and/or techniques to determine the location of a wireless device and/or to provide location based services.

While there are no universally accepted standards for implementing or providing location-based services, there are certain requirements or standards associated with determining the location of a wireless device that may be of use in various embodiments. The U.S. Congress has mandated that cellular service providers configure their networks, communication systems and/or wireless devices so that the locations of wireless devices can be determined when a 911 call is placed. To implement Congress's mandate, the Federal Communications Commission (FCC) requested cellular service providers upgrade their systems in two phases (herein "Phase I" and "Phase II" respectively). While the level of precision/accuracy provided by these Phase I and II upgrades are generally inadequate for providing effective location based services that meet the demands of modern users of wireless devices, these upgrades provide a foundation from which more effective location based solutions may be built.

As mentioned above, the FCC requested cellular service providers upgrade their systems in two phases. In the first phase (Phase I), cellular service providers were to upgrade their systems so that emergency calls (e.g., 911 calls) are routed to the public service answering point (PSAP) closest to the cell-tower antenna with which the wireless device is connected, and so that PSAP call-takers can view the phone number of the wireless device and the location of the connecting cell-tower. The location of the connecting cell-tower may be used to identify the general location of the wireless device within a 3-6 mile radius.

In the second phase (Phase II), cellular service providers were to upgrade their systems so that PSAP call-takers could identify the location of the wireless device to within 300 meters. To meet these Phase II requirements, wireless service providers have implemented a variety of technologies, and depending on the technology used, can generally identify the location of the wireless device to within 50-300 meters. For example, on systems that have implemented a network-based solution (e.g., triangulation of nearby cell towers, etc.), the location of a wireless device can be determined within an accuracy of 100 meters 67% of the time, and to within an accuracy of 300 meters 95% of the time. On systems that have adopted a wireless device-based solution (e.g., embedded global positioning system receivers, etc.), the location of the wireless device may be determined to within 50 meters 67% of the time, and to within 150 meters 95% of the time.

Existing phase I and II solutions, alone, are not adequate for generating location information having sufficient accuracy or detail for use in providing accurate, powerful, and reliable location based services. Various embodiments may use some or all of the capabilities built into existing systems (e.g., as part of phase I and II upgrades, device-centric systems, network-centric systems, etc.), in conjunction with more advanced location determination techniques, to compute location information suitable for the advanced location based services demanded by today's consumers.

In addition to the three basic approaches discussed above, a number of different solutions are currently available for determining the location of wireless device, any or all of which may be implemented by and/or included in the various embodiments.

Most conventional location determination solutions use distance estimation techniques that are based on single-carrier signals, and one of the fundamental operations in ground-based (or network-centric) location determination solutions is timing estimation of a first-arrival path of a signal. That is, a single-carrier signal transmitted between a transceiver and a wireless device can be received via multiple paths (i.e., multipath), and the multiple paths of the signal can have different received powers and arrival times. The received signal may be cross-correlated to distinguish the multiple paths of the received signal. In this method, it is generally assumed that the first-arrival path (e.g., first detected signal, strongest signal, etc.) is associated with the path traveling the shortest distance, and hence is the right value to use in estimating distance between the wireless device and the transceiver. Often, this first-arrival path is the strongest path due to zero or fewer reflections, relative to the other paths, between the transceiver and the wireless device.

In various embodiments, the first-arrival time of the identified first-arrival path may be used in addition to other parameters (e.g., an estimated signal transmission time and/or a time offset between clocks of the transceiver and the wireless device, etc.) to estimate distance between a wireless device and a network component (e.g., another wireless device, a transceiver, an access point, a base station, etc.). The first-arrival time may be estimated by the wireless device (e.g., based on the downlink received signal) or by the network component (e.g., based on an uplink received signal).

The location of the wireless device may also be determined by estimating the distance between the wireless device and a network component or other signal sources (e.g., a transceiver, ground or satellite-based signal sources, etc.). For example, the location of the wireless device may be determined by performing trilateration using estimated distances between multiple (e.g., three or more) transceivers and the wireless device.

Another location determination solution may include computing an observed time difference of arrival (OTDOA) value by measuring the timing of signals received from three network components (e.g., wireless devices, transceivers, access points, etc.). For example, a wireless device may be configured to compute two hyperbolas based on a time difference of arrival between a reference transceiver signal and signals of two neighbor transceivers. The intersection of the computed hyperbolas may define a position on the surface of the earth that may be used by various embodiments to determine the location of the wireless device.

The accuracy of such OTDOA solutions may be a function of the resolution of the time difference measurements and the geometry of the neighboring transceivers. As such, implementing an OTDOA solution may require determining the precise timing relationship between the neighboring transceivers. However, in existing asynchronous networks, this precise timing relationship may be difficult to ascertain.

In various embodiments, location measurement units (LMUs) may be added throughout a deployment region of an asynchronous network to measure/compute timing information for one or more network components (e.g., transceivers) relative to a high quality timing reference signal. For example, a wireless device or an LMU may determine the observed time difference between frame timing of transceiver signals, and the observed time difference may be sent to the transceiver or a radio network controller of the communication network to determine the location of the wireless device. The location of the wireless device may also be determined based on the observed time difference and assistance data (e.g., position of the reference and neighbor transceivers) received from the communication network.

Another location determination solution may include computing an uplink-time difference of arrival (U-TDOA) based on network measurements of the time of arrival of a known signal sent from the wireless device and received at multiple (e.g., four or more) LMUs. For example, LMUs may be positioned in the geographic vicinity of the wireless device to accurately measure the time of arrival of known signal bursts, and the location of the wireless device may be determined using hyperbolic trilateration based on the known geographical coordinates of the LMUs and the measured time-of-arrival values.

As discussed above, conventional location determination solutions are typically based on single-carrier signals. The various embodiments include a ground-based location determination solution based on multi-carrier signals. A location determination solution based on multi-carrier signals may improve the accuracy of the computed location information by, for example, improving the accuracy of the timing estimation (e.g., by expanding the bandwidth of cellular signals). Location determination solutions based on multiple carriers may be used in both the device-centric (e.g., wireless device-based) and network-centric (e.g., base station-based) approaches, and may be applied to both 3GPP and 3GPP2 wireless communication technologies.

In various embodiments, a wireless device may be configured to determine its geospatial location based on information collected from wireless device sensors (e.g. gyroscope, accelerometer, magnetometer, pressure sensor, etc.), information received from other wireless devices, and information received from network components in a communication system.

Figure 4A:
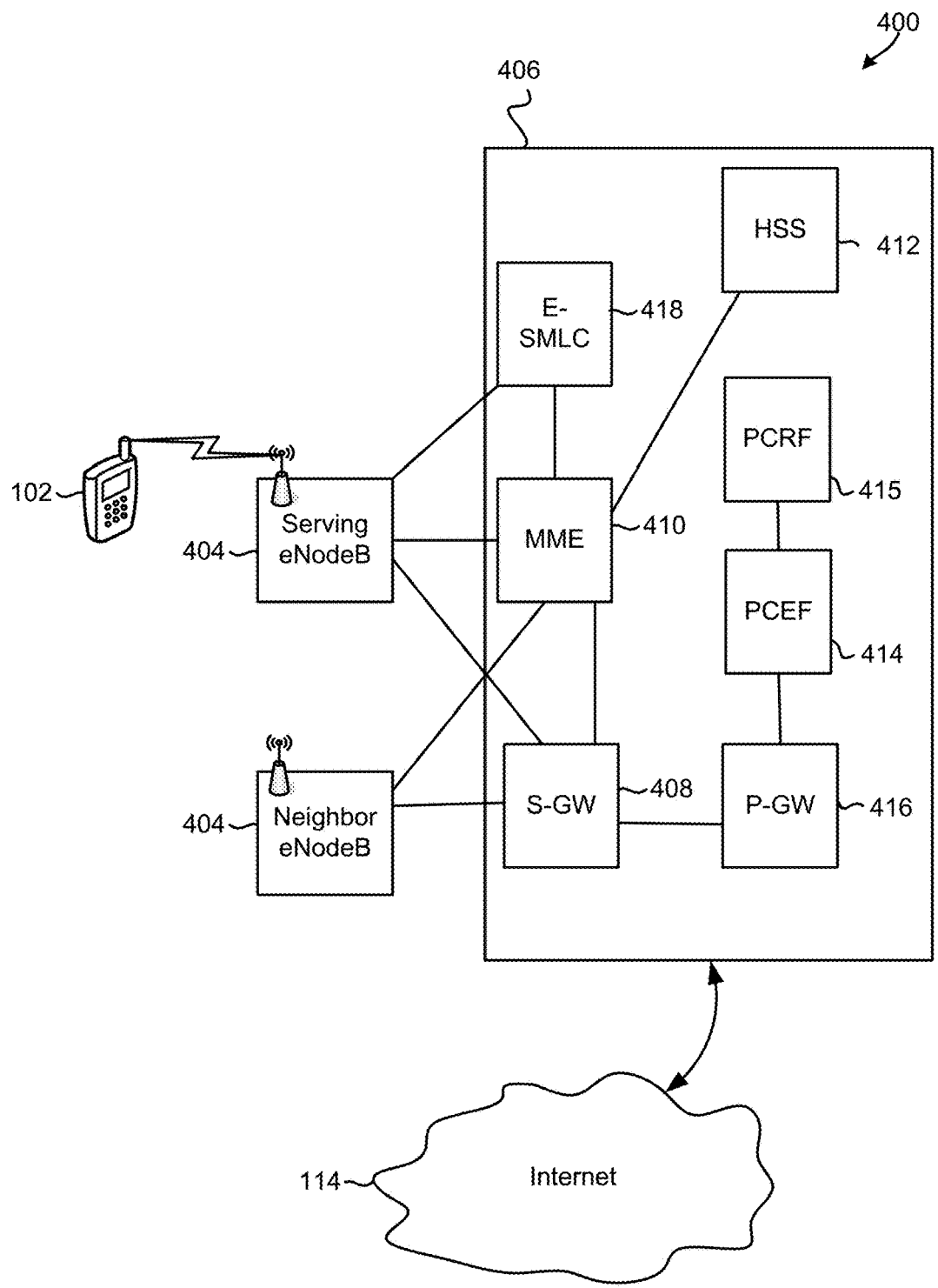
FIG. 4A is a communication system block diagram illustrating network components of an example LTE communication system suitable for use with various embodiments.

FIG. 4A illustrates an example communication system within which the various embodiments may be implemented. Generally, the wireless device 102 may be configured to send and receive communication signals to and from a network 406, and ultimately the Internet 114, using a variety of communication systems/technologies (e.g., GPRS, UMTS, LTE, cdmaOne, CDMA2000™). In the example illustrated in FIG. 4, long term evolution (LTE) data transmitted from the wireless device 102 is received by a eNodeB (eNodeB) 404 and sent to a serving gateway (S-GW) 408 located within the core network 406. The wireless device 102 or serving gateway 408 may also send signaling (control plane) information (e.g., information pertaining to security, authentication, etc.) to a mobility management entity (MME) 410.

The MME 410 may request user and subscription information from a home subscriber server (HSS) 412, perform various administrative tasks (e.g., user authentication, enforcement of roaming restrictions, etc.), and send various user and control information to the S-GW 408. The S-GW 408 may receive and store the information sent by the MME 410 (e.g., parameters of the IP bearer service, network internal routing information, etc.), generate data packets, and forward the data packets to a packet data network gateway (P-GW) 416. The P-GW 416 may process and forward the packets to a policy and control enforcement function (PCEF) 414 which receives the packets and requests charging/control policies for the connection from a policy and charging rules function (PCRF) 415. The PCRF 415 provides the PCEF 414 with policy rules that it enforces to control the bandwidth, the quality of service (QoS), and the characteristics of the data and services being communicated between the network (e.g., Internet, service network, etc.) and the wireless device 102. In an embodiment, the PCEF 414 may be a part of, or perform operations typically associated with, the P-GW 416. Detailed information about policy and charging enforcement function operations may be found in "3rd Generation Partnership Project Technical Specification Group Services and System Aspects, Policy and Charging Control Architecture," TS 23.203, the entire contents of which are incorporated herein by reference.

In an embodiment, the network 406 may also include an Evolved Serving Mobile Location Center (E-SMLC) 418. Generally, the E-SMLC 418 collects and maintains tracking information about the wireless device 102. The E-SMLC 418 may be configured to provide location services via a lightweight presentation protocol (LPP), which supports the provision of application services on top of TCP/IP networks. The E-SMLC 418 may send or receive (e.g., via LPP) almanac and/or assistance data to and from the MME 410 and/or eNodeB 404. The E-SMLC 418 may also forward external or network initiated location service requests to the MME 410.

In addition, the wireless device 102 may receive information from the serving eNodeB 404 via System Information Blocks that includes the neighbor cells to scan that are on the same system using the same frequencies or different frequencies, Home eNodeB (HeNodeB), in addition to CDMA, GERAN and UTRA cells.

Figure 4B:
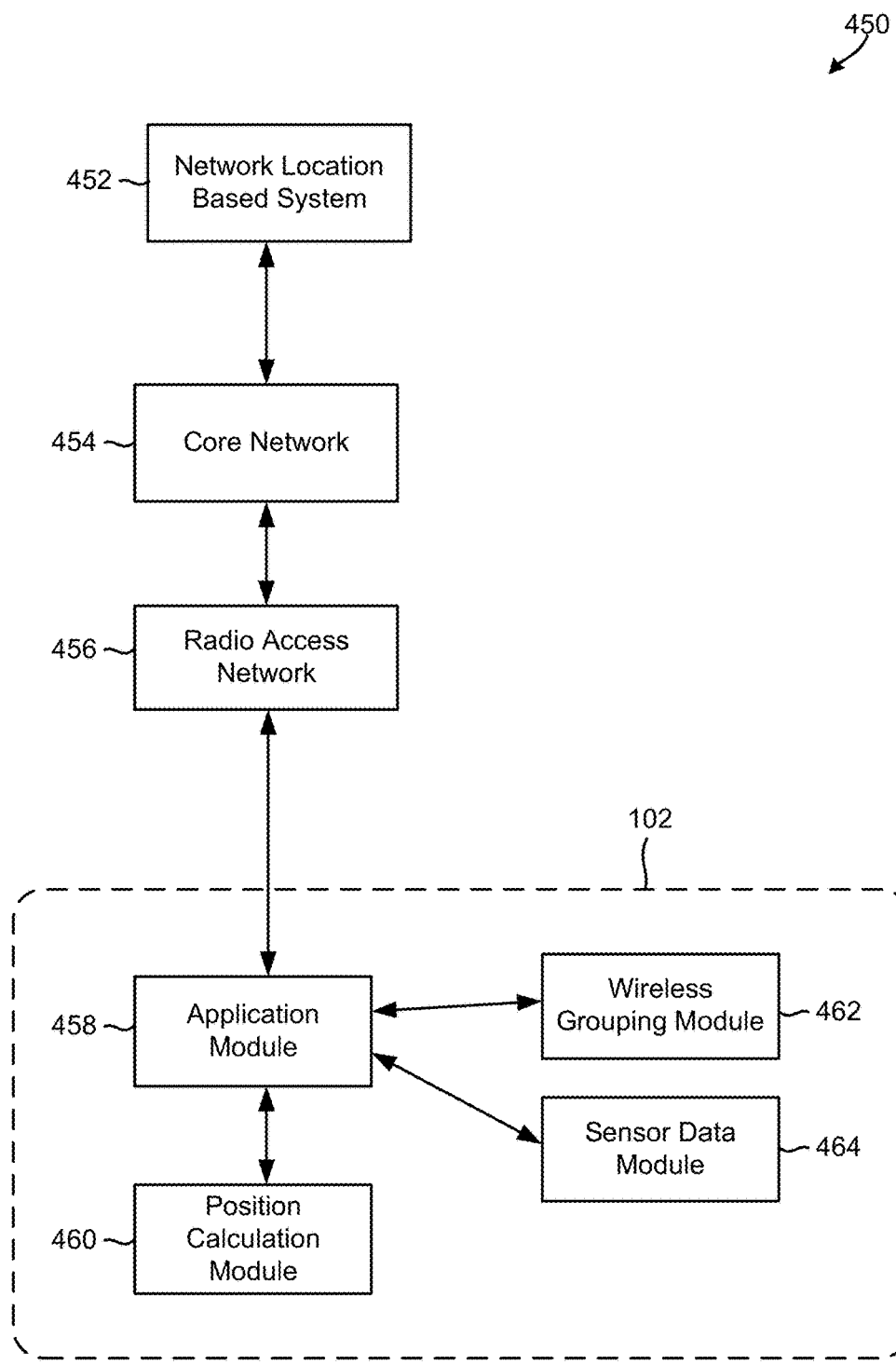
FIG. 4B is a block diagram illustrating logical components, communication links and information flows in an embodiment communication system.

FIG. 4B illustrates logical components, communication links, and information flows in an embodiment communication system 450 suitable for use in determining the location of the wireless device. The communication system 450 may include a network location based system 452, a core network 454, and a radio access network 456. The communication system 450 may also include an application component 458, a position calculation component 460, a wireless grouping component 462, and a sensor data component 464, any or all of which may be included in a wireless device 102. The application component 458 (e.g., client software) may request and receive location information from the network location based system 452 (e.g., through the core network 454 and the radio access network 456). Likewise, the network location based system 452 (or another client attached to, or within, the core network 454) may request and receive location information from the application component 458.

In various embodiments, the wireless device 102 may be configured to determine its geospatial location based on information collected from wireless device sensors (e.g. gyroscope, accelerometer, magnetometer, pressure sensor, etc.), information received from other wireless devices, and information received from network components in a communication system. In an embodiment, the collection and reporting of sensor information may be controlled/performed by the sensor data component 464. For example, the application component 458 may retrieve/receive sensor information from the sensor data component 464 and send the sensor information to the position calculation component 460 to compute the location of the wireless device locally for position updates and/or position augmentation. The application component 458 may also send the computed location information to the network location based system 452 and or other wireless devices.

As mentioned above, in various embodiments, the wireless device 102 may be configured to determine its geospatial location based on information collected from other wireless devices. In these embodiments, two or more wireless devices may be organized into groups. Each wireless device may also share its location information with the other wireless devices with which the wireless device is grouped. For example, wireless devices may be configured to share their current location and/or position information (e.g., latitude, longitude, altitude, velocity, etc.) and an estimate of a distance between themselves and a target wireless device with other wireless devices in their group.

In an embodiment, the grouping of wireless devices may be controlled by the wireless grouping component 462. For example, the application component 458 may retrieve wireless group information (e.g., information pertaining to the locations of other wireless devices) from the wireless grouping component 462, and send the group information to the position calculation component 460 to perform local calculations for position updates and/or position augmentation. In an embodiment, the position calculation component 460 may perform the local calculations based on both sensor information received from the sensor data component 464 and group information received from the wireless grouping component 462.

In an embodiment, the wireless device 102 may be configured to automatically share its location information with other wireless devices upon discovery of the other wireless devices. Wireless devices may augment their location information (e.g., position coordinates) with information received from other wireless devices within same geographic location, and in a controlled pseudo ad-hoc environment. Since the shared location information (e.g., latitude, longitude, altitude, velocity, etc.) involves a relatively small amount of data, in an embodiment the wireless devices may receive such information from a network server by in-band and or out-of-band signaling.

When implemented in a 3GPP-LTE network, the various embodiments may include an E-SMLC 418 component configured to send and receive location information (e.g., latitude, longitude, altitude, velocity, etc.) to and from the wireless devices, which may be achieved both on-net and off-net. The location information may be delivered in standard formats, such as those for cell-based or geographical co-ordinates, together with the estimated errors (uncertainty) of the location, position, altitude, and velocity of a wireless device and, if available, the positioning method (or the list of the methods) used to obtain the position estimate.

To aid in the determination of the locations of wireless devices, 3GPP-LTE networks have standardized several reference signals. Various embodiments may use these reference signals for timing based location and positioning solutions. Such reference signals may include the primary and secondary synchronization signals and the cell specific reference signals.

As mentioned above, two or more wireless devices may be organized into groups. Wireless devices within the same group may be part of the same network, or may be associated with different networks and/or network technologies. The wireless devices within the same group may also operate on different network operating systems (NOSs) and/or radio access networks (RANs).

Figure 5A:
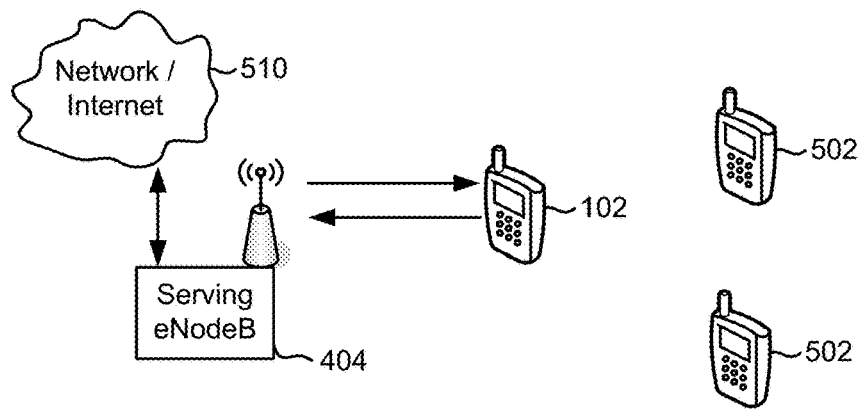
FIGS. 5A-5C are component block diagrams illustrating functional components, communication links, and information flows in an embodiment method of grouping wireless devices and sharing location information between grouped wireless devices.
Figure 5B:
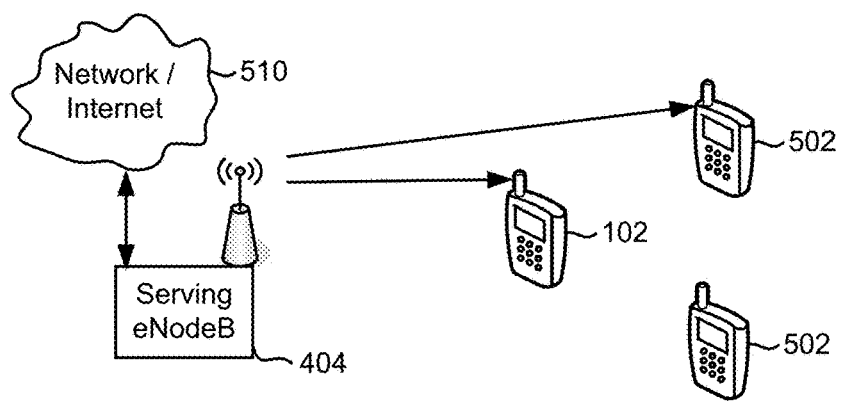
Figure 5C:
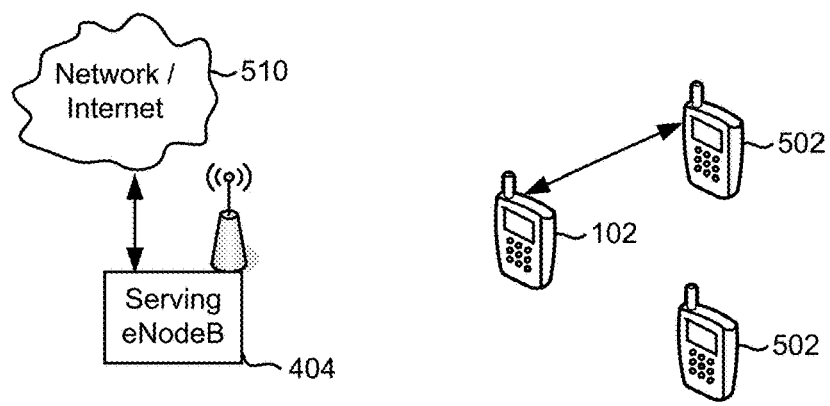

FIGS. 5A-5C illustrate functional components, communication links, and information flows in an embodiment method of grouping wireless devices and sharing location information between grouped wireless devices. With reference to FIG. 5A, after a wireless device 102 is powered on, the wireless device 102 may scan the airwaves for pre-defined and/or preferred radio frequency carriers and/or systems with which the wireless device 102 may connect to the network. If the wireless device 102 does not find an appropriate network with which it may connect (or loses its connection) the wireless device 102 may scan the airwaves for other radio access systems (e.g., mobile network, radio access point associated with a wireless device, etc.) to acquire (i.e., connect to) until a connection to a network/Internet 510 is established. These operations could also be performed in the event of a dropped call or power interruption.

The wireless device 102 may also begin acquiring GPS signals while scanning the airwaves for radio frequency carriers and/or systems. If the wireless device 102 cannot acquire GPS signals, a network component (not illustrated) may help determine the relative position of the wireless device 102 based on one or more of the location determination solutions discussed herein (e.g., based on the antenna used for the radio access point, the time delay, angle of arrival, etc.).

The wireless device 102 may acquire (i.e., connect to) an appropriate radio access system, radio frequency carrier and/or system via the wireless device's system acquisition system. In the examples illustrated in FIGS. 5A-5C, the wireless device 102 establishes a connection to a network 510 via an eNodeB 404. However, it should be understood that any or all of the communication technologies discussed above are contemplated and within the scope of the various embodiments.

After the wireless device 102 acquires the radio access system, the network 510 (i.e., a component in the network such as a server) may know the approximate location of the wireless device 102 (e.g., via one or more of the location determination solutions discussed above, such as proximity to base towers). In addition, the wireless device 102 may compute its current location (e.g., via GPS and/or the location determination solutions discussed above), store the computations in a memory of the wireless device, and report its current location to the network 510.

In addition to knowing the approximate location of the wireless device 102, the network 510 may also be informed of the locations of other wireless devices 502 and the proximity of the other wireless devices 502 to the recently acquired wireless device 102.

FIG. 5B illustrates that the network 510 may send instructions/commands to the wireless devices 102, 502 to cause the wireless devices 102, 502 to group with wireless devices 102, 502 and possibly others. In an embodiment, the network 510 may be configured to automatically group the wireless devices 102, 502 based on the proximity of the devices 102, 502 with respect to one another. In an embodiment, the network 510 may be configured to allow an incident command system (ICS) commander to group the devices. In an embodiment, the network 510 may be configured to allow the wireless devices to form groups based on their proximity to one another.

FIG. 5C illustrates that the wireless device 102 may pair/group with another wireless device 502 and/or establish communication links so that the wireless devices 102, 502 may share real-time relative location information with each other. Two or more grouped/paired wireless devices 102 and 502 may identify their relative positions to each other by sending relative location information over the established communication links. The relative location information may include time-to-arrival, angle-of-arrival, and existing or self-aware location information.

The wireless devices 102, 502 may be configured report sensor information to each other and/or the network 510. The sensor information may include x, y, z coordinate information and velocity information. The sensor information may be polled on a continuous basis, may be requested periodically, and/or made available on demand in response to network/system requests.

In an embodiment, a wireless device 102, 502 may be configured to report sensor information in response to determining that there is a high likelihood that there has been change in a location of the wireless device 102, 502 (e.g., in response to detecting motion). The wireless devices 102, 502 may also be configured collect and report sensor information to the network 510 in response to receiving an instruction/command from the network 510 (i.e., a component in the network such as a server or E-SLMC 418 illustrated in FIG. 4). The network 510 (i.e., a component in the network) may be configured to receive the sensor and location information from the wireless devices 102, 502, and compute and store information about the distances (e.g., in time delay and angle of arrival with respect to the wireless devices 102, 502).

In an embodiment, the reporting of sensor information may be based on local parameter settings. For example, the wireless devices 102, 502 may be configured to transmit sensor information when any of the measured parameters (e.g., x, y, z, and velocity information) meet or exceed a threshold value (e.g., exceed a rate-of-change, meet a timeout limit), which may be identified by local parameter settings stored in a memory of the wireless devices 102, 502. In an embodiment, the wireless devices 102, 502 may be configured to re-compute and/or update their location information in response to determining that the measured parameters (e.g., x, y, and z coordinates and velocity information) meet or exceed a threshold value.

In an embodiment, a wireless device 102 and/or the network 510 (i.e., a component in the network) may be configured to compare collected sensor information to computed latitude and longitude coordinates, relative altitude information, and other available information to determine if there is a discrepancy between the collected/measured values and the expected values. When it is determined that there exists a discrepancy between the expected and measured values, the wireless device 102 and/or network 510 may perform additional measurements to improve the location accuracy of the measurements/location information.

Figure 5D:
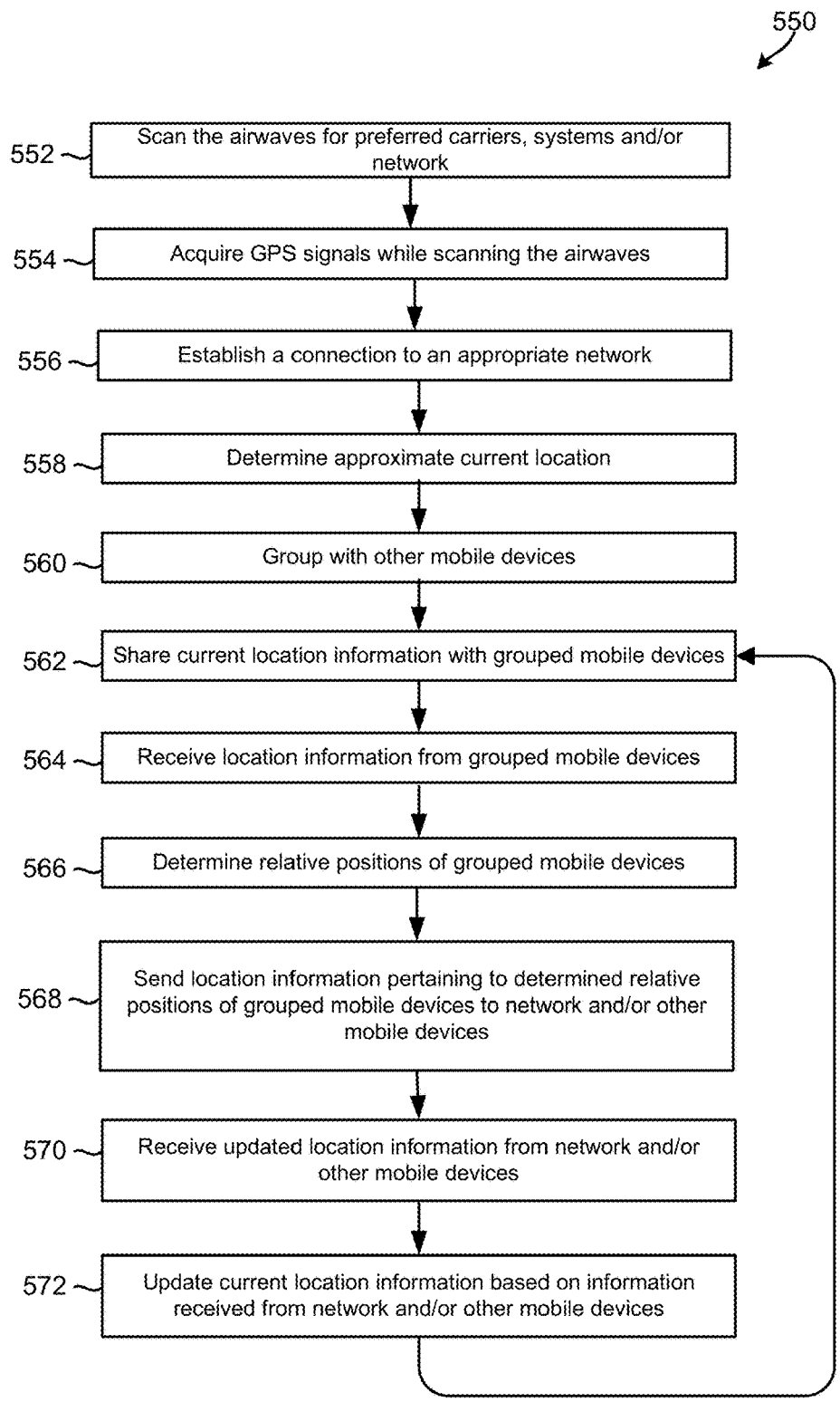
FIG. 5D is a process flow diagram illustrating an embodiment wireless device method for grouping wireless devices and sharing location information between grouped wireless devices and the network to compute enhanced location information.

FIG. 5D illustrates an embodiment wireless device method 550 for grouping wireless devices and sharing location information between grouped wireless devices and the network to compute enhanced location information. After a wireless device is powered on, in block 552, the wireless device may scan the airwaves for predefined and/or preferred radio frequency carriers and/or systems with which the wireless device may connect. In block 554, the wireless device may begin acquiring GPS signals while scanning the airwaves for radio frequency carriers and/or systems. If the wireless device cannot acquire GPS signals, the wireless device or a network component may, as part of block 554, determine the relative position of the wireless device based on one or more of the location determination solutions discussed herein. In block 556, the wireless device may acquire (i.e., connect to) an appropriate radio access system, radio frequency carrier, system and/or network.

In block 558, the wireless device may compute its current location (e.g., via GPS and/or the location determination solutions discussed above), store the computations in a memory, and report its current location to the network. In block 560, the wireless device may group with other wireless devices in response to receiving instructions/commands from a network component and/or in response to detecting that the other wireless devices are within a predefined proximity to the wireless device (i.e., within a threshold distance). In block 562, the wireless device may share its current location information, as well as information collected from sensors, with the grouped wireless devices. In block 564, the wireless device may receive location and/or sensor information from the grouped wireless devices. The sensor information may include x, y, z coordinate information and velocity information.

In block 566, the wireless device may identify the relative positions of the other wireless devices, which may be achieve by evaluating the location and sensor information received from the other wireless devices and/or via any or all of the location determination solutions discussed herein. In block 568, the wireless device may send the relative location information, its current location information, and/or sensor information to a network component and/or the other wireless devices, which may receive the sensor and location information and compute updated location information (e.g., based on distance in time delay and angle of arrival, relative altitude information, etc.). In block 570, the wireless device may receive updated location information from the network component and/or the other grouped wireless devices. In block 572, the wireless device may update its current location calculation and/or information based on the information received from the network component and/or the other grouped wireless devices. The operations of blocks 562-572 may be repeated until the desired level of precision is achieved for the location information.

FIGS. 6A-6D illustrate functional components, communication links, and information flows in an embodiment method for computing location information in which the grouped/paired wireless devices 102, 502 are updated with their respective location information.

Figure 6A:
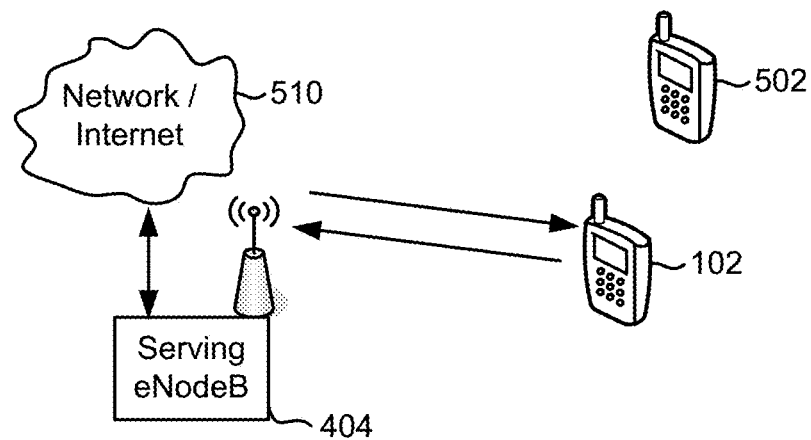
FIGS. 6A-6D are component block diagrams illustrating functional components, communication links, and information flows in an embodiment method for computing location information in which the grouped/paired wireless devices are updated with their respective location information.

FIG. 6A illustrates that the wireless device 102 may communicate with a serving eNodeB 404 to relay its location information to the network 510 and/or to receive location information from the network 510.

Figure 6B:
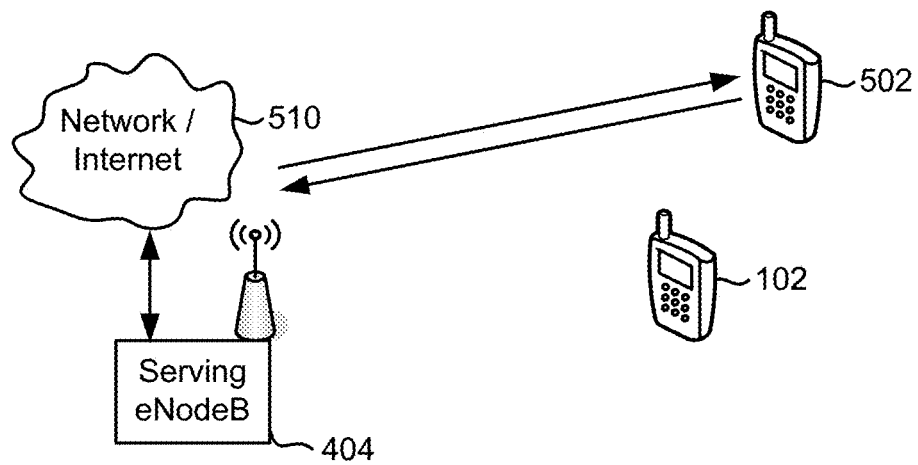

FIG. 6B illustrates that another wireless device 502 may also communicate with the serving eNodeB 404 to relay its location information to the network 510 and/or to receive location information from the network 510.

Figure 6C:
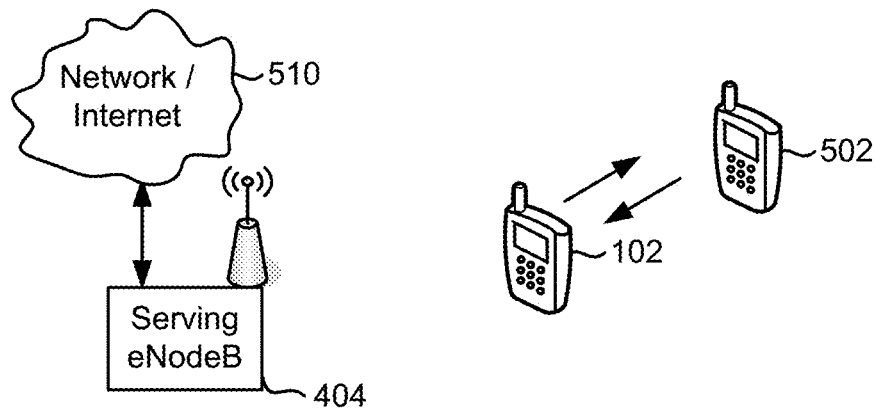

FIG. 6C illustrates that the grouped/paired wireless devices 102, 502 may communicate with each other to determine the distance between each other, which may be achieved by the wireless devices 102, 502 communicating various types of information, such as time-of-arrival, relative position with angle-of-arrival measurements, and other similar values, measurements, or computations. The wireless devices 102, 502 may then re-compute, refine, and/or update their current location calculations and/or location information based on information received from the other wireless devices 102, 502.

Figure 6D:
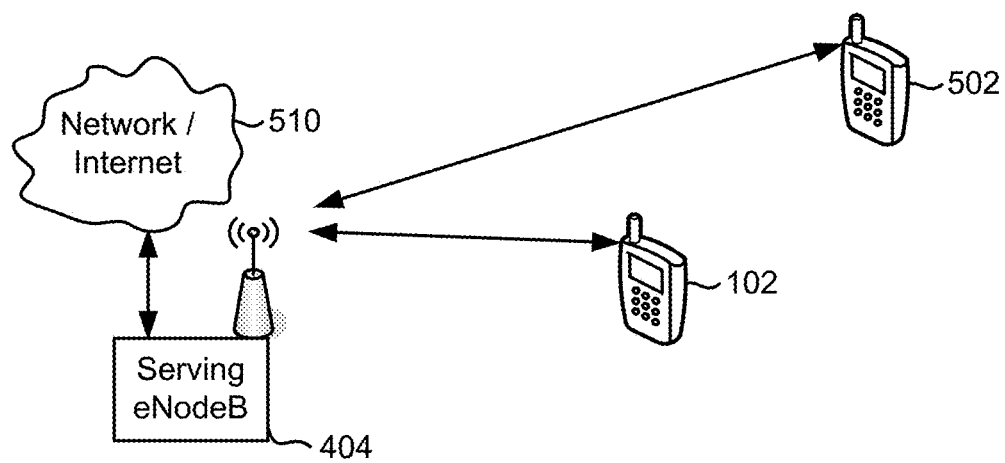

FIG. 6D illustrates that the grouped/paired wireless devices 102 and 502 may send their self-aware location information and/or relative location information to the network 510 (via the serving eNodeB 404), and receive updated location information from the network 510. For example, the wireless devices 102 and 502 may send their present location coordinates, distances between wireless device (e.g., distance to each other), altitude, and bearings (e.g., where wireless device 102 is with respect to wireless device 502) to the network 220. The network may compute updated location information based on the received information (e.g., coordinates, sensor information, proximity information, etc.), and send the updated location information to the wireless devices 102, 502. The wireless devices 102, 502 may then re-compute, refine, and/or update their current location calculations and/or location information based on information received from the network.

The operations discussed above with respect to FIGS. 6A-6D may be repeated so that the wireless devices 102, 502 recursively, continuously, and/or periodically re-compute, refine, and/or update their current location calculations and/or location information based on updated information received from the other wireless devices and/or the network 510 until the desired level of precision is achieved for the location information.

Figure 6E:
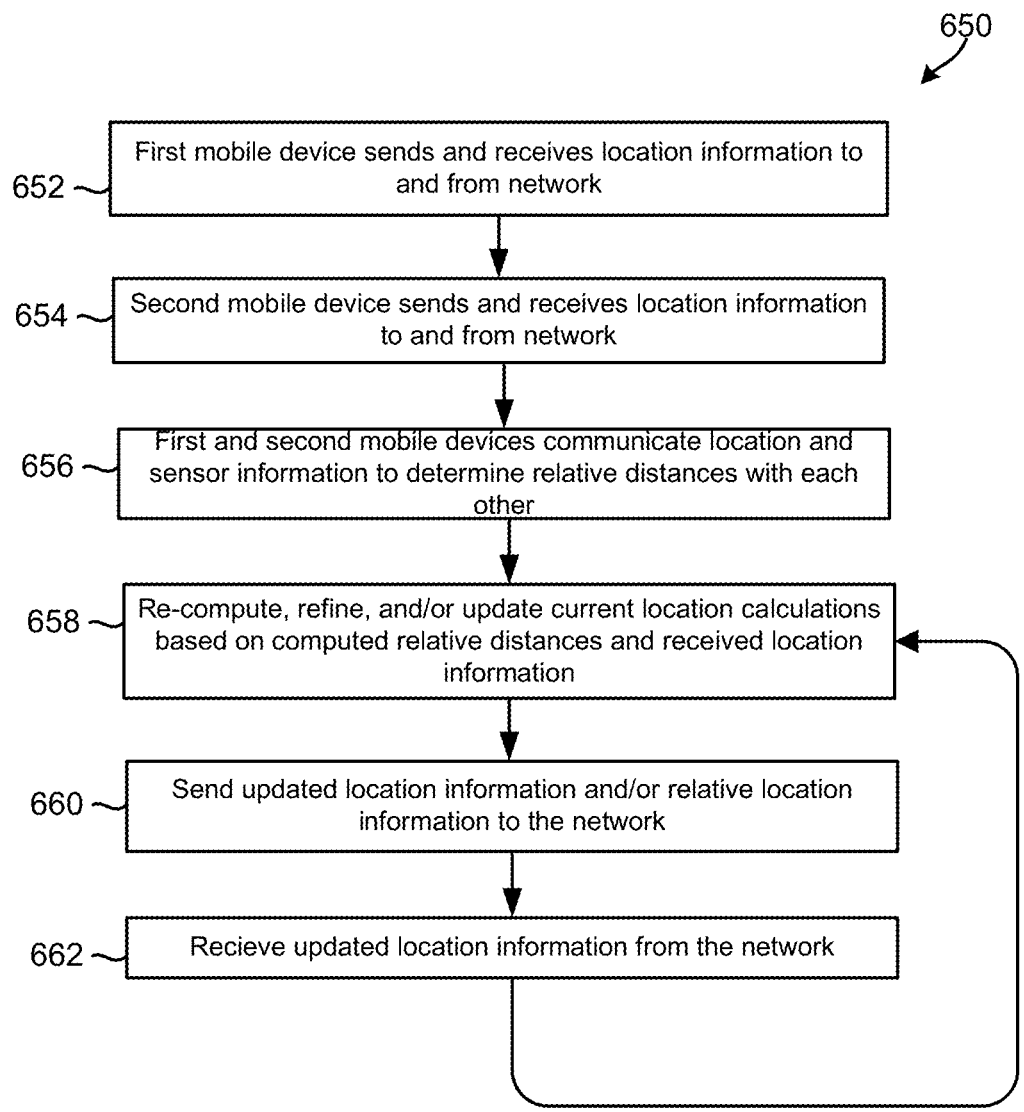
FIG. 6E is a process flow diagram illustrating an embodiment system method of determining the location of two or more grouped wireless devices.

FIG. 6E illustrates an embodiment system method 650 of determining the location of two or more grouped wireless devices. In block 652, a first wireless device may send and/or receive current location information to and from a network component. In block 654, a second wireless device may send and/or receive current location information to and from a network component. In block 656, the first and second wireless devices may communicate with each other to determine the relative distances between each other, which may be achieved by communicating various types of information, including time-of-arrival, relative position with angle-of-arrival measurements, velocity, altitude, etc.

In block 658, the first and/or second wireless devices may re-compute, refine, and/or update their current location calculations and/or location information based on information received from the other wireless devices and/or the network. In block 660, the first and/or second wireless devices may send their updated current location calculations and/or location information to the network component, which may receive the calculations/information and compute updated location information (e.g., based on distance in time delay and angle of arrival, relative altitude information, etc.). In block 662, the first and/or second wireless devices may receive updated location information from the network. The operations in blocks 658-662 may be repeated until the desired level of precision is achieved for the location information.

It should be understood that the methods and operations discussed above with reference to FIGS. 5A-5D and 6A-6F may also be performed such that they include more than two devices. For example, in an embodiment, the wireless devices may be grouped into units of four (4) such that each wireless device may triangulate its position relative to the other wireless devices in the same group.

In an embodiment, a wireless device 102 and/or a network component may store relative location information for all the wireless devices within each group, based on the type of grouping. For example, a network component may store relative location information for all the wireless devices grouped/paired by an incident command system (ICS) commander. Likewise, the network component may store relative location information for all the wireless devices grouped/paired based on their proximity to each another.

In an embodiment, the wireless device 102 may be configured to detect a low battery condition, and initiate operations to conserve battery. For example, a wireless device 102 may be configured to turn off its radio and/or terminate or reduce its participation in the group/pairing information exchange. As another example, a wireless device 102 may be flagged or identified as having a low battery condition, and the other grouped/paired mobiles devices may be informed of the low battery situation so that update intervals may be adjusted to reduce battery consumption.

Figure 6F:
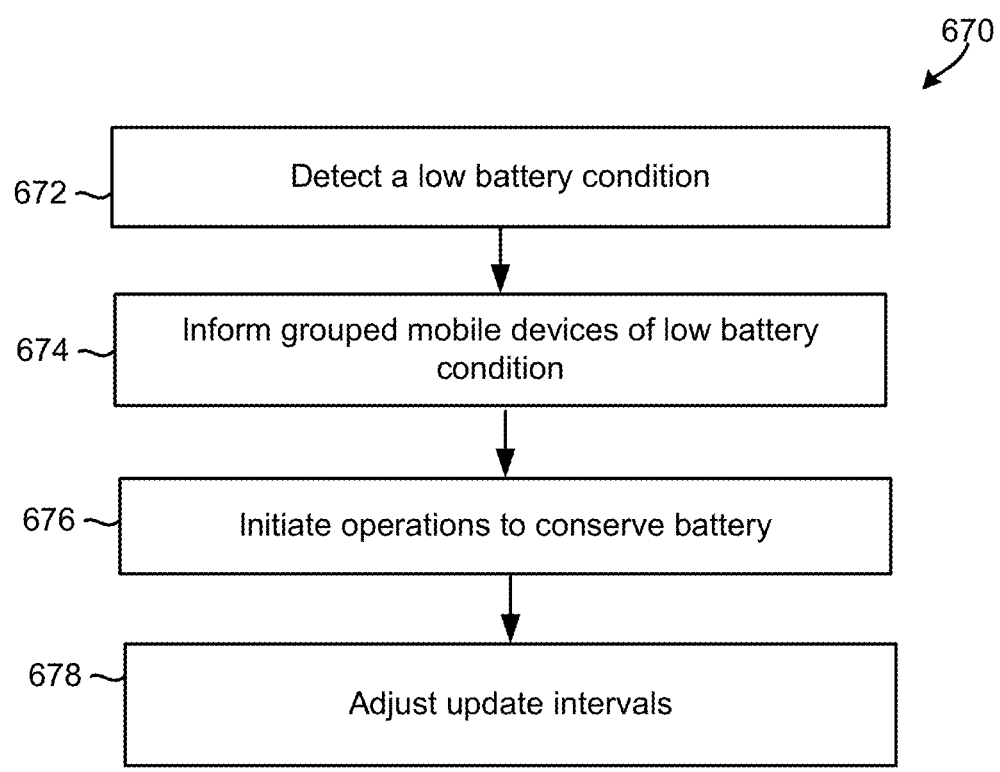
FIG. 6F is a process flow diagram illustrating an embodiment wireless device method of adjusting the update intervals in response to detecting a low battery condition.

FIG. 6F illustrates an embodiment method 670 of adjusting the update intervals in a wireless device in response to detecting a low battery condition. In block 672, the wireless device may detect/determine that the amount of power remaining in the wireless device battery is below a predetermined threshold. In block 674, the wireless device may transmit a signal or otherwise inform grouped wireless devices of the detected low battery condition. In block 676, may initiate operations to converse power, such as by turn off its radio and/or reducing its participation in exchanging information with grouped wireless devices. In block 678, the wireless device and/or the informed grouped wireless devices may adjust the update intervals with respect to the wireless device to reduce the load on the wireless device.

As discussed above, grouped wireless devices may share various types of information to improve the accuracy of the location determination calculations. For the information shared between grouped/paired wireless devices, a comparison may be made for the path, range, between the wireless devices using any or all of the information available to the wireless devices (e.g., location coordinates, sensor information, proximity information, etc.). If the two wireless devices report relative positional information that is within a user or network defined range tolerance as being acceptable this information may be forwarded to the network. If the relative positional information is not within the user or network defined range tolerance, additional polling operations may be performed to improve the accuracy of the measurements or location information. The above-mentioned operations may be repeated until the desired level of accuracy is achieved. In an embodiment, the number of times the above-mentioned operations are repeated may be determined based on a user-definable values which can be set by the network, user or algorithm used.

As mentioned above, a wireless device 102 may include two or more of the same type of sensor. In the embodiments in which the wireless device 102 includes more than one of the same type of sensor (e.g., includes two accelerometers), one of the sensors (e.g., one of the two accelerometers) may be identified as a master sensor. The values measures by each sensor may be compared, and if the difference between the values falls within a tolerance range, the values measured by the master sensor may be used to compute the sensor parameters (e.g., x, y, z, and velocity parameters). If the difference between the values falls outside a tolerance range, the wireless device may use information collected from other sensors (of the same or different types) to determine if the values measured by the master sensor are consistent with expected values. For example, the wireless device may use information collected from various other types of sensors to compute sensor parameters (e.g., x, y, z, and velocity parameters), and compare the computed sensor parameters to similar sensor parameters computed based on the values measured on the master sensor to determine if the master sensor is functioning correctly. Values measured on the master sensor may also be compared to information stored in the network or other wireless devices to determine if the master sensor is functioning correctly. If it is determined that the master sensor is not functioning correctly, a secondary sensor may be designated as the master sensor. The previous master sensor may be demoted to standby status (i.e., for use if the primary sensor has a failure) and not used for immediate positional calculations.

As wireless devices move into an area, the wireless devices may be asked to group/pair with more devices. The number of devices that a wireless device can group/pair with may be restricted by user configuration, through the system, and/or user intervention so as to conserve battery and computational efforts (e.g., when the wireless device detects a low battery condition).

In an embodiment, proximity grouping may be used in the x, y, and z coordinates/fields and/or for velocity information.

In the event that a wireless device is unable to group with another wireless device with which it is instructed to group/pair with (e.g., due to a RF path problems), the wireless device may group with yet another wireless device in an ad-hoc fashion. If no wireless device is pairable with the wireless device, it may rely on its own geographic and/or and sensor information to report to the network.

When a wireless device 102 is undetected as being within a given proximity of a grouping radius, other wireless devices in the same group as the wireless device 102 may be informed of the decision to degroup/depair them from the wireless device 102. In an embodiment, the system may be configured so that an approval from the incident commander or user is required before the mobile is degrouped/depaired. In an embodiment, this may be achieved may transmitting a signal to a wireless device of the incident commander or user requesting approval, to which the incident commander or user may send a reply approving or disapproving of the request to degroup/depair. In an embodiment, the degrouping/depairing process may be transparent to the wireless device users.

In the event that a wireless device is unable to communicate with the network, the wireless device may send telemetry information pertaining to location services (and other telemetry information) to a grouped wireless device for relaying to the network.

In an embodiment, polling for information may be performed once the network has lost communication with the wireless device. Wireless devices that are known to be grouped to the wireless device may be instructed to communicate with the disconnected mobile even when it is trying to reacquire the network. A logical sequence based on proximity, signal quality to the network, and/or battery strength may be used to determine which wireless device may be used as a relay for communicating with the network.

The relayed telemetry information may include more than just positional information. For example, the telemetry information may also include bio sensor and user bio information reporting on the environment and user conditions, including heart rate and temperature, CO, O2 and other sensor information.

In an embodiment, the network may continuously measure/monitor the connected wireless devices. Knowing their location and relative location to each of the other wireless devices enables the network to continuously measure the uplink and downlink communication paths. If communication path degradation occurs and begins to fall within a defined system quality range (which may be user defined), a wireless device may be instructed to either handover to another radio access node for the same network and/or network technology, or be instructed to initiate to perform relay operations to relay communications though a defined wireless device as a secondary signal path.

In the event that a communication link is lost with the network the wireless device may attempt to acquire itself on another network. While the acquisition process is underway, a wireless device may act as a mesh device. Other wireless devices in the proximity group may also connect as a mesh network.

In an embodiment, the wireless devices may utilize dead reckoning (also called deducted reckoning) techniques to compute updated location information. Wireless devices may store the updated information for eventual relay to another wireless device which has network access or until one of the wireless devices or both devices have access to the initial network or another network and granted access to whether it is public or a private network.

Figure 7:
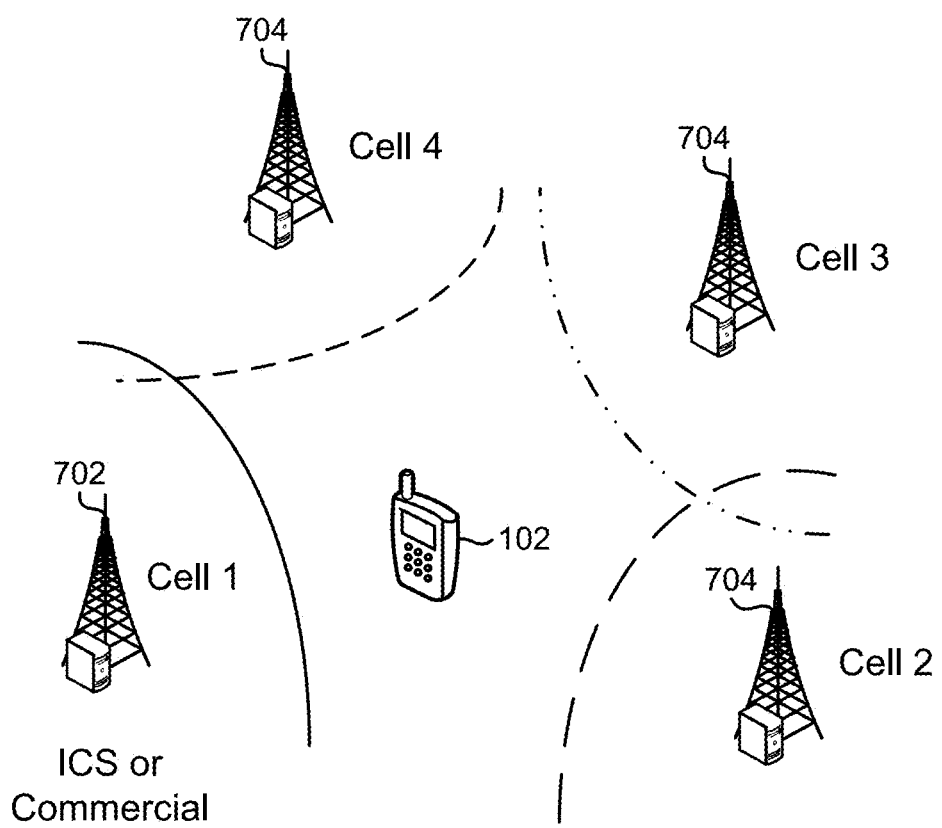
FIG. 7 is a component block diagram illustrating functional components, communication links, and information flows in embodiment method of periodically scan for cells.

FIG. 7 illustrates normal operating conditions in which a wireless device 102 may periodically scan for other cells 704, including its serving cell 903. If the radio access points are part of the network then the wireless device may report the identity and signaling information required by the existing network to determine (e.g., via triangulating and/or trilateration) the wireless device's location based on a network approach. If the wireless device detects a radio access point is not part of its preferred cell selection process, it may attempt to read the coordinates and positional information from the access point that is broadcast.

Once synched with the access point the wireless device may determine the timing difference and other requisite information to help determine its relative location and distance from the access point. This information may be related to the location system used by the wireless device to help refine its current location calculations.

Additionally the wireless device may be configured to compare each cell read to its own coordinate and using bearing and time difference for all the cells it reads. The wireless device may then triangulate on its own position.

During a 911 call a software application on the distressed wireless device may be executed. The software application may access an active neighbor list, read the overhead of each cell, and use that information to triangulate on the wireless device's own position. The wireless device may also read the time offset for each of the cells.

In this case the system begins to try and locate the distressed mobile's position with more precision an accuracy to assist First Responders with triangulating on the distressed mobile's position and sending the information to the incident commander and/or public service answering point (PSAP) with a relative distance to target indication that is updated on pre-defined intervals. If the wireless device has lost contact with the 911 center, PSAP then the last location is continuously displayed and any velocity information is also relayed to assist the first responders.

In an emergency, the wireless device 102 may be configured to send its location information to the network. The wireless device 102 may be configured to automatically send its location information in response to detecting the emergency, or may provide the user with an option to send the location information. In an embodiment, the wireless device 102 may be configured to send its location information in response to a network initiated command.

Each wireless device may become an access point (AP). The decision to be the access point may be periodically updated while still in communication with the network, or when no network is found. Upon powering up, each wireless device may act as a client, and on a pseudo random time interval, the wireless devices may become an access point and then a client.

The location based methodology may be the same for a frequency-division duplexing (FDD) and a time-division duplexing (TDD) system. However, in the event that the communication link between the wireless device and the network is lost, the wireless device may be configured to relay its telemetry information through another wireless device having network access.

In an embodiment, all information sent via wireless communication links may be digital. In an embodiment, the information may be encrypted to a requisite advanced encryption standard (AES) standards level or the appropriate encryption level needed for the requisite communication system and access method used.

Generally, the location based systems (LBS) may utilize reactive or proactive based methods. In a reactive location based system, the wireless devices may synchronously interact with each other on a time basis or some other predetermined update method. In a proactive location based system, the wireless devices may update their location information based on a set of predetermined event conditions using an algorithm. The various embodiments may include both reactive and proactive aspects, taking the best of both approaches to enhance location accuracy and precision.

Various embodiments may include location determination solutions that utilize horizontal data (i.e., a set of reference points on the Earth's surface against which position measurements are made) and/or vertical data. Horizontal data define the origin and orientation of the coordinate system and are prerequisites for referring a position relative to the Earth's surface. Vertical data are based on geoids, which primarily serves as a basis to determine the height of a position relative to mean sea level for which the geoids act as a benchmark for origin and orientation. Various embodiments may utilize horizontal and vertical data to provide/generate enhanced three-dimensional location information. The horizontal and vertical data can be global, national, local or custom depending on the locality and positioning reference system utilized.

Traditionally global data are used for position location as compared to a local datum. Global data are used for initial position fixing if possible and are based on GPS coordinates. Local data are based on a particular position on the surface of the earth, which allows for a non-GPS based location based services to take place. The various embodiments may use global data, local data, or both. In an embodiment, GPS may be used to help identify the initial positional fix, and may be augmented by dead reckoning and a hybrid trilateration solution that utilizes both network and terminal based positioning. In this embodiment, both local and global data may be used.

Generally, a hybrid lateration and trilateration solution includes a wireless device performing a measurement and sending it to the network, and a network component performing the location determination calculations. The various embodiments include a hybrid lateration and trilateration solution in which the wireless device performs the location determination calculations, with and without the support of the network components.

Various embodiments may include sensor fusion operations in which a collaborative approach is used so that the sensors do not act as individual sensors, but as a collective team. As discussed above, the wireless device may include various sensors (e.g., accelerometer, gyros, magnetic compass, altimeters, odometers, etc.) capable of generating heading, orientation, distance traveled, and velocity as part of the sensor information collected on the wireless device. In various embodiments, information collected from any or all the internal sensors may be used for improving location or positioning accuracy and/or confidence improvements. Various embodiments may compute location information based on information from multiple sensors, with or without the aid of radio frequency propagation information.

The sensor fusion operations may include the sharing of telemetry including sensor data indicating relative movement of the individual wireless device, which enables temporal readings to assist in the location estimate, either with external assistance or dead reckoning.

Figure 8:
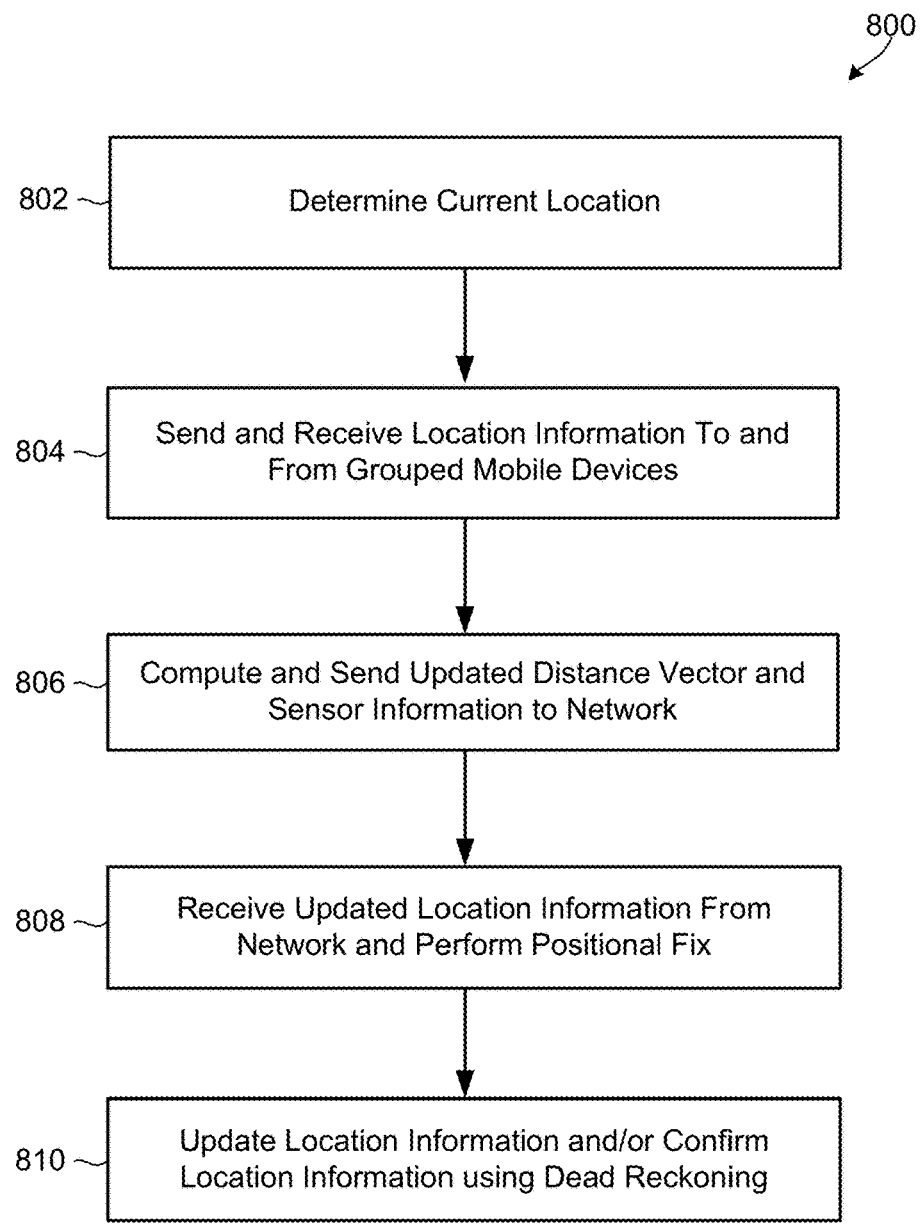
FIG. 8 is a process flow diagram illustrating an embodiment wireless device method for determining the location of a wireless device in a wireless network.

FIG. 8 illustrates an embodiment wireless device method 800 for determining the location of a wireless device in a wireless network. In block 802, a wireless device may determine its current location using any of the above mentioned location determination solutions. In block 804, the wireless device may share its location information with other grouped wireless devices and/or receive location information from other grouped wireless devices. In block 806, the wireless device may compute and send updated distance vector and sensor information to a network component for improved positional fix. In block 808, the wireless device may receive updated location information from the network component, and perform its own positional fix based on mobile data information received from the network. In block 810, the wireless device may update its location information and/or confirm its location information using dead reckoning to enhance positional accuracy.

Dead reckoning may provide the needed positional corrections as a local datum method for positioning when GPS or other network related positioning solutions are not available. Additionally, dead reckoning may enhance the location position accuracy and precision calculations by providing additional horizontal and vertical datum comparisons.

With dead reckoning, the current position may be deduced (or extrapolated) from the last known position. The dead reckoning accuracy requires a known starting point which either can be provided by the network, GPS, near field communication link, RF beacon, or via another wireless device.

A dead reckoning system may be dependent upon the accuracy of measured distance and heading, and the accuracy of the known origin. However, the problem with relying on dead reckoning alone to assist in positional improvement is error accumulation caused by sensor drift (i.e., differences or errors in values computed/collected from one or more sensors). In particular, magnetic, accelerometers and gyroscopes are susceptible to sensor drift. The error accumulation for any of the sensors may increase over undulating terrain, as compared to flat terrain. Bias error and step size error are leading contributors to dead reckoning errors.

Various embodiments may tightly couple the wireless device sensors and continuously recalibrate the sensors to reduce any drift problems caused by unaided dead reckoning. Additionally, as part of the tightly coupling the sensors, any bias drift associated with the sensors (e.g., a gyroscope) may be address by utilizing a Kalman filter to reduce the errors from the primary and/or secondary sensors (e.g., gyroscopes).

In various embodiments, the wireless device may be configured to include velocity computations as part of the location determination computations to account for position changes that occur. When a GPS signal is available, the step size (via velocity computation) and compass bias errors may be estimated by an enhanced kalman filter (EKF). Additionally, if GPS is available, the compass may also be able to identify slow motion changes due to changes in magnetic inclination. The compass may be relied upon for motion computations in addition to that of accelerometers and gyroscopes, with and without the availability of GPS.

Dead reckoning accuracy degrades with time, requiring regular position updates or positional corrections. Therefore, the wireless device may be configured to not only use its own internal sensors to compute the location/positional information, but may also communicate with other wireless devices to leverage their location/positional information to enhance its own location/positional information. In essence, the wireless devices may act as RF base stations, providing the lateration capability to improve the positional accuracy of other wireless devices.

In an embodiment, a wireless device may be configured to poll one or more other wireless devices to gain a better positional fix on its location.

Wireless devices may be grouped together, either through assignment by the network or through the wireless device acquiring/detecting/connecting to other wireless devices (which may or may not be in the same network) as part of a discovery method for sharing location information.

Location information may be shared via the use of a near field communications system (e.g., Bluetooth®, ultrawideband, peanut radios, etc.), infrared, ultrasonic, and other similar technologies, such as via the use of WiFi. The wireless communications may also be ad hoc or infrastructure based, or based on a TDD system, such as LTE, SD-CDMA, TD-CDMA, or any other TDD methods.

In an embodiment, the wireless device may be configured to initiate the sharing of location/position information in response to receiving a network-driven grouping request from a network component.

In an embodiment, when the wireless device has lost contact with the network, it may attempt to find a suitable wireless device to help in its location determination computations, and for possible connection to the network (e.g., via a relay).

In an embodiment, the wireless device may be configured to send a request for location information to another wireless device. The request may be sent after the authentication process between wireless devices, and may include a time stamp which may be sub-seconds in size (milliseconds). Another wireless device may respond with a message that also has its time stamp and when it received the time stamp from the initiating wireless device.

Several messages (e.g., three messages) may be exchanged quickly between the wireless devices to establish time synchronization and share location/positional information that includes x, y, and z coordinates and a velocity component in each message. The time differences along with the x, y, and z coordinates may be compared with possible pulses or pings to establish an estimated distance vector between the devices.

When the distance vector and the x, y, z coordinates of two wireless devices are known, a point-to-point fix may be established. This process may be repeated for all the wireless devices in a group that has been assigned or created by the wireless device itself. Having multiple distance vectors from other points to the mobile may enhance the positioning accuracy.

A wireless device may be configured to report back to the network location server the distance vectors it has found between different mobiles. The other wireless devices also involved with the positioning enhancement may also report their distance vectors to the network to have their overall position accuracy improved as well.

The positional accuracy is meant to be done in incremental steps and the process may continue until no more positional improvements may be achievable. The positional accuracy improvement threshold may be operator defined, and may be stored in a wireless device memory.

When collecting the distance vectors and other positional information, if the error in position is greater than x % for a lower positional confidence level then no update may be required. As the wireless device receives other sensor data and more than a pre-described distance in any direction or a combined distance vector than the positional update process begins again. However, if the x % of positional confidence level is less than desired, additional positional updates may be made with the wireless devices grouped together in an interactive process to improve the confidence level of the positional information.

It is important to note that typical positional location methods that are used currently by the network are not necessarily replaced with above-described positional laterasion. Instead, the hybrid lateration method may be used in various embodiments to augment the positioning accuracy and confidence for network based position request due to boundary changes or paging requests or other position/location triggered events.

Figure 9A:
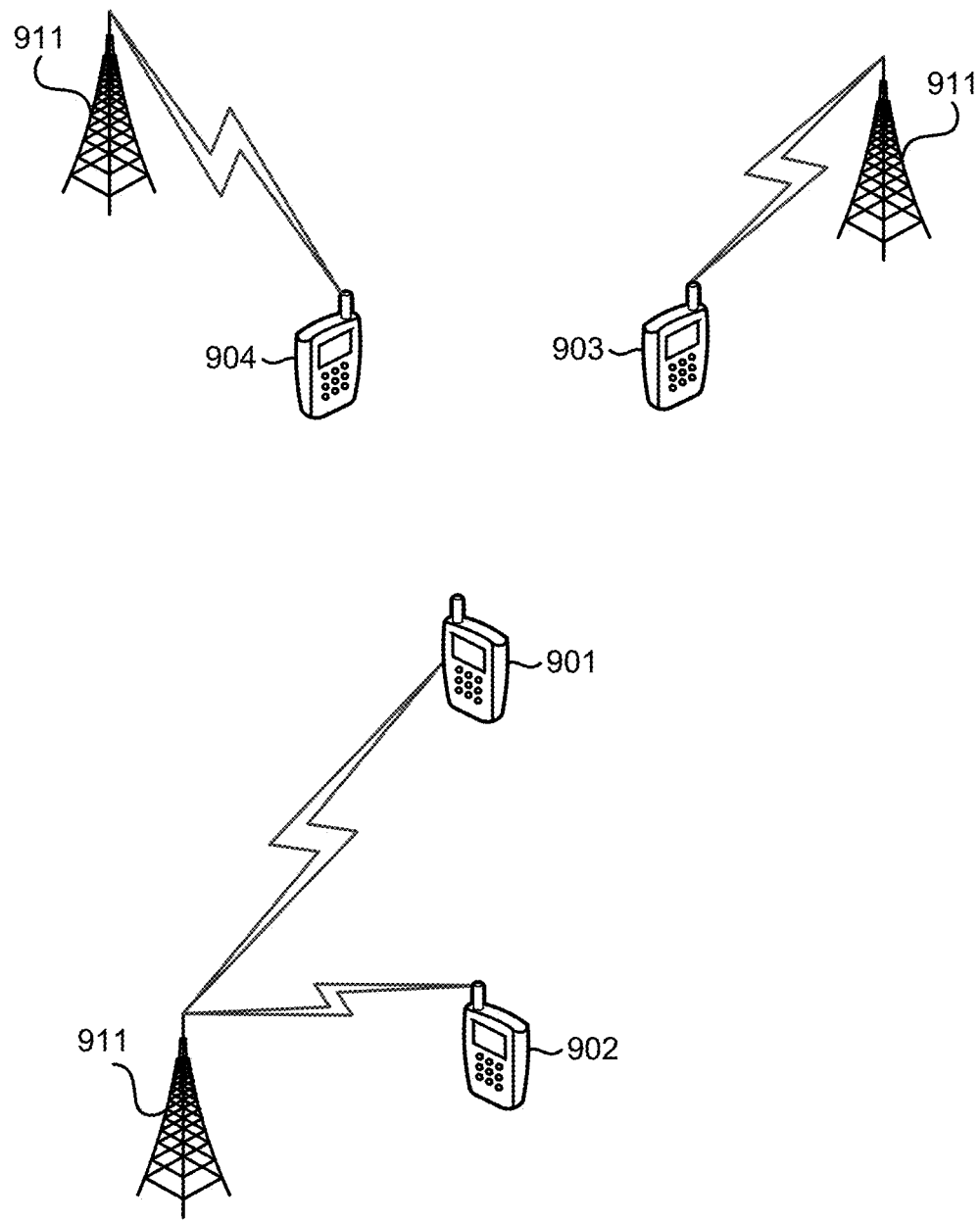
FIGS. 9A-9E are component block diagrams illustrating various logical and functional components, information flows and data suitable for use in various embodiments.

FIGS. 9A-9E illustrate various logical components, information flows and data suitable for use in various embodiments. FIG. 9A illustrates that wireless devices 901, 902, 903, and 904 are communicating with the wireless network via multiple cell sites/radio access points/eNodeBs 911. The wireless devices 901, 902, 903, and 904 may compute a relative fix on their initial location using any of the location determination solutions discussed above. A first wireless device 901 may be instructed to find and communicate with the other wireless devices 902, 903 and 904, and/or any or all of wireless devices 902, 903, and 904 may be instructed to communicate with the first wireless device 901. The wireless devices 901, 902, 903, and 904 may be grouped together (e.g., via one of the grouping methods discussed above). The network may also designate one of the wireless devices 901 (e.g., a wireless device having a high position confidence) to be used as the reference or beacon for the other wireless devices 902, 903, and 904 within the group of wireless devices 901, 902, 903, and 904.

Figure 9B:
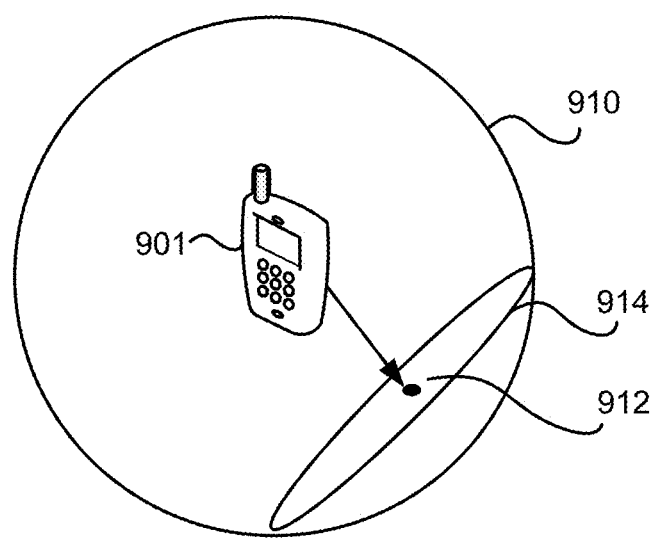

FIG. 9B illustrates that a combination of circular and hyperbolic trilateration operations may be performed as part of an embodiment location determination solution. For example, if any of the coordinate data provided by the sensors and/or wireless devices is in latitude and longitudinal coordinates, it may be converted to Cartesian coordinates to facilitate a hybrid lateration calculation. In the example illustrated in FIG. 9B, the wireless devices 901 has been designated as reference wireless device, reference number 912 identifies the position to be determined/computed (i.e., with a high level of accuracy) with respect to wireless device 901, reference number 910 identifies a three dimensional sphere that encompass the wireless device 901, and reference number 914 identifies an area of the three dimensional sphere (with x, y, and z coordinates) within which the device exists.

Figure 9C:
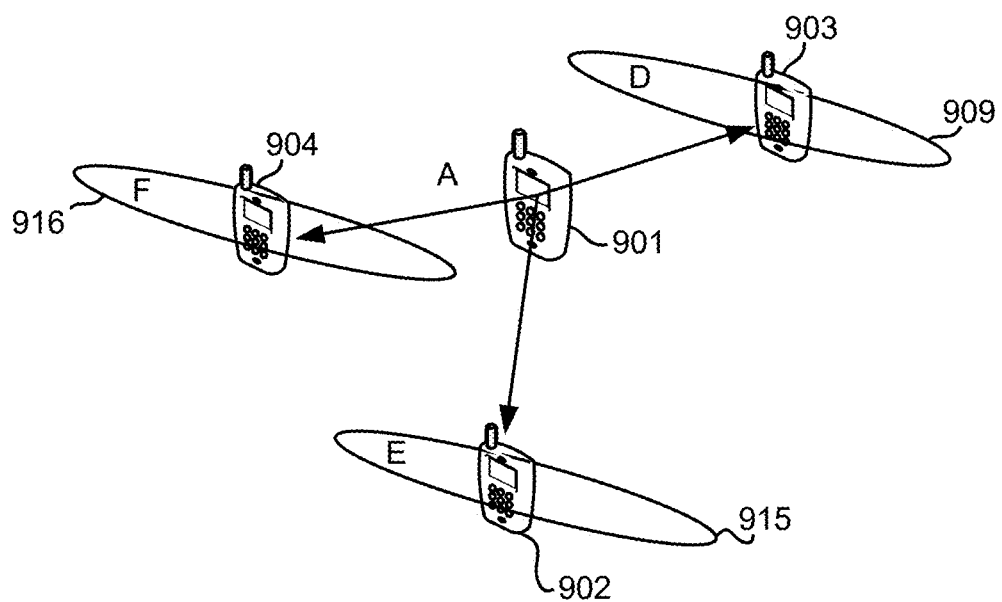
Figure 9D:
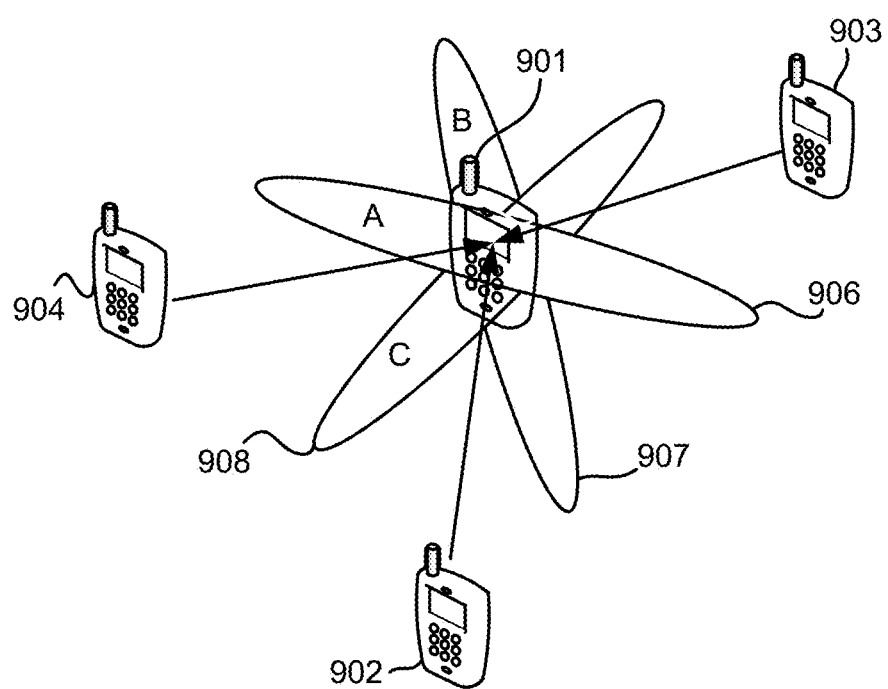

FIG. 9C-9D illustrate that distance vectors may be computed between the wireless devices 901, 902, 903, and 904 as part of an embodiment location determination solution. In FIG. 9C mobile 901 using the hybrid trilateration method determines its relative position with respect to wireless devices 902, 903, and 904 respectively. Additionally, reference numbers 915, 909, and 916 identify the relative areas of wireless devices 902, 903, and 904, respectively. As part of the hybrid trilateration operations of the embodiment location determination solution, wireless devices 902, 903, and 904 may locate wireless device 901, and the wireless device 901 may compute a distance vector between itself and wireless devices 902, 903, and/or 904. The wireless device 901 may initiate communications with wireless device 902 (although wireless device 902 could initiate the communication) and exchange time stamps, positional information, sensor data. The same process may occur with respect to wireless devices 904 and 903, in which positional and sensor information is exchanged.

As illustrated in FIG. 9D, the wireless devices 902, 903, and 904 may establish a distance vector between themselves and wireless device 901. The same process may occur with respect to wireless devices 902, 903, and/or 904, in which positional and sensor information is exchanged. Where wireless device 902 undergoes the same process as that done with wireless device 901 as part of the hybrid trilateration process, wireless device 901 may use mobiles 902, 903, 904 to enhance it positional information and wireless device 902 may use mobiles 901, 903, and 904 to enhance its positional information, and so forth for all the wireless devices that are grouped together.

The three circles or ellipses 909, 915, and 916 illustrated in FIG. 9C and the three circles or ellipses 906, 907, and 908 illustrated in FIG. 9D do not intersect at a given point, but span an area of a particular size depending on the range involved.

Figure 9E:
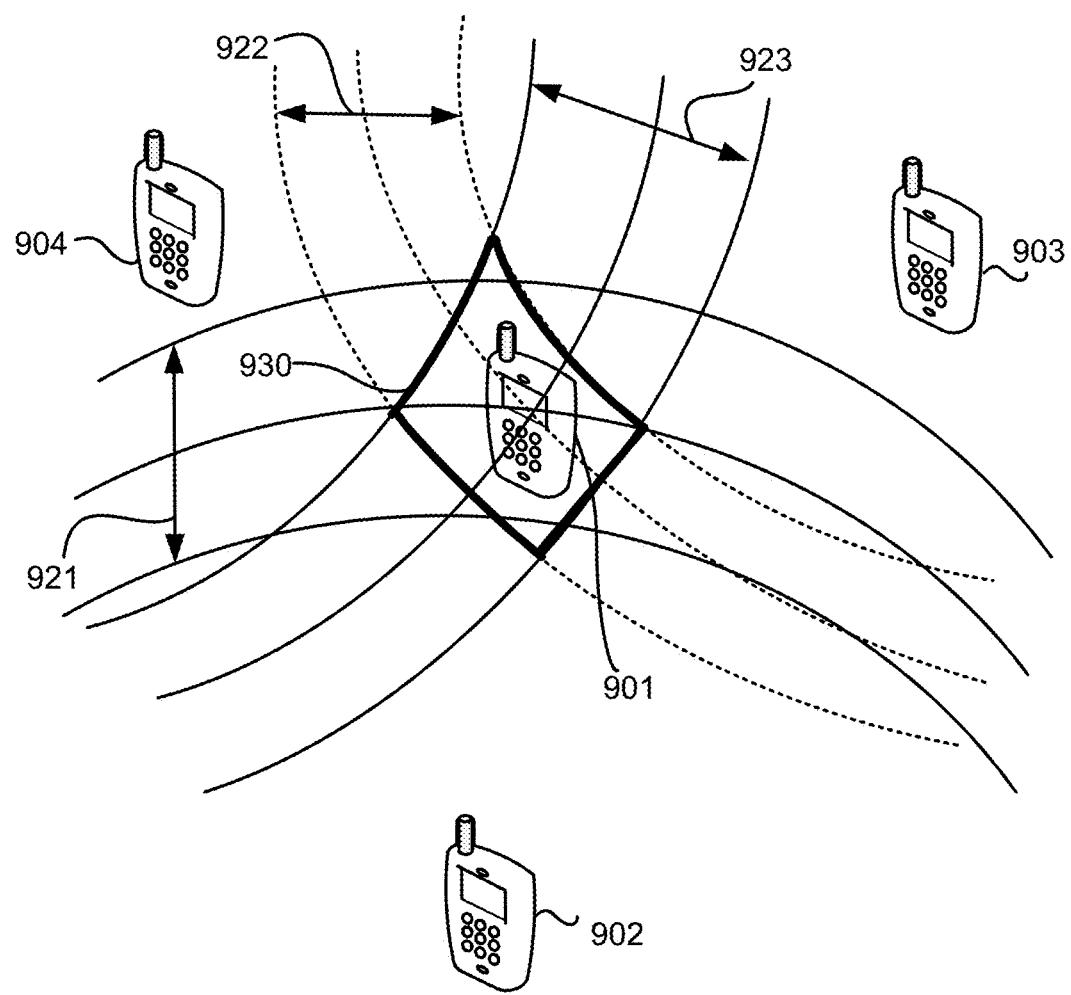

FIG. 9E illustrates an embodiment hybrid trilateration method in which the position of wireless device 901 is validated or improved upon. As part of the hybrid lateration method, a separate calculation operation may be required for each x, y, and z coordinates, in addition to accounting for velocity. However, the ability to have three wireless devices 902, 903, and 904 locate wireless device 901 may present an error window (or an error area) for each coordinate plane represented by reference number 930. The error window/area may be a combination of range errors from the wireless devices 902, 903, and 904. Contributing to the error window/area is the hybrid range errors illustrated by reference numbers 921, 922, and 923, where: reference number 921 is the hybrid range error associated with wireless device 902; reference number 922 is the hybrid range error associated with wireless device 903; and reference number 923 is the hybrid range error associated with wireless device 904. Additionally this process can be done with less or more wireless devices than used in the above example.

For each axis (x, y, or z), a similar process occurs where the error area 930 is a combination of determining the range between the other wireless devices and wireless device 901. The hyperbolic lateration is a typical calculation method used in location based systems and is based on the principal that the range between two locations is the same. However the range determined for the points may not be constant since both can be moving toward, away or together at a similar velocity and trajectory.

With the hybrid lateration method proposed a corrective distance vector $\Delta x$, $\Delta y$, $\Delta z$ is used that can be used to apply to the estimated position.

The three circles or ellipses 909, 915, and 916 illustrated in FIG. 9C and the three circles or ellipses 906, 907, and 908 illustrated in FIG. 9D do not intersect at a given point, but span an area of a particular size depending on the range involved. Therefore range is "r" and is denoted by the subscript representing the distance vector involved. Thus: $r=p_i+error$.

The pseudo range $p_i$ deviated from the actual range in any axis due to the inaccuracy in synchronization or propagation in a multipath environment or due to sensor induced errors. Where the distance vector accounting for change in direction is: $r_i=\sqrt{(X_i-x)^2+(Y_i-y)^2+(Z_i-z)^2}$.

Three range calculations are then averaged to determine the distance vector that is used. If the previous range calculation $r_j$ as compared to that of the current calculation has an error in excess of a user defined percentage or variance then the new measurement is disregarded. Included with the distance vector validation may be the fusion sensor information where expected position vector calculated may be included for the confidence interval. Range difference=$d_{ij}=r_i-r_j$.

An iterative process may be used for position improvement, which may include the use of a least squares calculation fit to approximate the position solution in a step wise basis. The process may continue until the range difference measured does not produce any noticeable accuracy improvement, which may be user-defined, either at the wireless device or network or both.

The multi-lateration calculations may include estimating a location of a wireless device based upon estimated distances to three or more measurement locations (i.e., locations of three other wireless devices or wireless transceivers). In these calculations, the estimated distance from a measurement location (location of another wireless device) to the wireless device may be derived from the measured signal strength. Since signal strength roughly decreases as the inverse square of the separation distance, and the transmission power of the wireless device can be presumed, the distance $d_i$ can be simply calculated as: $d_i=\sqrt{(S_O/S_i)}$ where: $d_i$ is the estimated separation distance between a measurement location and the wireless device; $S_i$ s the measured signal strength; and $S_O$ is the strength of the signal transmitted by the other wireless device.

Alternatively, the signal strength readings may be translated into distances using a path loss model, such as the following: $RSSI_i = a - cb \log_{10}(d_i)$ where: a is the signal strength at $d_i=1$ meter; b is the path loss exponent; and c is the pathloss slope with 20 being used for free space.

The lateration operations may include performing a least squares computation, which may accomplished by a processor calculating the following formula:

$$\min_{(x,y)} \Sigma(d_i - \|MS_i - (x,y)\|)^2$$

where:
$d_i$ is the distance calculated based on a measured signal strength value;
$MS_i$ corresponds to the known location/position of the wireless device; and
the minimization value of (x, y) is the estimated position of other wireless devices.

Figure 10:
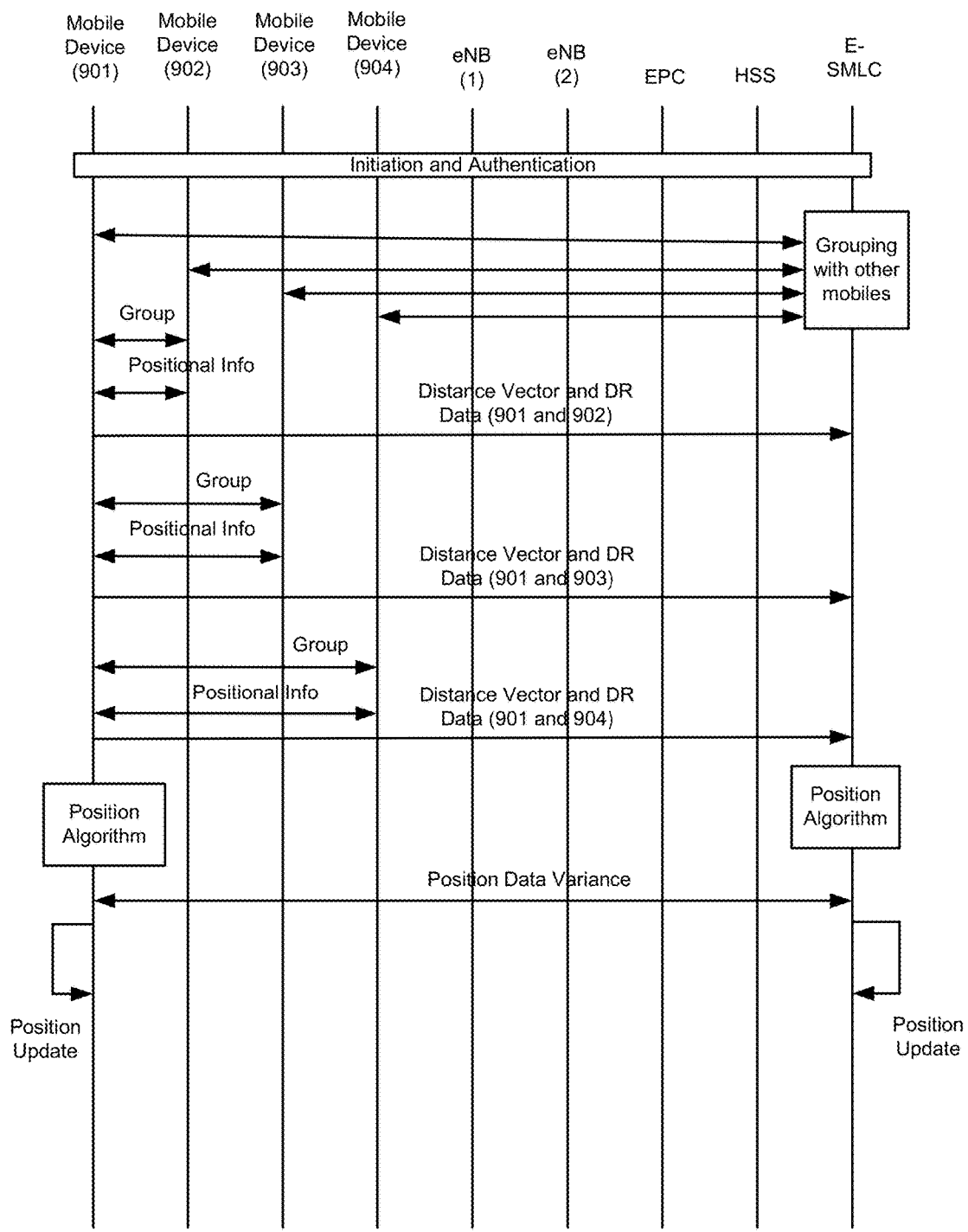
FIG. 10 is a sequence diagram illustrating an embodiment hybrid lateration method by which wireless devices may gain access to the network.

FIG. 10 illustrates an embodiment hybrid lateration method 100 in which wireless devices may gain access to the network. The wireless devices may be instructed to be grouped by the network. Wireless devices 901 and 902 may initiate sharing of information for position location, either due to the network driven grouping request or when the wireless device has lost contact with the network and attempts to find a suitable wireless device to help in its position location and possible connection to the network via a relay or to another network.

Wireless device 901 may send a request for position information to wireless device 902. The information may be sent after the authentication process between wireless devices, and may include a time stamp. The time stamp may be sub seconds in size (e.g., milliseconds). The wireless device 902 may respond with a message that also has a time stamp, and timing information pertaining to when the wireless device 902 received the time stamp from wireless device 901. Three messages may be transferred quickly to establish time synchronization. The time differences may then be compared, along with possible pulses or pings, to establish an estimated distance vector between the wireless devices. Knowing the distance vector and the x, y, and z coordinates of both 901 and 902, a point-to-point fix may be established.

The wireless device 901 may then initiate communication with wireless devices 903, 904 and repeat the operations discussed above with respect to wireless device 902 for each of wireless device 903, 904. After obtaining two or more distance vectors along with positional information, the wireless device 901 may compare the new coordinates to its previously computed current location, and adjust the location computations accordingly.

The positional information distance vectors may be sent to the network for positional processing with other network positional information. Based on the position calculated for the wireless device, the network (i.e., a component in the network, such as a network server or E-SMLC) may instruct the wireless device to adjust its positional information.

Additionally the wireless device 901 may also make a positional correction if the network does not respond in time, which may result in a message update time out. Alternatively, when the network cannot make the necessary correction, and the positional information may be used by another component and/or other wireless devices to perform the necessary corrections.

If the error is greater than x % for a lower positional confidence level then no update is required. As the mobile receives other sensor data and more than a pre-described distance in any direction or a combined distance vector than the positional update process begins again. If the x % of positional confidence level is less than desired, additional positional updates may be made with the grouped wireless devices (e.g., iteratively) to improve the confidence level of the positional information. Additionally if the positional information from one of the wireless devices that is being attempted to obtain a distance vector appears to be in error, then that wireless devices data may be selected to not be used for this iterative step of performing positional updates with other grouped wireless devices. However it may continue to be queried as part of the process since its position location could be corrected in one of the steps it is taking to improve its position location as well.

Additionally, in the event that one or more wireless devices lose communication with the core network it may still be possible to maintain position accuracy through one of the other grouped wireless devices. It may also be possible to continue to maintain a communication link by establishing a network relay connection with another of the wireless devices in the same group which still has communication with the network itself.

Figure 11:
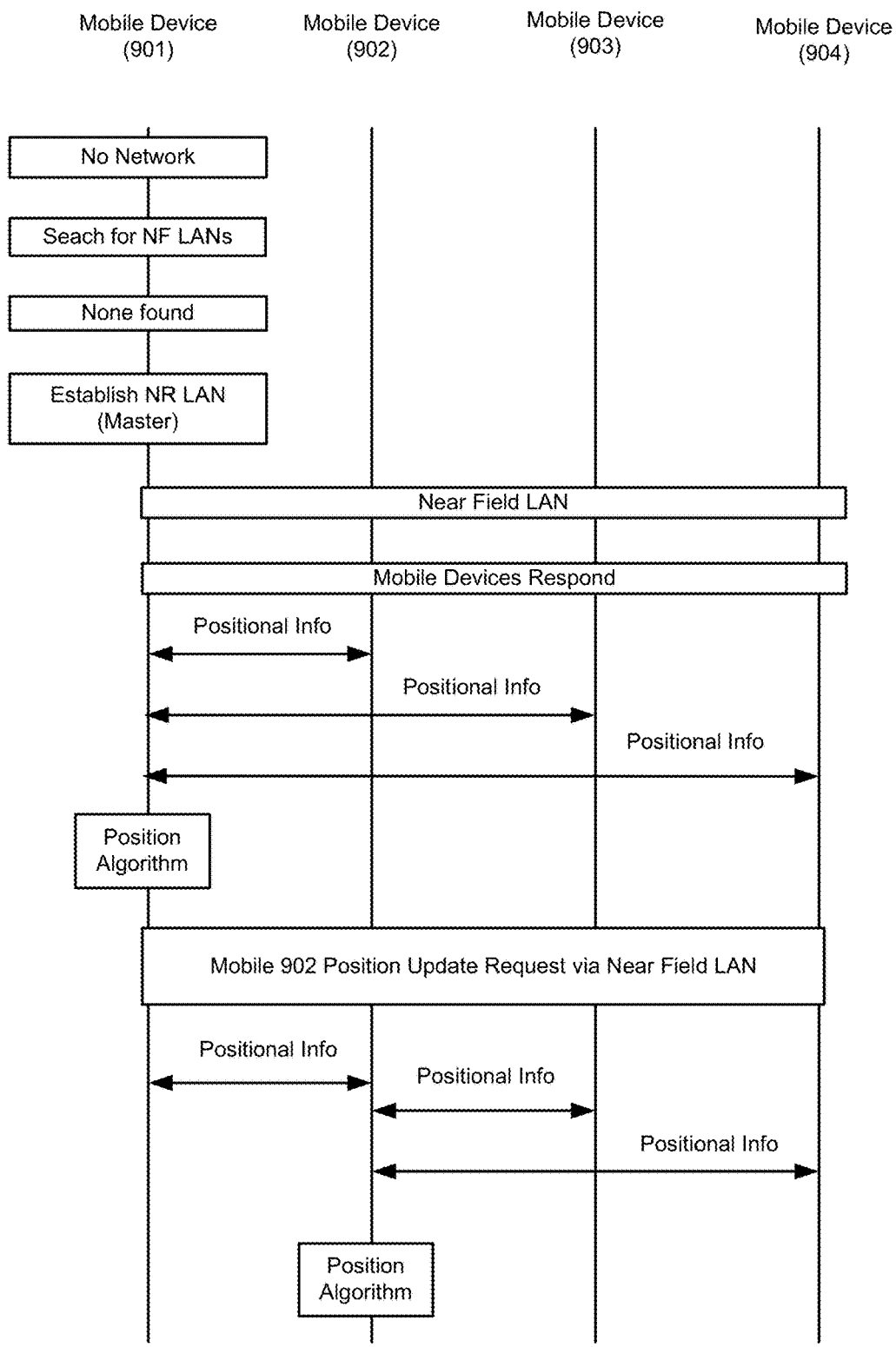
FIG. 11 is a sequence diagram illustrating another embodiment hybrid lateration method in which a wireless device cannot locate a network due coverage problems.

FIG. 11 illustrates another embodiment hybrid lateration method 100 in which a wireless device cannot locate a network due to coverage problems. The wireless device 901 may operate in an autonomous mode and attempt to locate another wireless device. The other wireless device could be used to relay information to the network and possibly set up a near field communication bridge in addition to providing location enhancement capability.

In the example illustrated in FIG. 11, wireless device 901 establishes a near field LAN inviting other wireless devices in proximity to communicate with it. Positional information can then be shared and the wireless device 901 can have its location improved and the positional information can be relayed back to the core network via another wireless device.

The wireless device 901 may also communicate its positional information and establish near field communication link with a wireless device that is not part of the home network associated with wireless device 901.

The wireless devices may have the USIM, SIM, PRL or access point information pre-built in. The wireless device for first responders may have the incident radio system set as their preferred system, or in the case that the radio access system being used as a public safety network.

For first responders to utilize a wireless mobile network (e.g., LTE) the position location information accuracy needs to be improved for in building environments in addition to providing more accurate location information about where the wireless devices are actually located. Whether the wireless device is used by a first responder, commercial cellular user, or a combination of both.

The positional location improvement for first responders may be helpful to improve situation awareness, improved telemetry and overall communication with the incident commander. Since all incidents for first responders tend to be fluid, the ability to account for a dynamic environment of wireless devices coming into and out of the incident area. In addition, the wireless devices proximity location to other wireless devices can and may change as the incident situation changes where resources are added and/or reassigned as the need arises for operational requirements.

The use of network and terminal driven position enhancement techniques previously discussed may be exploited. The grouping of wireless devices may be done either as part of pre-plan, with intervention by the incident commander or driven from the commercial wireless network, public safety wireless network, or local incident communication system (ICS) 1204 based on reported proximity of the wireless devices.

Figure 12A:
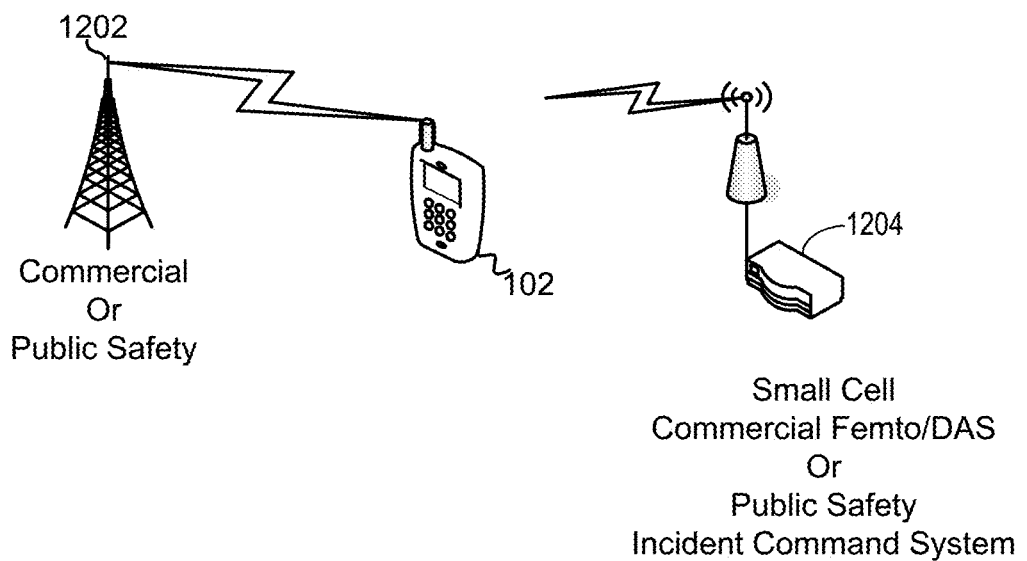
FIGS. 12A-12C are component block diagrams illustrating functional components, communication links, and information flows in an embodiment method of transferring a connection from a local radio system to the small cell system.

FIG. 12A illustrates that upon arriving at the incident scene, a wireless device 102 may recognize the existence of a local radio network 1202. If there is no ICS radio network 1204 with which the wireless device may connect, the wireless device 102 may continue to communicate via a commercial or other wireless network, 1202.

Figure 12B:
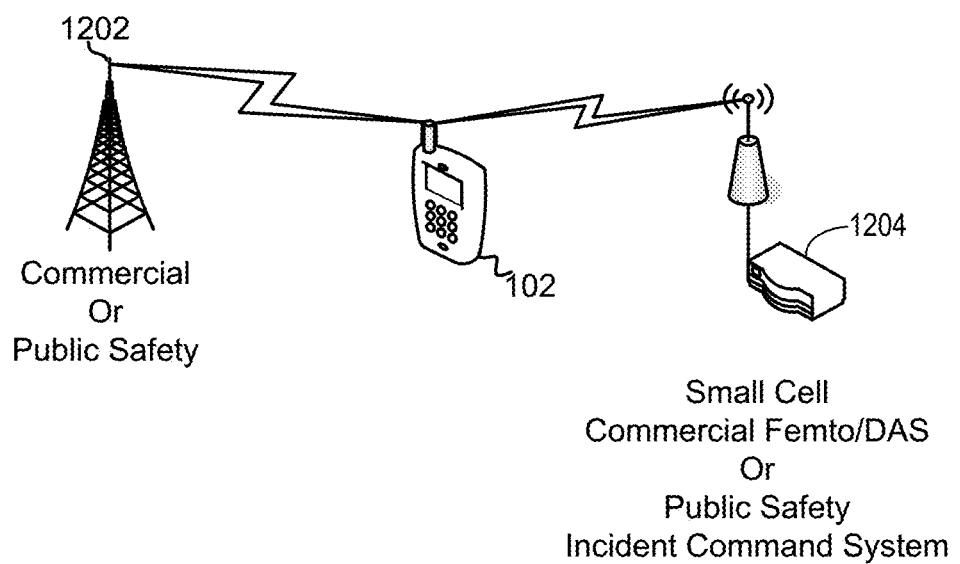

FIG. 12B illustrates that the wireless device 102 may determine that there is a valid local radio system 1202 with which it may communicate, and may have a priority access to small cell system 1204 based on a preferred network and cell selection process the wireless device 102 has been instructed to use.

Figure 12C:
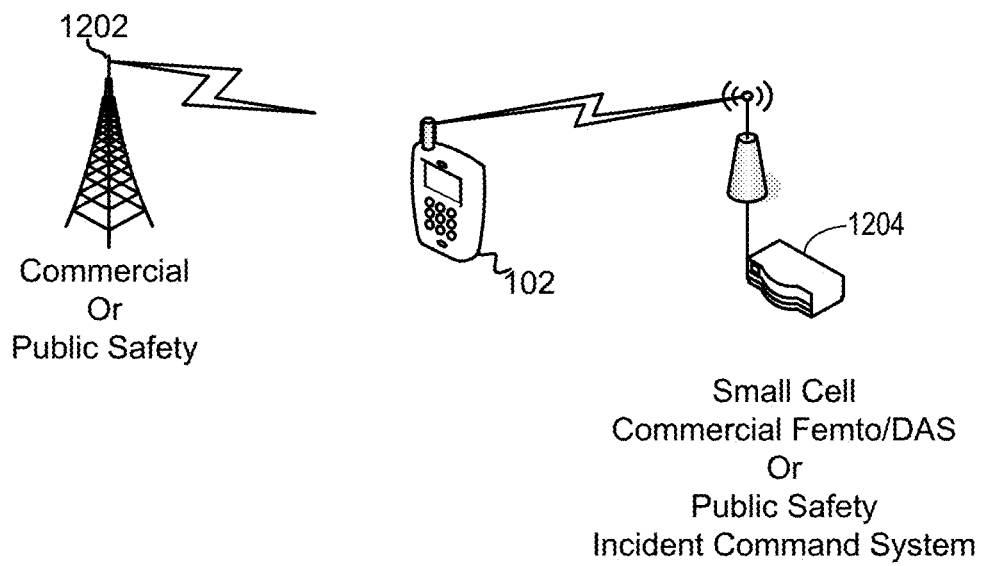

FIG. 12C illustrates that the wireless device 102 may transfer the connection from the local radio system 1202 to the small cell system 1204.

For first responders when a situation arises that requires finding a man down or responding to an emergency call (911) the location based process can be used to help in the search and rescue of the person.

Figure 13A:
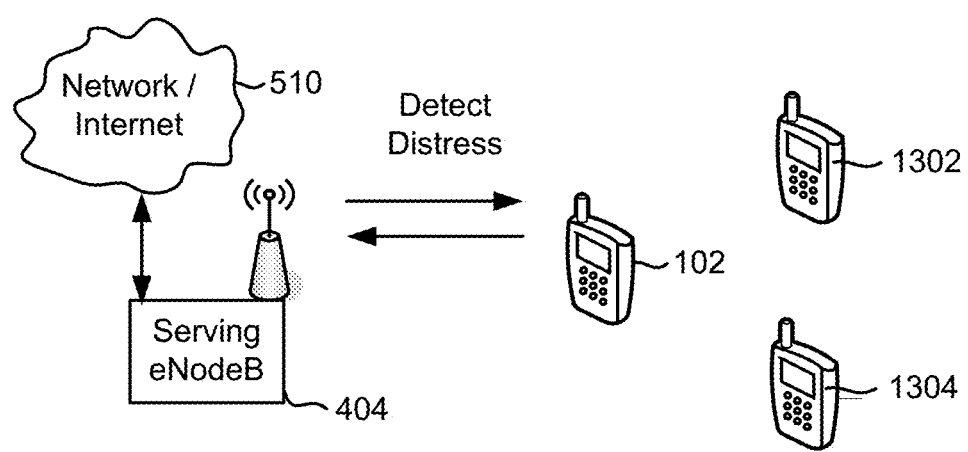
FIGS. 13A-13C are component block diagrams illustrating functional components, communication links, and information flows in an embodiment method of identifying and responding to a distressed wireless device.

FIG. 13A illustrates that the wireless device 102 may be identified by the network as being in distress via network monitoring of the wireless device 102 or via the wireless device transmitting a distress signal. The distressed wireless device 102 may determine that it has lost communication with the network, and may instruct the wearer/user to either disable or initiate a distress signal. The wireless device 102, upon initiation of a distress signal, may begin a grouping process previously defined.

Figure 13B:
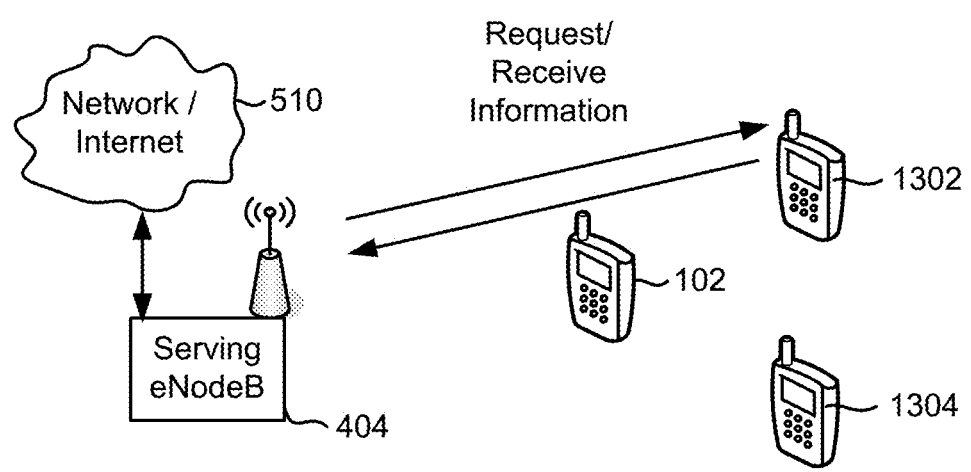

FIG. 13B illustrates that the network 510 to which the serving eNodeB 404 is connected to may instruct a wireless device 1302 in the same group as the distressed wireless device 102 to report the last known location of the wireless device 102 and time stamp.

Figure 13C:
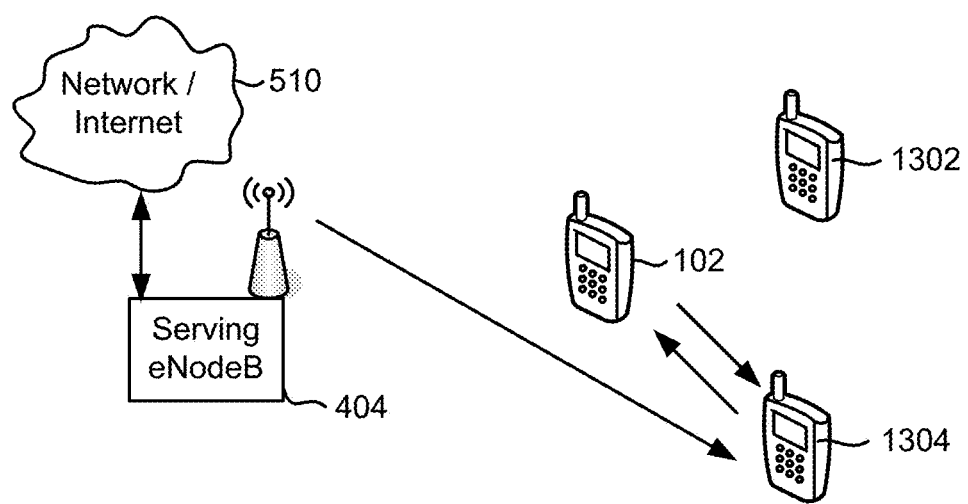

FIG. 13C illustrates that the network 510 may instruct additional mobiles devices 1304 to attempt to group with the distressed wireless device 102.

Figure 14:
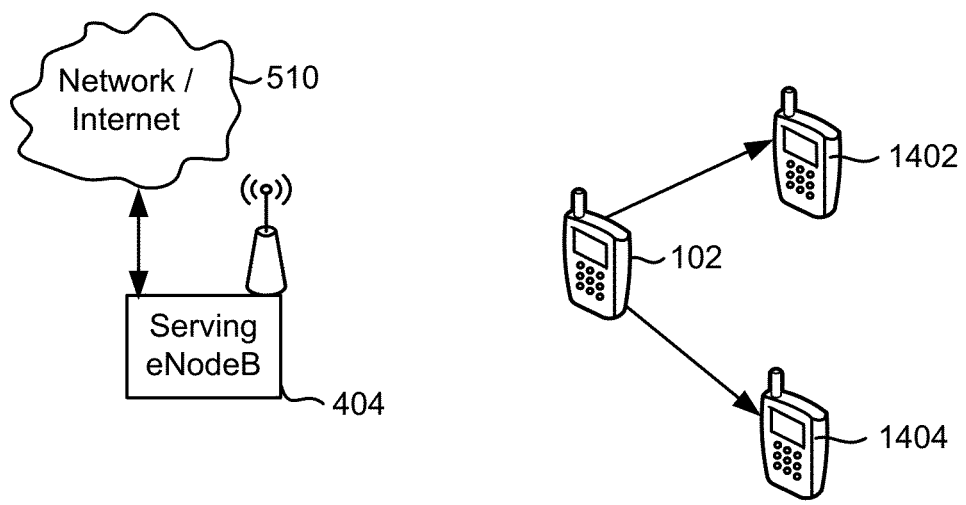
FIG. 14 is a component block diagrams illustrating functional components, communication links, and information flows in an embodiment method of performing dead reckoning grouping wireless devices in an ad-hoc scheme.

FIG. 14 illustrates that when the wireless device 102 is unable to communicate with the network 510, it may be operating under a dead reckoning process and continue to attempt to locate other wireless devices 1402, 1404 and group with them under an ad-hoc scheme.

Once the wireless device has been grouped, or is still connected to the network, the relative location of the wireless device may be sent to all the wireless devices that are in active search for that wireless device. The selection of which wireless devices may be searched may be determined by operator intervention and selection.

Figure 15:
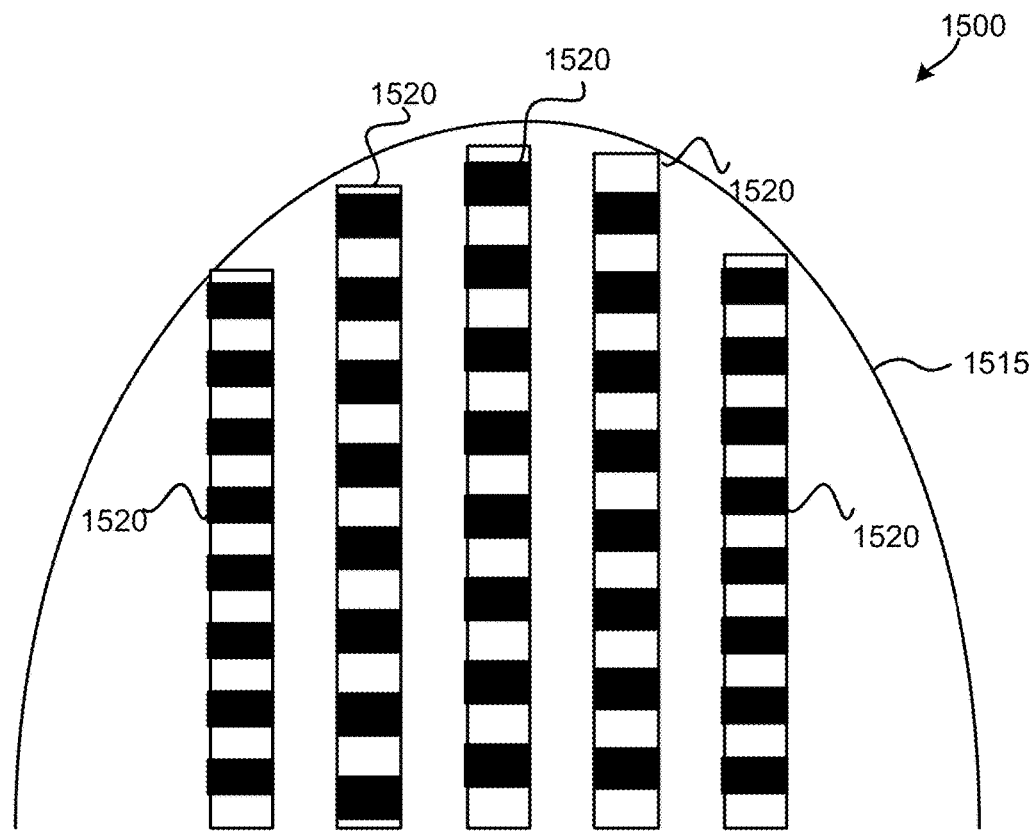
FIG. 15 is an illustration of an enhanced antenna that may be used with various embodiments to further improve positional accuracy.

FIG. 15 illustrates an embodiment enhanced antenna scheme 1500 that may be used by wireless network operators or first responders to improve the positional accuracy for the wireless device. The enhanced antenna scheme 1500 may include a radome 1515 that is curved over a series of patch antennas 1520. Several antennas 1520 may be used achieve better angle of arrival measurement. In an embodiment, the enhanced antenna scheme 1500 may include an array of antennas 1520 on flexible circuit boards so they can conform to the radome 1515.

Figure 16A:
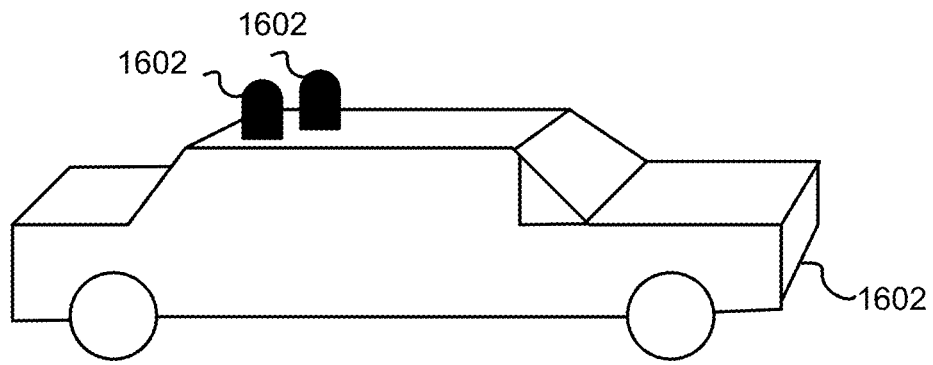
FIG. 16A-B are illustrations of various enhanced antenna configurations that may be used with the various embodiments to further improve positional accuracy.
Figure 16B:
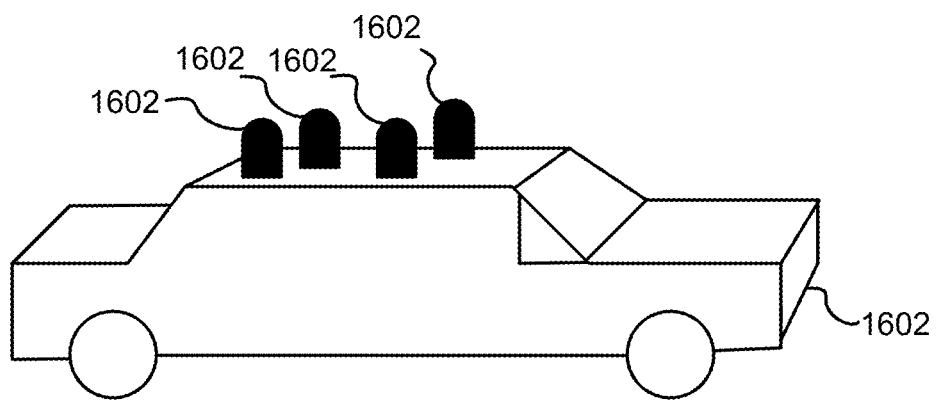

FIG. 16A-B illustrate that the above mentioned enhanced antenna scheme 1500 may be implemented on a vehicle 1602. Specifically, FIG. 16A illustrates an enhanced antenna scheme 1500 that includes two antennas 1602 for this purpose. FIG. 16B illustrates an enhanced antenna scheme 1500 that includes four antennas 1602 for this purpose. Each antenna 1602 may include an array of antennas 1520 on flexible circuit boards so they can conform to the radome 1515.

Figure 17A:
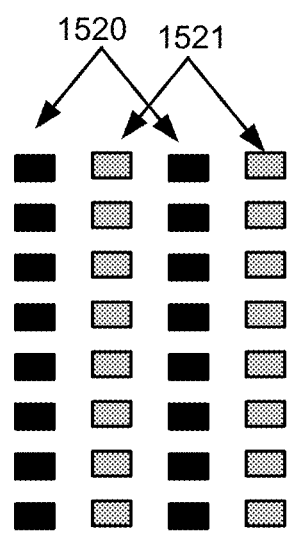
FIG. 17A-B are sectional diagrams illustrating strips of antenna patches that may be used in various embodiments.
Figure 17B:
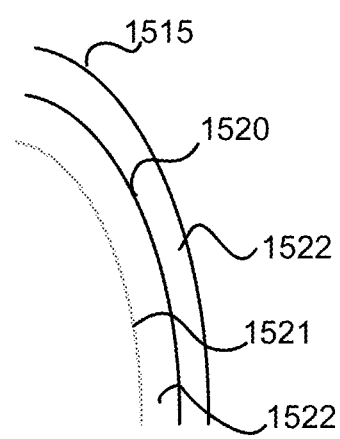

FIG. 17A-B illustrate strips of antenna patches that may be used in various embodiments. FIG. 17A illustrates two strips of antenna patches 1520 and 1521 next to each other in an antenna array (which may be on a flexible circuit board so they conform to a radome). FIG. 17B is an illustration of a cross sectional view of the radome 1515 in which the antenna patches 1520 and 1521 of the antenna array are shown layered. The antenna patch 1520 is closer to the outer radome cover 1515 than is antenna array 1521. A fiber glass or a transparent RF medium 1522 may provide rigidity and enable the antennas to be closely spaced. The antenna array may be cone shaped using a flexible circuit design (for receive only configurations). Envelope detectors may be used to determine which of the antenna patches are receiving the highest quality signal from the wireless device using an amplitude method for detection.

In an embodiment, the detection and tracking of a wireless device may be controlled so that the measurements are in-synch with an eNodeB 404 pulse request to the wireless device for positional information.

Figure 18:
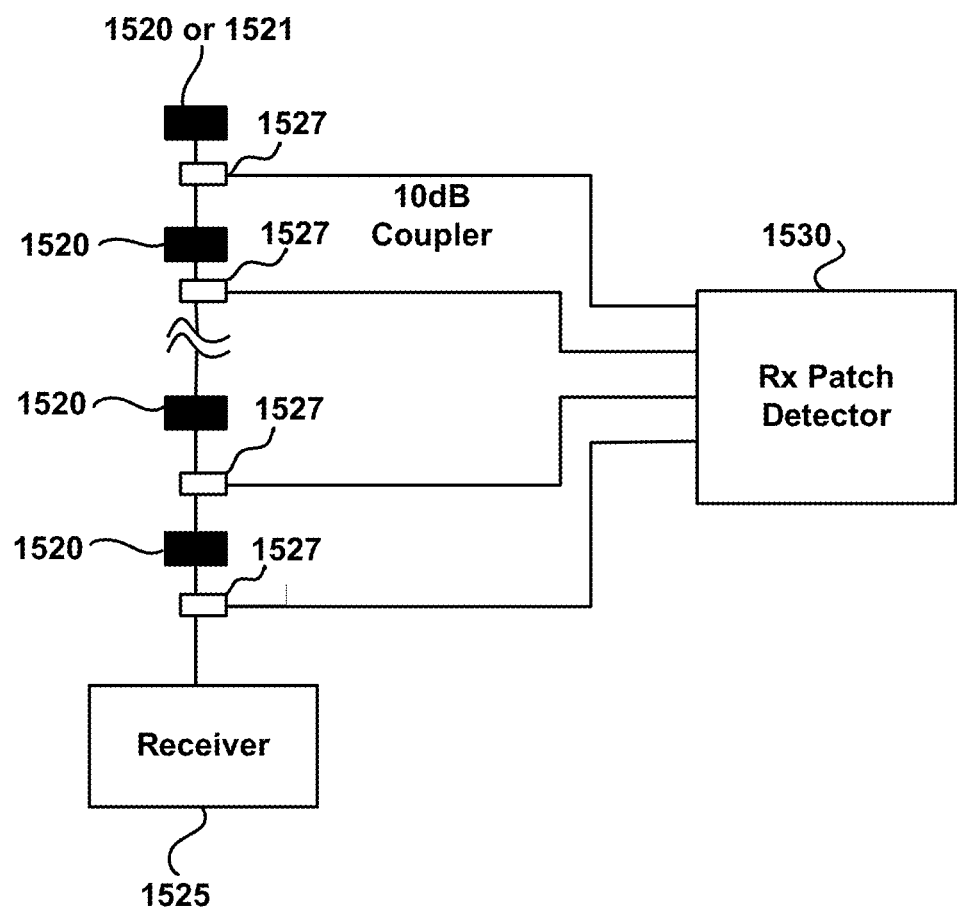
FIG. 18 is a circuit diagram of antenna system suitable for use with various embodiments.

FIG. 18 illustrates an antenna array (1520 or 1521) in which the antenna system is connected to the normal antenna port on a receiver (e.g., eNodeB) 1525. Each of the patch antennas may be matched to a 10 db coupler 1527 and configured to provide a port coupling to a receive patch detector 1530. The receive patch detector 1530 may be configured to determine which patch antenna has the strongest signal, and based on the number of patch antennas and the distance calculation, another altitude measurement may be made by the wireless device.

In an embodiment, the antenna array system may not be connected to the eNodeB receiver 1525 and control coordination may be provided by the E-SMLC for synchronization of the received signal from the wireless device.

Figure 19:
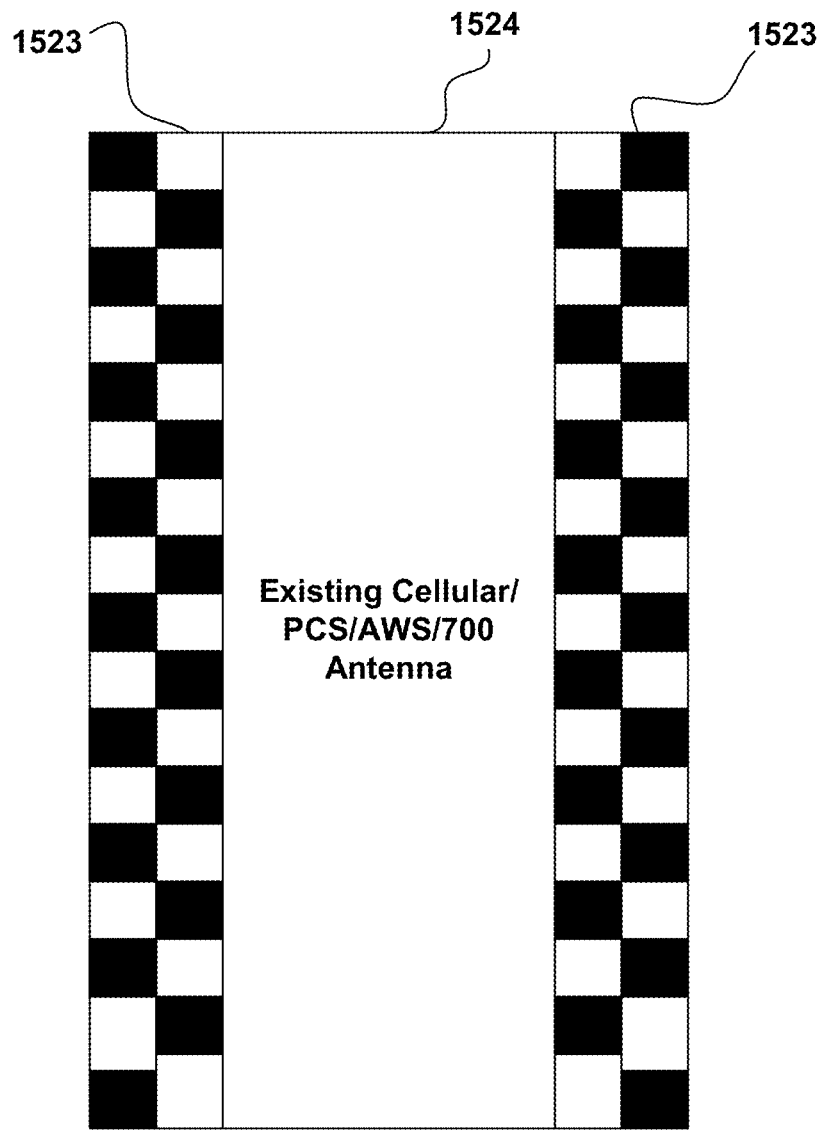
FIG. 19 is an illustration of an embodiment antenna array retrofitted into an existing cellular wireless network in accordance with an embodiment.

FIG. 19 illustrates an embodiment antenna array 1523 retrofitted into an existing cellular wireless network. The array 1523 may be installed in parallel to an existing antenna 1524. A control mechanism that is the same as or similar to the control mechanism illustrated in FIG. 18 may be used for the commercial applications.

Figure 20:
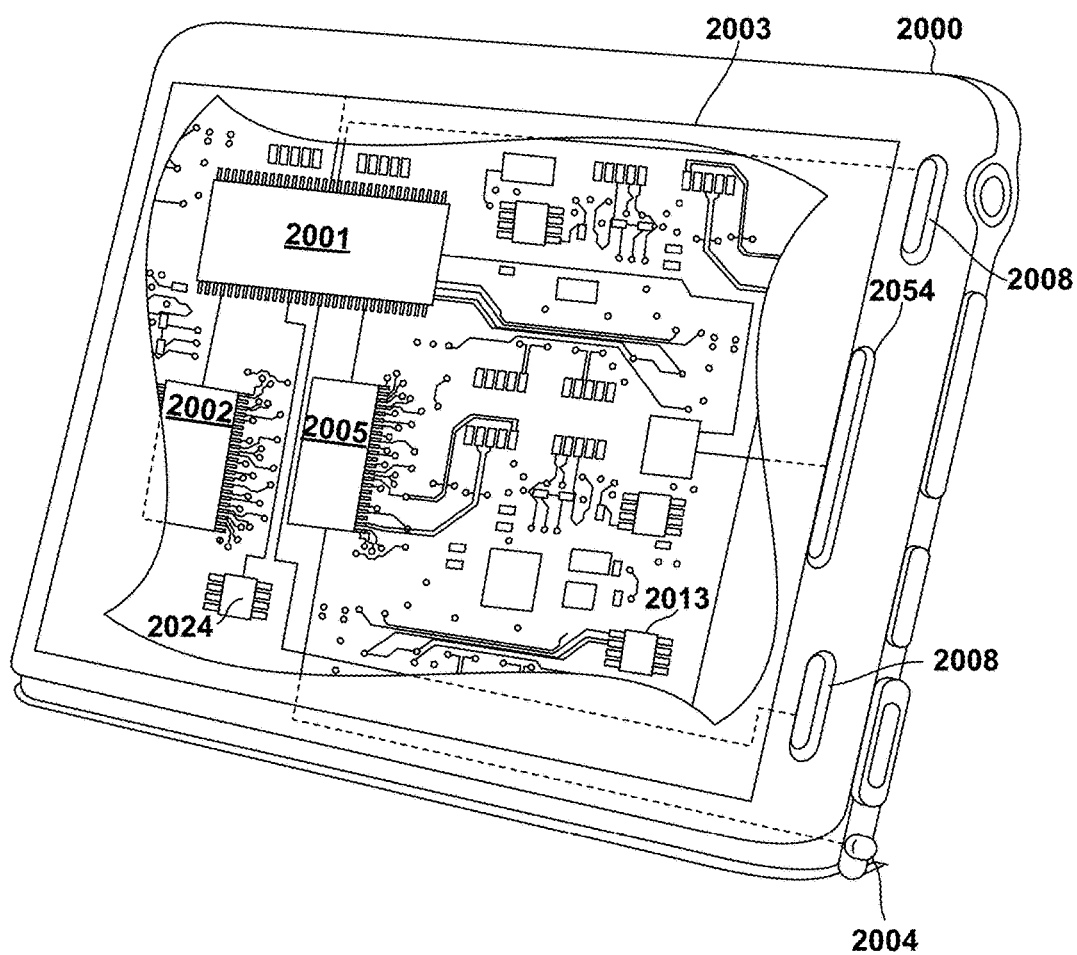
FIG. 20 is a component block diagram of a wireless device suitable for use with an embodiment.

The various embodiments may be implemented on a variety of mobile computing devices, an example of which is illustrated in FIG. 20. Specifically, FIG. 20 is a system block diagram of a mobile transceiver device in the form of a smartphone/cell phone 2000 suitable for use with any of the embodiments. The cell phone 2000 may include a processor 2001 coupled to internal memory 2002, a display 2003, and to a speaker 2054. Additionally, the cell phone 2000 may include an antenna 2004 for sending and receiving electromagnetic radiation that may be connected to a wireless data link and/or cellular telephone transceiver 2005 coupled to the processor 2001. Cell phones 2000 typically also include menu selection buttons or rocker switches 2008 for receiving user inputs.

A typical cell phone 2000 also includes a sound encoding/decoding (CODEC) circuit 2024 which digitizes sound received from a microphone into data packets suitable for wireless transmission and decodes received sound data packets to generate analog signals that are provided to the speaker 2054 to generate sound. Also, one or more of the processor 2001, wireless transceiver 2005 and CODEC 2024 may include a digital signal processor (DSP) circuit (not shown separately). The cell phone 2000 may further include a peanut or a ZigBee transceiver (i.e., an IEEE 802.15.4 transceiver) 2013 for low-power short-range communications between wireless devices, or other similar communication circuitry (e.g., circuitry implementing the Bluetooth® or WiFi protocols, etc.).

Figure 21:
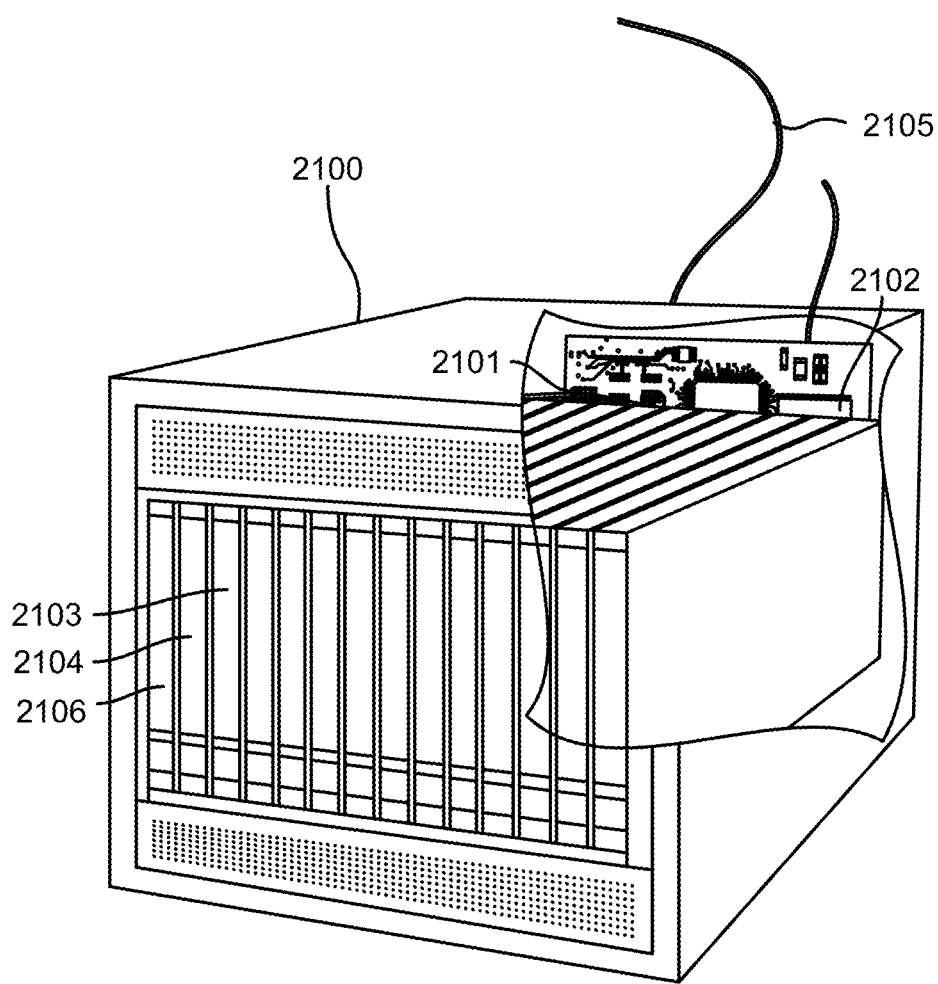
FIG. 21 is a component block diagram of a server suitable for use with an embodiment.

Various embodiments may be implemented on any of a variety of commercially available server devices, such as the server 2100 illustrated in FIG. 21. Such a server 2100 typically includes one or more processors 2101, 2102 coupled to volatile memory 2103 and a large capacity nonvolatile memory, such as a disk drive 2104. The server 2100 may also include a floppy disc drive, compact disc (CD) or DVD disc drive 2106 coupled to the processor 2101. The server 2100 may also include network access ports 2106 coupled to the processor 2101 for establishing data connections with a network 2105, such as a local area network coupled to other communication system computers and servers.

The processors 2001, 2101, and 2102 may be any programmable microprocessor, microcomputer, or multiple processor chip or chips that can be configured by software instructions (applications) to perform a variety of functions, including the functions of the various embodiments described below. In some wireless devices, multicore processors 2102 may be provided, such as one processor core dedicated to wireless communication functions and one processor core dedicated to running other applications. Typically, software applications may be stored in the internal memory 2002, 2103, and 2104 before they are accessed and loaded into the processor 2001, 2101, and 2102. The processor 2001, 2101, and 2102 may include internal memory sufficient to store the application software instructions.

As discussed above, the various embodiments included methods, and computing devices (e.g., mobile devices, wireless devices, etc.) configured to implement the methods, for determining a location of a wireless device and/or providing a location based service via the wireless device. In some embodiments, the method may include determining an approximate location (e.g., approximate latitude, longitude, and altitude values, etc.) of the wireless device, grouping the wireless device with a wireless transceiver (or a plurality of wireless transceivers) in proximity to the wireless device to form a communication group, sending the determined approximate location (e.g., approximate latitude, longitude, and altitude values, etc.) of the wireless device to the wireless transceiver, receiving on the wireless device location information from the wireless transceiver (or from two or more of the plurality of wireless transceivers in the communication group), and determining a more precise location (e.g., more precise latitude, longitude, and altitude values, etc.) of the wireless device based on the location information received from the wireless transceiver.

In some embodiments, the wireless device may be configured to receive (e.g., via an antenna coupled to one or more of its processors, etc.) location information from a multitude of external devices, and use this information to better determine its approximate location and/or to generate a better position estimate (e.g., a more precise value, more accurate coordinates, etc.).

In some embodiments, the wireless device may be configured to receive location information as one or more waypoints. A waypoint may be an information structure that includes one or more information fields, component vectors, location information, position information, coordinate information, etc. In some embodiments, each waypoint may include coordinate values (e.g., x and y coordinates, latitude and longitude values, etc.), an altitude value, a time value, a timestamp, ranking values, confidence values, precision values, a range value, and an information type identifier (e.g., GPS, Loran C, sensor, combined, etc.). The coordinate and altitude value may identify the three-dimensional location of the corresponding external device. The timestamp may identify the time that the location was determined/captured. The range value may identify a distance between the external device and the mobile device. In various embodiments, a waypoint may be, may represent, or may include any or all of a location estimate value, a location set, a location estimation set, an initial position, an initial position value, an initial location value, a current coordinate position, an initial location accuracy value, location information, local position information, distance information, external position information, externally determined location information, proximity position information, one or more threshold values, a trilateration position value, a trilateration variance value, dead reckoning location information, a best stride length estimate, a best altitude estimate, a best compass heading estimate, final location information, a final location estimation set, a final location value, a best location estimate, or any other similar location information suitable for adequately conveying or communicating location information.

In an embodiment, the mobile device may be configured to receive location information in the form of a first waypoint from a first external device, a second waypoint from a second external device, a third waypoint from a third external device, and a fourth waypoint from a forth external device. The mobile device may use any combination of the received waypoints (e.g., first through fourth waypoints) in conjunction with stored and historical information (e.g., previously computed waypoints, movement information, etc.) to determine or compute its approximate and/or more precise location with a high degree of accuracy.

In some embodiments, wireless device may be configured to communicate with a server computing device. For example, the wireless device may be configured to send received location information, sensor information (e.g., information collected from an accelerometer, a gyroscope, a magnetometer, a pressure sensor, a barometer, etc.), and information relating to a more precise location (e.g., more precise latitude, longitude, and altitude values, final location waypoint, etc.) to a server computing device. In response, the wireless device may receive updated location information from the server. The wireless device may re-compute the more precise location (or generate an updated final location waypoint) based on the updated location information received from the server.

In some embodiments, the wireless device may be configured to compute the more precise location information (or final location waypoint) by using horizontal data to determine a position relative to the Earth's surface, using vertical data to determine a height of the position relative to sea level, and generating three-dimensional location and position information based on the determined position and determined height. The wireless device may use the computed more precise location information or generated location and position information (e.g., in conjunction with the location information collected from the plurality of wireless devices) to determine or compute the more precise location information (or final location waypoint), and to provide a location based service (e.g., emergency location services, commercial location services, internal location services, lawful intercept location services, etc.) based on the more precise location information.

In some embodiments, the wireless device may be configured to determine whether the wireless device is able to acquire satellite signals and navigation data from a geospatial system. The wireless device may be configured to collect location information (e.g., by receiving a latitude coordinate, a longitude coordinate, and an altitude coordinate) from a plurality of wireless devices in its communication group in response to determining that it is not able to acquire satellite signals and/or navigation data from the geospatial system. The wireless device may compute the more precise location information (e.g., a final location waypoint that includes three-dimensional location and position information) for the wireless device based on the location information collected from the plurality of wireless devices.

In some embodiments, the wireless device may be configured to determine whether information obtained via a geospatial system of the wireless device is accurate. The wireless device may be configured to collect location information from a plurality of wireless devices in its communication group in response to determining that the information obtained via the geospatial system of the wireless device is not accurate. The wireless device may compute the more precise location information (or final location waypoint) based on the location information collected from the plurality of wireless devices, and use the computed more precise location information generated to provide the location based service.

In some embodiments, the wireless device may be configured to establish a first connection to a data network (in which the first connection is not a cellular data uplink transmission path), obtain location information for a current location of the wireless device (or initial location waypoint) via the first connection, determine a variance between the received location information and a wireless device determined location, determine whether the variance exceeds a threshold value, collect location information from a plurality of transceivers in the communication group in response to determining that the variance exceeds the threshold value, compute more precise location information (or final location waypoint) for the wireless device based on the location information collected from the plurality of transceivers, and use the more precise location information to provide the location based service.

In some embodiments, the wireless device may be configured to determine an initial position (or an initial location waypoint), generate at least one set of local position information (or a local location waypoint) based on locally determined location information, receive location information from one or more external location tracking systems, generate at least one set of external position information (or an external location waypoint) based on the location information received from the one or more external location tracking systems, receive distance information from multiple wireless devices in a communication group, generate at least one set of proximity position information (or a proximity waypoint) based on the distance information received from the multiple wireless devices in the communication group, generate a final location estimation set (or final location waypoint), and use the final location estimation set to provide a location based service. In some embodiments, the wireless device may be configured to generate the final location estimation set (or final location waypoint) to include a position value, a velocity value and an acceleration value. In some embodiments, the wireless device may generate the final location estimation set (or final location waypoint) based on at least one set of local position information (or local location waypoint), at least one set of external position information (or external location waypoint), at least one set of proximity position information (or proximity waypoint), and the initial position (or initial location waypoint).

In some embodiments, the wireless device may be configured to determine whether the wireless device is currently connected to a communications network, establish connections to a plurality of wireless devices to form a communication group in response to determining that the wireless device is not currently connected to the communications network, receive distance information from the plurality of wireless devices in the communication group, generate a location estimation set (or a local waypoint) based on the received distance information, and transmit the generated location estimate set to one or more of the plurality of wireless devices in the communication group for relaying to a network resource. In some embodiments, generating the location estimation set (or local waypoint) may include the wireless device calculating a current coordinate position of the wireless device based on a distance of the wireless device from each of the plurality of wireless devices in the communication group.

In some embodiments, the wireless device may be configured to determine or compute an initial position value (or an initial location waypoint), generate local position information (or a local location waypoint), generate external position information (or an external location waypoint) based on location information received from an external location tracking system, and generate proximity position information (or a proximity waypoint) based on distance information received from a second wireless device. The wireless device may generate the final location information (or final location waypoint) based on the determined initial position, the generated local position information, the generated external position information, and the generated proximity position information. The wireless device may use the generated final location information to provide a location based service.

In some embodiments, the wireless device may be configured to determine an initial location value (or an initial location waypoint) that identifies the current location of the wireless device, compute an initial location accuracy value for the determined initial location value, establish a communications group with a plurality of transceivers in response to determining that the computed initial location accuracy value exceeds a threshold value, receive (e.g., in response to establishing the communications group) location information from each of the plurality of transceivers in the communications group, determine a trilateration position value (or a trilateration waypoint) based on the location information received from each of the plurality of transceivers in the communications group, and compute a trilateration variance value based on the determined trilateration position value. The wireless device may determine a final location value (or final location waypoint) based on the determined initial location value, the computed initial location accuracy value, the determined trilateration position value, and the computed trilateration variance value. The wireless device may then use the final location value to provide the enhanced location based service.

In some embodiments, the wireless device may be configured to receive (e.g., in a processor of the wireless device via an antenna of the wireless device) a first set of externally determined location information (or a first external location waypoint) and a second set of externally determined location information (or a second external location waypoint) from one or more external location tracking systems. The wireless device may generate a best stride length estimate based on the first set of externally determined location information, the second set of externally determined location information, and the output of an accelerometer of the wireless device. The wireless device may generate a best altitude estimate based on output of a barometer of the wireless device and at least one of the first set of externally determined location information and the second set of externally determined location information. The wireless device may generate a best compass heading estimate based on output of a magnetometer of the wireless device, output of the accelerometer of the wireless device, and at least one of the first set of externally determined location information and the second set of externally determined location information. The wireless device may generate dead reckoning location information based on the best stride length estimate, the best altitude estimate, and the best compass heading estimate. The wireless device may calculate a best location estimate (or final location waypoint) based on the dead reckoning location information and a set of externally determined location information. The wireless device may use the best location estimate to provide a location based service in the wireless device.

In some embodiments, the wireless device may be configured to receive externally determined location information (or an external location waypoint), and generate a best stride length estimate based on the externally determined location information and accelerometer information. In some embodiments, the wireless device may generate the best altitude estimate based on the externally determined location information and barometer information. In some embodiments, the wireless device may generate the best compass heading estimate based on the externally determined location information and magnetometer information. In some embodiments, the wireless device may generate dead reckoning location information based on the best stride length estimate, the best altitude estimate, and the best compass heading estimate.

In some embodiments, the wireless device may be configured to determine its location via enhanced location based trilateration. For example, the wireless device may be configured to receive location information from one or more external devices. The received location information may include a waypoint from each of the one or more external devices. Each waypoint may include a coordinate value, an altitude value and a range value. The range value may include information identifying a distance from an external device to the wireless device. The wireless device may determine the validity of each of the received waypoints, perform normalization operations to normalize the received valid waypoints, assign an overall ranking to each of the normalized waypoints, assign a device-specific ranking to each of the normalized waypoints, and store the normalized waypoints in memory. The wireless device may select four waypoints from memory based on a combination of the overall ranking and the device-specific ranking associated with each waypoint. The wireless device may apply the four selected waypoints to a kalman filter to generate a final location waypoint (or final location information, final location estimation set, final location value, best location estimate, etc.). The wireless device may use the generated final location waypoint to provide a location based service.

In some embodiments, the wireless device may be configured to determine its current location (or generate a current location waypoint) by performing operations that include: determining an approximate location of the wireless device (e.g., generating a waypoint or other information structure that includes location-based values, etc.), grouping the wireless device with a wireless transceiver in proximity to the wireless device to form a communication group, sending the determined approximate location of the wireless device to the wireless transceiver, receiving on the wireless device location information from the wireless transceiver, determining a more precise location of the wireless device based on the location information received from the wireless transceiver, and setting the current location (e.g., a waypoint or other information structure that includes location-based values, etc.) to the determined more precise location. As part of determining the approximate location, the wireless device may estimate its position and/or generate a position estimate. In some embodiments, the position estimates may include latitude, longitude and elevation information that is accurate to within one (1) meter (and many times within one meter accuracy).

In some embodiments, the wireless device may be equipped with a "sensor fusion" system/component. The sensor fusion component may be configured to collect and use information from sensors in the wireless device to further improve the location position determinations. As such, the sensor fusion component may allow the device to better determine its approximate location and/or to generate a better position estimate (e.g., a more precise value, more accurate coordinates, etc.).

In some embodiments, the wireless device may be configured to receive (e.g., via an antenna coupled to one or more of its processors, etc.) location information from a multitude of external devices, and use this information to better determine its approximate location and/or to generate a better position estimate (e.g., a more precise value, more accurate coordinates, etc.).

In an embodiment, the wireless device may be configured to receive location information in the form of a first waypoint from a first external device, a second waypoint from a second external device, a third waypoint from a third external device, and a fourth waypoint from a forth external device. The wireless device may use any combination of the received waypoints (e.g., first through fourth waypoints) in conjunction with stored and historical information (e.g., previously computed waypoints, movement information, etc.) to determine or compute its approximate and/or more precise location(s) with a high degree of accuracy.

In some embodiments, the wireless device may be configured to perform advanced location based operations (e.g., advanced sensor fusion operations, etc.) to generate location information (e.g., a location estimate set/value), use a differential $RMS^2$ method (or any other method known in the art) compute confidence values, and compare the computed confidence values to one or more threshold values to determine whether there is a sufficiently high degree of confidence in the accuracy of the generated location information (e.g., location estimate set/value). In some embodiments, the wireless device may be configured to compute a confidence value between 0.0 and 1.0 that identifies a confidence level in the accuracy of the measurement for each data field in the location estimation set (e.g., a confidence value for each of the latitude, longitude and altitude data fields, etc.). For example, confidence values of 0.90, 0.95, and 0.91 may indicate that the x, y, and z coordinates are accurate within 30 meters between 90 and 95 percent of the time.

In some embodiments, the wireless device may be configured to compute a precision value that identifies, or which is indicative of, the repeatability factor of the computation/measurements over multiple measurements. The wireless device may use the precision value to determine how often a reporting device reports the same position/location (i.e., based on evaluating multiple reports indicating that the device has not moved more than X meters, etc.). This may in turn be used to determine the precision of the measurement (e.g., within 1 meter, etc.). The precision value may also be used to determine the likelihood that repeating the computation (e.g., using the same inputs or input sources) will result in substantially the same values.

In some embodiments, the wireless device may be configured to perform normalization operations to normalize/synchronize the timing of the received location information (the "location information timing"). In some embodiments, this may be accomplished via a timing component or mechanism (a timer, system clock, processor cycles, etc.) in the wireless device. The wireless device may use a common time value (or common timer, reference clock, etc.) to synchronize and/or coordinate the information included in the received waypoints. The wireless device may generate normalized waypoints that include normalized values and/or which are normalized, synchronized and/or updated to account for various delays and inconsistencies, including the propagation delay between the wireless device and the corresponding external device, the time difference between when the waypoint was captured in external device and when the waypoint received in the wireless device, the relative movements of the devices, communication pathway time delays, delays associated with processing the requests, etc.

In some embodiments, the wireless device may be configured to associate or assign a time value to each normalized waypoint (e.g., by storing the waypoint relative to the time value in a map or table, etc.), and determine whether each normalized waypoint is valid. For example, wireless device may determine whether the time value associated is within a valid duration or whether the waypoint includes sufficiently accurate information (e.g., by determining whether a precision or confidence value associated with the waypoint exceeds a threshold value, etc.). In response to determining that a waypoint is valid, the wireless device may determine or compute one or more rankings for that waypoint, and associate and/or assign the rankings to the waypoint (by storing it as a field. In some embodiments, the wireless device may determine and assign an overall rank and a device-specific rank to each valid waypoint, and store the waypoints in memory (e.g., in a location database, etc.).

In some embodiments, the wireless device may be configured to determine the number of stored waypoints that are suitable for use in determining the device's current location. For example, the wireless device may determine whether the memory stores four or more valid waypoints, whether the stored waypoints are associated with sufficiently high rankings, whether the stored waypoints identify four or more independent locations, whether the stored waypoints identify the locations of four or more external devices relative to the current location of the wireless device with a sufficiently high level of accuracy, etc. In response to determining that there are four or more suitable waypoints stored in memory, the wireless device may intelligently select the four most suitable waypoints (e.g., waypoints having the highest overall rank and/or device-specific rank, etc.), apply the selected waypoints as inputs to a kalman filter, and use the output of the kalman filter to generate location information that identifies the wireless device's current location with a high level of accuracy (e.g., within one meter in all directions, etc.).

Various embodiments may include methods of providing a location based service on a first fixed wireless device (e.g., fixed infrastructure device or fixed infrastructure node, etc.), which may include determining whether the first fixed wireless device is able to establish a location fix based on information obtained via a geospatial system, collecting location information from a communication group (e.g., receiving GPS timing information from a second mobile or fixed wireless device, a cell tower antenna, an eNodeB (e.g., eNodeB 404, a small cell device, a femto cell device, a WiFi access node, a beacon device, etc.) in response to determining the first fixed wireless device is unable to establish a location fix, computing a new three-dimensional location fix for the first fixed wireless device based on the location information collected from the communication group, and providing location based service based on the new three-dimensional location fix. In some embodiments, the first fixed wireless device may be a fixed infrastructure device (e.g., a cell tower antenna, an eNodeB, a small cell device, a femto cell device, a WiFi access node, a beacon device, etc.).

Further embodiments may include methods, and computing devices configured to implement the methods, for determining a more precise location of a fixed wireless device and providing an enhanced location based service (eLBS). A processor in a fixed wireless device may be configured to determine an approximate location of the fixed wireless device, receive location information from a wireless device, and determine a more precise location of the fixed wireless device based on the approximate location and the location information received from the wireless device (e.g., by performing any or all of the operations discussed in this application).

Further embodiments may include methods, and computing devices configured to implement the methods, for determining a location of a citizen band service device and providing a location based service. A processor in a citizen band service device (CBSD) may be configured to determine an approximate location of the citizen band service device, form a communication group with a wireless transceiver in proximity to the citizen band service device, send the determined approximate location of the citizen band service device to the wireless transceiver, receive location information from the wireless transceiver, and determine a more precise location of the citizen band service device based on the location information received from the wireless transceiver (e.g., by performing any or all of the operations discussed in this application).

In recent years, there has been a proliferation of indoor, infrastructure-based technologies, including small cell technology, distributed antenna systems (DAS), Wi-Fi access points, beacons, commercial location-based services (cLBS), institutional and enterprise location systems, and smart building technologies. In addition, wireless carriers may need to determine and provide their customers with a dispatchable location (i.e., a location experiencing an emergency situation). The various embodiments include systems and methods for determining or identifying a suitable dispatchable location in systems that use or include indoor, infrastructure-based technologies, including systems that use small cell technology, DAS, Wi-Fi access points, beacons, cLBS, institutional and enterprise location systems, and smart building technologies.

There exists a need to accurately determine the specific latitude, longitude and altitude of an eNodeB, micro cells, pico cells, small cells, beacons, access points and other fixed or mobile wireless nodes/devices within a GPS stressed environment. The various embodiments include computing devices that are configured to use eLBS and other location-determination techniques to accurately determine the specific latitude, longitude and altitude of fixed and/or mobile wireless devices in a GPS stressed environment.

Conventional solutions for determining the locations of certain wireless devices, such as fixed infrastructure nodes (FINs), often require the use of a combination of GPS and manual data entry techniques. However, there are a number of limitations with conventional solutions. For example, while GPS may be used to determine latitude and longitude of a device, it could more challenging to determine the altitude of a device, within a reasonable range of uncertainty or accuracy, based solely on GPS information. As a result, manual data entry is often required to determine the 3-dimensional location of a device. Similarly, at times when GPS information is not available, conventional solutions may require that an operator or professional installer manually define or input the latitude, longitude, and/or altitude values of a device. These conventional solutions and manual data entry techniques often result in location information (e.g., latitude, longitude and/or altitude values) that does not fully or adequately comply with the needs or requirements of consumers (e.g., in terms of accuracy or precision). The various embodiments overcome these limitations of conventional solutions by automating processes that currently require manual data entry.

Many in-building systems are GPS stressed environments employ a single, multiple node, or distributed antenna system (DAS). Determining the location of a fixed node (e.g., eNodeB, etc.) and its associated antennas in such system is often challenging. The various embodiments overcome the limitations of conventional in-building solutions by automating the processes that currently require manual data entry. For example, some embodiments include computing devices that are configured to accurately and automatically determine the locations of nodes/devices within in-building systems that employ a single, multiple node, or DAS antenna systems without the use of manual data entry. Some embodiments may accurately determine the locations of a fixed node for asset tracking. The various embodiments may accurately determine the locations of a fixed node for so as to complying with certain regulatory requirements (e.g., for emergency services, etc.). The various embodiments may accurately determine the locations of a fixed node, and its subsequent antennas (which may be disbursed over a large geographic area), for the delivery location specific services and/or for providing location based services.

The various embodiments include devices, systems and method of accurately determining the locations of fixed and/or mobile wireless devices. The embodiments may enhance the ability of first responders to locate a user (e.g., within a building) in an emergency situation.

There are regulatory goals (e.g., Federal Communications Commission goals, etc.) for obtaining a horizontal location (two dimensional) within 50 meters of a position (in both latitude and longitude) for 80 percent of the emergency calls. A corresponding vertical component may require an accuracy of plus-or-minus three meters (+/−3 M) in order to be effective for determining the 3-dimensional location of a device. Various embodiments include components configured to accurately determine the two and three dimensional locations of a mobile or fixed node, and its subsequent antennas (which may be disbursed over a large geographic area), for the delivery location specific services or location based services. For example, the embodiment components could be configured to use eLBS techniques to accurately determine the locations of a fixed node and its antennas to within a few meters (e.g., within 1 meter) of a position in each of the x, y and z axis. As such, the various embodiments meet or exceed proposed FCC regulatory goals for obtaining a horizontal location, and provide vertical position information (e.g., altitude, z axis information, etc.) that is suitable for accurately determining the 3-dimensional location and position of a wireless device.

The Report and Order and Second Further Notice of Proposed Rulemaking adopted by the U.S. Federal Communications Commission on Apr. 17, 2015 established a new citizens broadband radio service (CBRS) for shared wireless broadband use of the 3550-3700 MHz band (3.5 GHz Band). That is, the 3550-3700 MHz (3.5 GHz) frequency band recently became available for commercial shared use (i.e., for use as a shared spectrum band). The 3.5 GHz citizens broadband radio service (CBRS) may allow shared small-cell commercial access to spectrum (e.g., via a dynamic spectrum access system), with ongoing encumbrances by government and non-government incumbents.

The citizens broadband radio service (CBRS) is to be governed by a three-tier authorization mechanism and/or a three-tier spectrum sharing architecture under Spectrum Access System (SAS) control. The three tiers of operation include: incumbent access (e.g., for federal and grandfathered licensed FSS 3.5 GHz band users), priority access (e.g., for hospitals, utilities and public-safety entities) and general authorized access (e.g., for the general public). The general authorized access (GAA) tier relates to spectrum that is open to use by anyone with a FCC-certified device, and there generally is no license cost for commercial broadband users to access spectrum/resources via this tier. At the priority access license (PAL) tier, users of the band may acquire (e.g., via auction, etc.) targeted, short-term licenses that provide interference protection from GAA users. At the top of the hierarchy (i.e., incumbent access tier) are incumbent federal and commercial radar, satellite and other users that receive protection from all the CBRS users.

The 3.5 GHz CBRS encumbrances may be managed by a geolocation-enabled dynamic spectrum access system and database, which may be modeled upon existing TV white spaces databases and/or rules to allow unlicensed radio transmitters to operate in the broadcast television spectrum when that spectrum in not used by a licensed service.

Before a wireless node may transmit in the encumbered CBRS 3.5 GHz band, it is required to determine and report its location (e.g., latitude and longitude). Similar to the regulatory goals mentioned above, the accuracy of these location values should be within plus-or-minus 50 meters for latitude and longitude, and within plus-or-minus three (3) meters for altitude. Such values could be used to determine whether the service should be allowed, whether authorization for use of the 3.5 GHz band should be granted, whether the service may be provided, etc.

The various embodiments include computing devices configured to determine the latitude and longitude coordinates of a device to within 50 meters, and determine the altitude of the device to within three (3) meters. In some embodiments, the computing devices may be configured to determine the latitude, longitude, and altitude values of a device to within plus-or-minus one (1) meter.

Figure 22:
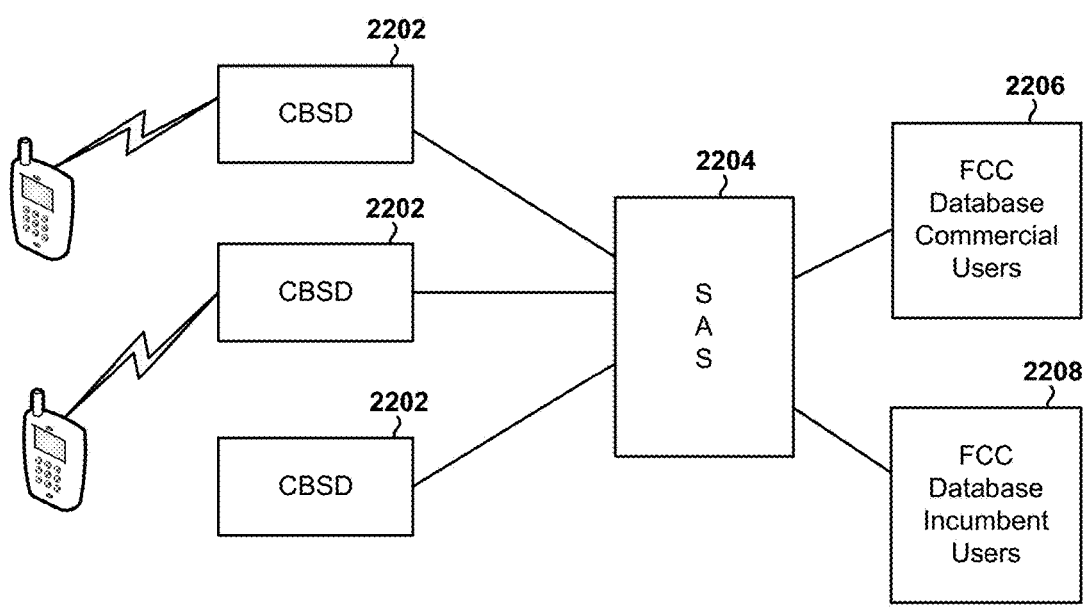
FIG. 22 is a system block diagram that illustrates various communication links and information flows between components in a network that includes wireless devices, CBSDs and a spectrum access system (SAS) in accordance with an embodiment.
Figure 23:
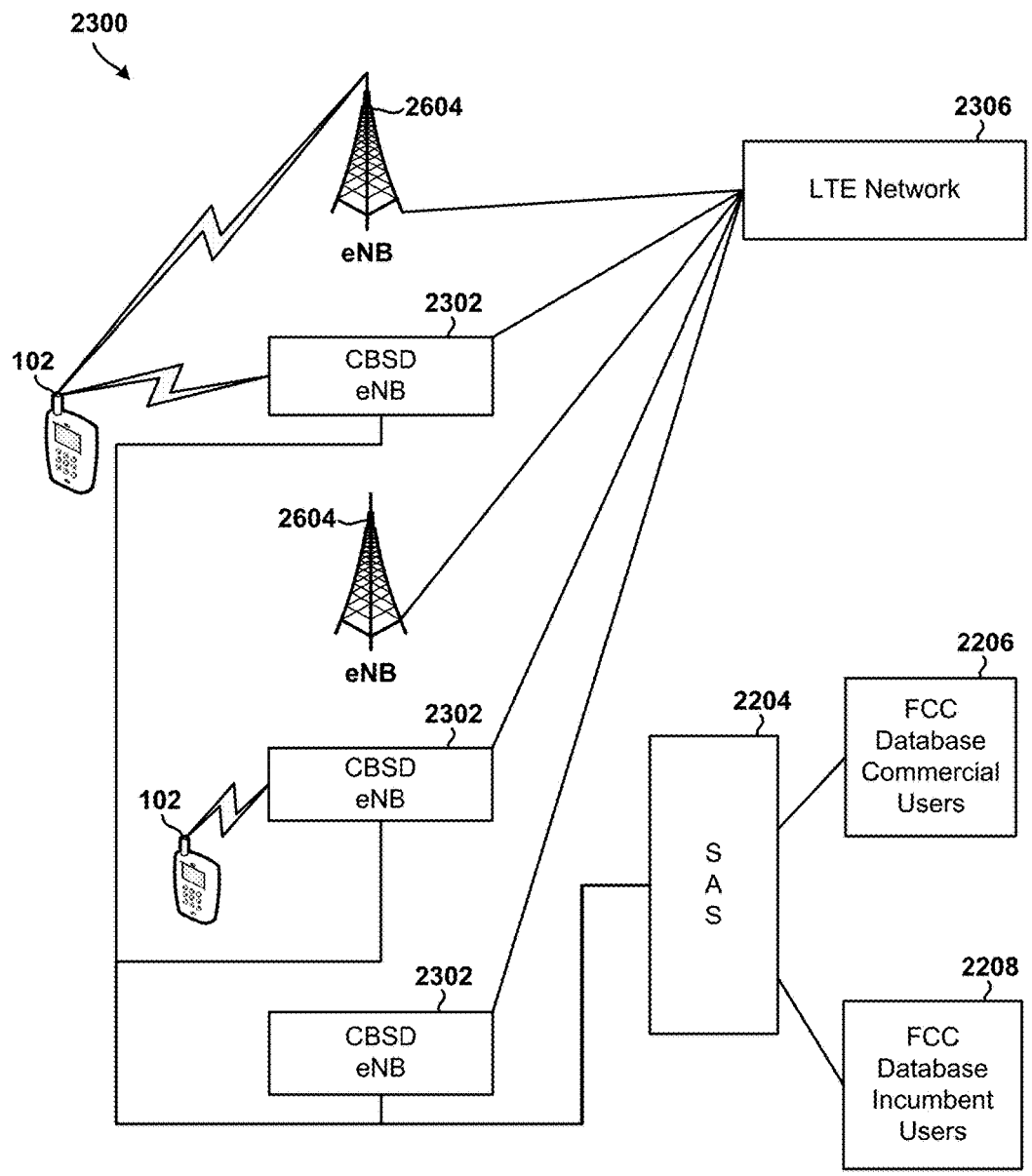
FIG. 23 is a system block diagram that illustrates various interconnections and information flows between components in a network that includes wireless devices coupled to LTE eNodeBs and interconnected CBSD eNodeBs in accordance with an embodiment.

FIGS. 22 and 23 are system block diagrams that illustrates various communications and information flows between components in a CBRS-based network.

In the example illustrated in FIG. 22, one or more citizen band service devices (CBSDs) 2202 communicate with a spectrum access system (SAS) 2204. For general authorized access (e.g., GAA tier), the CBSD 2202 may provide the SAS 2204 with any or all of the information required by the regulatory rules, including the operators' identification, the devices identification, and the geo-location of each CBSD 2202. The SAS 2204 may communicate with a FCC Database Commercial Users 2206 component and FCC Database Incumbent Users 2208 component (either of which may be modeled upon existing TV white spaces databases). In various embodiments, the CBSD 2202 may be a mobile or fixed infrastructure node or device (e.g., FID, FIN, eNodeB, etc.).

The CBSD 2202 may define rules for establishing/generating the geo-location information in GPS stressed environments. Using conventional solutions, such rules could stipulate that a professional installer should input and report accurate CBSD location information in lieu of automated reporting measures (i.e., to comply with statutory requirements). As another example, the rules could indicate that any subsequent movement of the CBSD 2202 should reported by the professional installer. However, as mentioned above, the variability and inaccuracies associated with the manual determination and subsequent entry location data (i.e., data defining the latitude, longitude, and altitude values) are inefficient and may cause conventional solutions to fail. Further, several error points could be established, which have no defined checks, leading to potential interference conflicts (e.g., due to the manual entry process). The various embodiments overcome these and other limitations of conventional solutions by automatically determining and reporting highly accurate latitude, longitude, and altitude values (e.g., accurate to within one meter, within three meters, within fifty meters, etc.), even in GPS stressed environments.

Both Long-Term Evolution for unlicensed spectrum ("LTE-U") and license assisted access ("LAA") protocols may be utilized extensively in the 3.5 GHz band. LTE-U and LAA are desirable technologies because they may allow carriers to expand their capacities while still ensuring that carriers can rely on stable, licensed, spectrum for high quality service. A standalone version of LTE-U is being developed that may utilize unlicensed spectrum (i.e., no licensed anchor channel) and may increase the performance of unlicensed technologies to almost that of technologies that use licensed spectrum.

The various embodiments may include sophisticated, smart transmitters and end-user equipment devices that are configured to implement and use various features provided via the citizen broadband radio service (CBRS) in order to greatly advance the use of low-power small cell technologies, including LTE-U and LAA. The implementation and use of technologies may enable mobile broadband operators to efficiently extend their service coverage and increase network capacity (e.g., when used with the sophisticated, smart transmitters and end-user equipment described in this application).

The various embodiments may also include devices, systems and solutions that implement or use a non-manual (automated) systems, methods, process or procedures in order to accurately define the geo-location of a CBSD 2202 at installation and/or in the event of a subsequent movement of the CBSD 2202. The various embodiments may define and update the geo-location of the of a CBSD 2202 in a GPS stressed environment without manual intervention by a professional installer or maintenance team.

In some embodiments, a computing device may be configured to use eLBS for wireless fixed infrastructure nodes (FINs) and wireless fixed infrastructure devices (FIDs) so as to improve the positional accuracy of the various wireless nodes and their associated antennas in GPS stressed environments. For example, in some embodiments, an eLBS FID component that implements or performs an eLBS FID method or functionality may be included in, implemented by, and/or used to improve the accuracy of the latitude, longitude, and altitude values generated/reported by various devices in the network.

In some embodiments, an eLBS FID component may be added to a CBSD 2202 node to enhance its ability to report more accurate geo-location information to the SAS 2204. In some embodiments, eLBS FID component may be implemented and used as a direct augmentation to a CBRS-based or SAS-based network that is configured to operate in accordance with standards. The inclusion and use of an eLBS FID component may greatly improve the determination of the latitude, longitude, and altitude of a CBSD 2202 node and/or its antennas (e.g., in a DAS environment).

In some embodiments, the eLBS FID component may be configured to perform FID lateration and/or FID trilateration operations. In some embodiments, the eLBS FID component may be configured to utilize a series of Kalman filters to continuously or repeatedly improve the latitude, longitude, and altitude values generated for an FID or CBSD 2202. As is discussed further below, several different confidence values may be used in addition to the confidence values employed with the Kalman filter itself to determine and report accurate location information. For example, the CBSD 2202 may be configured to report to the SAS 2204 confidence value(s) that indicate its level of confidence in its reported latitude, longitude, and altitude values (e.g., by sending a combined confidence value or by sending a confidence value for each of the individual axes). The eLBS FID component may also be configured to provide a confidence interval or level for the locations values, either collective for all three axes or for each axis individually, to the CBSD 2202 for reporting to the SAS 2204. A moderate or high confidence interval may indicate that GPS or similar capability is available for each axis for the latitude, longitude, and altitude. A higher confidence interval may also indicate that eLBS was used to determine the latitude, longitude, and/or altitude with a high degree of accuracy, precision or confidence.

In the example illustrated in FIG. 23, the system 2300 includes wireless devices 102, CBSD eNodeB 2302 components, eNodeB 2604 components, and an LTE Network 2306. The wireless devices 102 may be coupled to CBSD eNodeB 2302 components and/or eNodeB 2604 components. Both the CBSD eNodeB 2302 components and the eNodeB 2604 components are coupled to the LTE Network 2306. The CBSD eNodeB 2302 components are coupled to each other, and at least one of the CBSD eNodeB 2302 components is coupled to the SAS 2204. The SAS is coupled to the FCC Database Commercial Users 2206 component and the FCC Database Incumbent Users 2208 component.

Figure 24A:
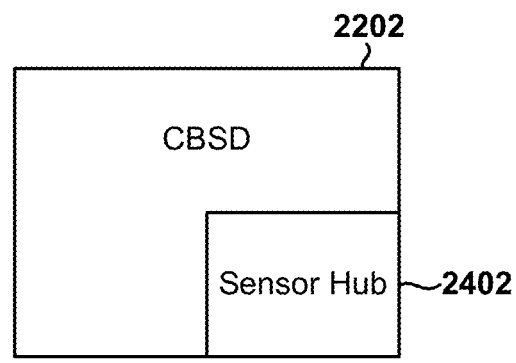
FIGS. 24A and 24B are component block diagrams illustrating various logical and functional components that could be included as part of a CBSD in the various embodiments.

FIG. 24A illustrates that an CBSD 2202 may include a sensor hub 2402. The sensor hub may include a processor or microcontroller configured to collect, integrate, interpret, and use data from different sensors. The sensor hub 2402 may include various sensors, such as accelerometers, 2 or 3 axis gyroscopes, 2 or 3 axis compasses, altimeters, barometers, GPS receivers, and other similar sensors. In some embodiments, the sensor hub 2402 may be, or may include, a context hub, sensor network, or an Internet of things (IOT) device having communications circuitry (e.g., RAN chip) and direct or indirect access to information generated by various sensors. In some embodiments, the sensor hub 2402 may be used as a dead reckoning device/component that may enables the initiation of initial tracking from a location to the final installation point so that a more precise latitude, longitude, and altitude position may be made available to the CBSD 2202. This allows the CBSD 2202 to relay more precise location information (e.g., a final location waypoint, etc.) to the LTE O&M, LTE SON, and CBRS spectrum access system controller (e.g., SAS 2204).

The sensor hub 2402 may also be used to communicate with other CBSD 2202 devices (or an LTE Ue that has eLBS capabilities) for the purpose of improving its latitude, longitude, and altitude position information (e.g., its location information, current waypoint, final location determination, etc.). The sensor hub 2402 may also be used to determine whether the CBSD 2202 has moved from a position that it was initially placed, indicating a potential movement that requires sending update location information to SAS 2204.

Figure 24B:
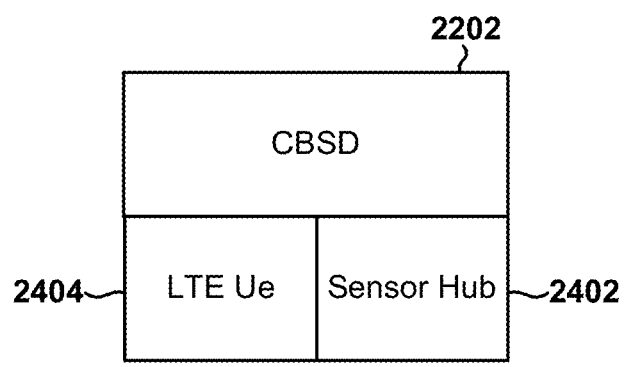

FIG. 24B illustrates that the CBSD 2202 may further include an LTE Ue 2404 component. The LTE Ue 2404 component may be configured to utilize any or all of the eLBS methods and techniques discussed in this application for mobility. The LTE Ue 2404 component may enable the CBSD 2202 to communicate with other CBSD 2202s and/or another LTE Ue's (which may be connected to a commercial wireless network or included in other CBSDs 2202). The LTE Ue 2404 component may be integrated into the CBSD 2202, and does not need to be an outboard device. The LTE Ue 2404 component may configured to utilize any available radio access technology, such as WiFi, and is not restricted to one RAN technology.

Figure 25:
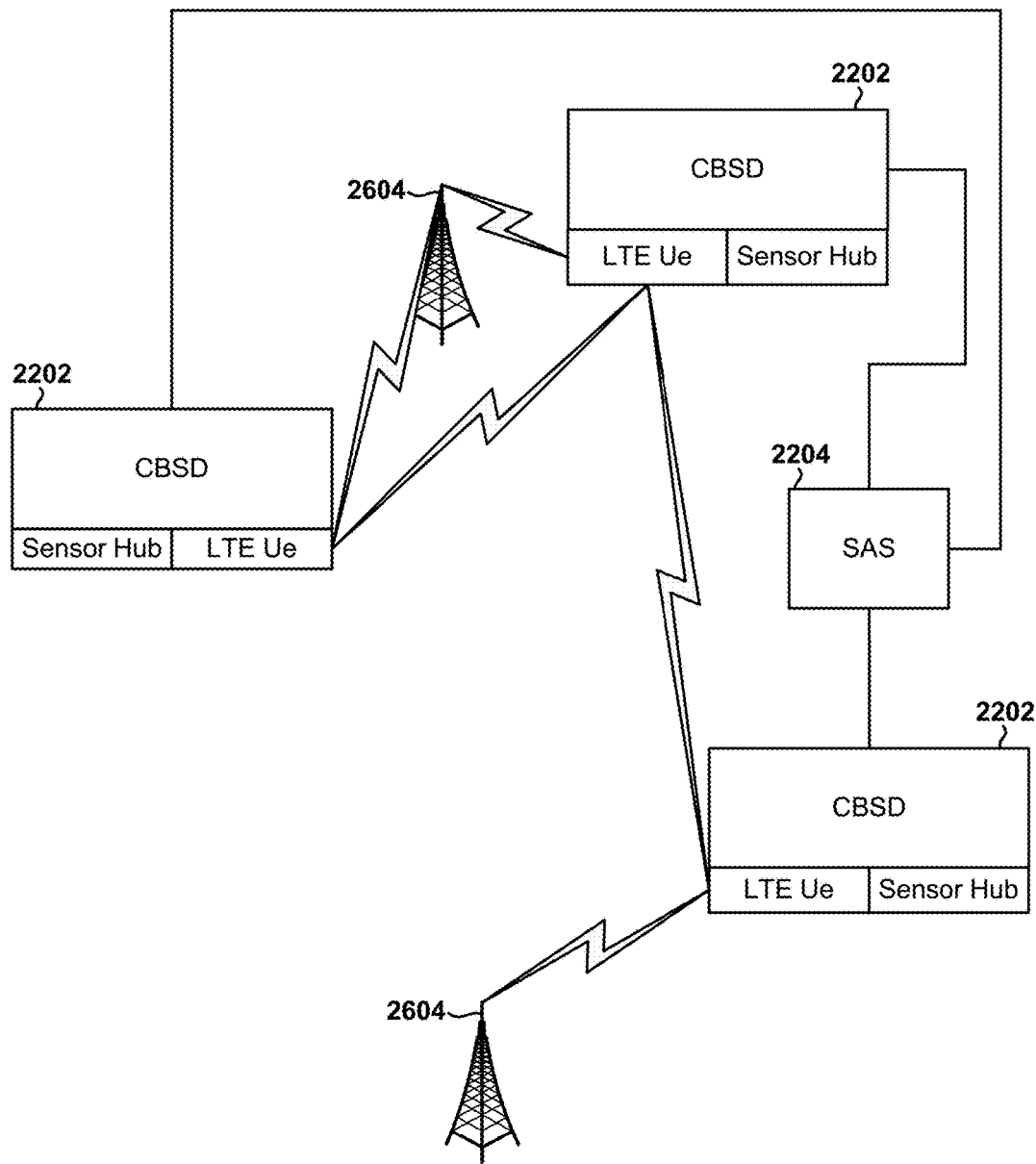
FIG. 25 is a component block diagram illustrating various logical and functional components, information flows, and data suitable for use in determining the locations of one or more CBSDs in accordance with the various embodiments.

FIG. 25 illustrates that one or more CBSDs 2202 may obtain latitude, longitude, and altitude values from a combination of information received from commercial LTE network eNodeBs 2604 and other CBSDs 2202.

Figure 26:
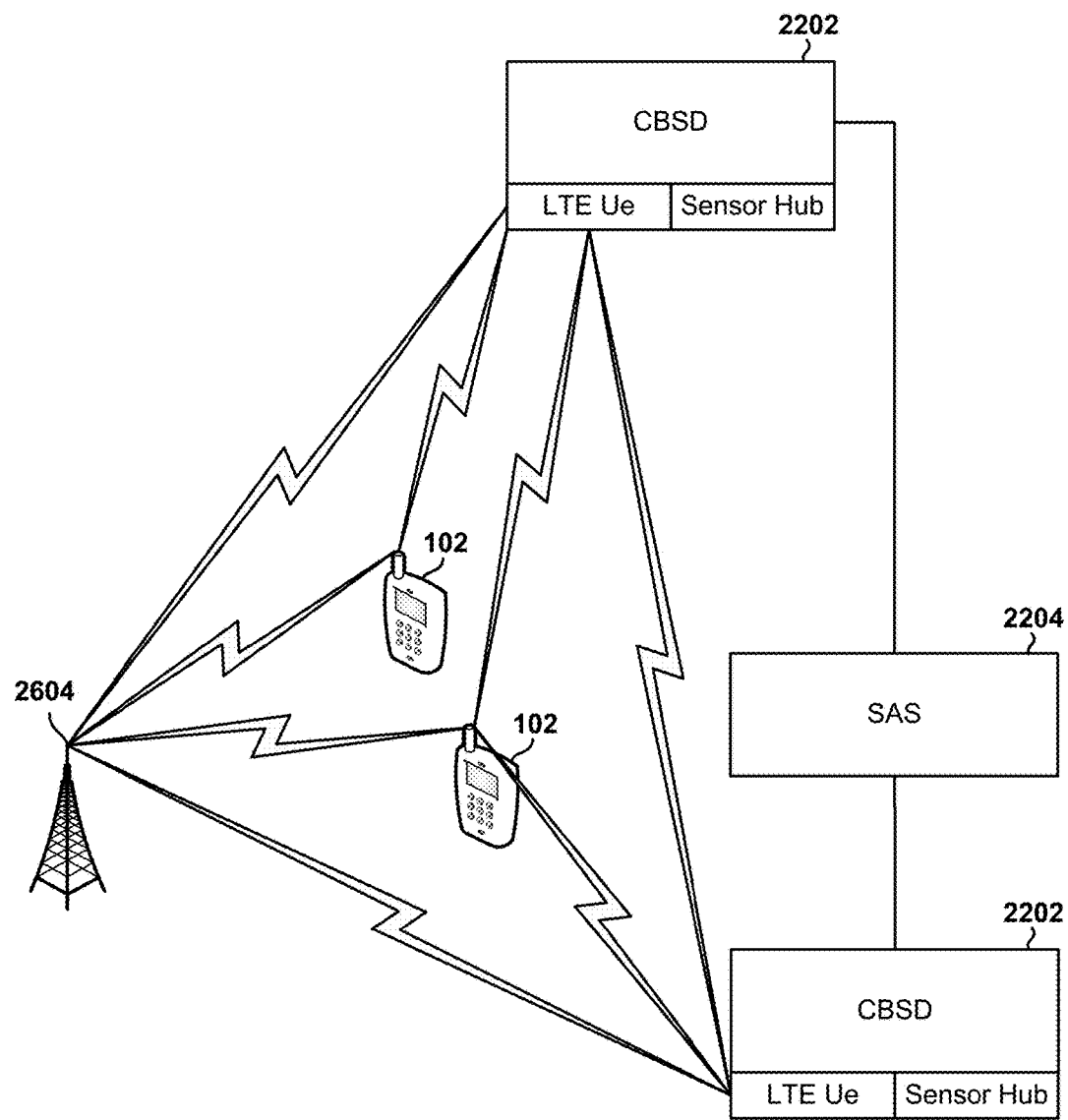
FIG. 26 is a component block diagram illustrating various additional logical and functional components, and information flows in a system that is suitable for use in determining the locations of one or more wireless devices and/or CBSDs in accordance with some embodiments.

FIG. 26 illustrates that wireless devices 102 (or UEs that are not integrated into the CBSD 2202) may be used to help refine the latitude, longitude, and altitude coordinates of the CBSD 2202, and vice versa. For example, each CBSDs 2202 may determine its locations based on a combination of information received from commercial LTE network eNodeBs 2604 and other CBSDs 2202, and send this information to a wireless device 102. The wireless device 102 may receive and use this information to more accurately determine its current location, and send this location information to the CBSDs 2202 for refinement.

For example, a wireless device 102 may be configured to determine its approximate location (e.g., by using any of the techniques above to generate an initial location waypoint, etc.), group itself with a CBSD 2202 in close proximity to form a communication group, and send its approximate location (e.g., initial location waypoint) to all CBSDs 2202 in the communication group. In response, the wireless device 102 may receive location information from one or more of the CBSDs 2202 in the communication group. The wireless device 102 may determine a more precise location (e.g., a final location waypoint) based on a combination of its determined approximate location (initial location waypoint) and the location information received from the CBSD 2202. Similarly, the CBSD 2202 may be configured to generate a final location waypoint based on a combination of locally determined location information (e.g., initial location waypoint) and information received from the wireless devices 102 and other CBSDs 2202.

For wireless mobile network (e.g., LTE) the position location information accuracy needs to be improved for in building environments in addition to providing more accurate location information about where the wireless devices are actually located. Whether the wireless device is used by a first responder, commercial cellular user, or a combination of both.

Positional location improvement enables improved situation awareness, improved telemetry, and improved overall communication with the incident commander. In addition, the wireless devices proximity location to other wireless devices can and will change dynamically allowing for resources to be added and/or reassigned as the need arises for operational requirements.

Various embodiments include methods, and mobile computing devices configured to implement the methods, of determining a location of a wireless device for positional location improvement.

Determining the latitude, longitude and elevation to high accuracy, such as 1 meter or greater, for fixed wireless infrastructure elements like small cells, femto cells, WiFi access nodes, Bluetooth beacons, fixed appliances and other devices is becoming more important. Providing accurate location position information for wireless fixed infrastructure devices, to include coordinates such as latitude, longitude, as well as altitude, is also of growing importance for wireless service providers, mobile advertisers, and public safety application.

Often the geodetic coordinates for small cells, femto cells, WiFi access nodes, Bluetooth beacons or other fixed appliances are entered into the device manually. This may result in inaccurate values and/or cause other problems in the device. As such, automated and more reliable solutions that do not require any human interaction or intervention will be beneficial to wireless/wireless device users, device manufactures, and users of location based services.

In some embodiments, the computing device may be equipped with a sensor hub 2402 and/or a "sensor fusion" system/module that is configured to use sensors of the device to further improve the location position determinations. This may be accomplished via the sensor hub allowing the device to generate a better position estimate (e.g., a more precise value, more accurate coordinates, etc.). In some embodiments, the computing device may also be equipped with a trilateration component that is configured to perform any or all of the various trilateration operations discussed in this application. In some embodiments, the trilateration operations may include, or may be perform as part of, location-based operations to accomplish eLBS for fixed infrastructure devices (or eLBS for fixed wireless devices). In an embodiment, a fixed wireless device may be a fixed infrastructure device. In an embodiment, a fixed infrastructure device may be a fixed wireless device.

By performing trilateration operations, a device (e.g., a mobile computing device, server device, femtocell, fixed infrastructure device, fixed wireless device, etc.) may determine its location with a high degree of accuracy (e.g., within 1 meter) without any human interaction or intervention. In some embodiments, these trilateration operations may include a wireless device using or communicating with fixed infrastructure devices or similar devices.

Generally, to facilitate the lateration process within eLBS for fixed infrastructure devices, it may be necessary for the fixed infrastructure devices to communicate with one another and share location information (e.g., location-based information, coordinates, ranging data, etc.). If the location information does not provide ranging data, the devices may need to be able to execute processes for determining the ranging information such as performing sounding or ranging processes.

eLBS may be extended to function and be used for fixed infrastructure devices. In this situation, the fixed infrastructure can receive inputs from both other fixed infrastructure devices as well as wireless devices in a effort to improve its position location. This can be especially helpful where an object is to be fixed, but over time may move, such as in locations where tectonic active can cause shifts. Other embodiments may involve needing position location information but the device is unable to use a traditional method to obtain a GPS lock.

Various embodiments include methods for providing a location based service in a fixed wireless device, which may include determining via a processor of a fixed wireless device whether information obtained via a geospatial system of the fixed wireless device is accurate, collecting location information from a plurality of fixed wireless devices in a communication group in response to determining that the information obtained via the geospatial system of the fixed wireless device is not accurate, computing more precise location information for the fixed wireless device based on the location information collected from the plurality of fixed wireless devices (the more precise location information including three-dimensional location and position information), and using the computed more precise location information to provide the location based service.

Further embodiments may include methods, and computing devices configured to implement the methods, of performing lateration or trilateration for fixed infrastructure devices (FID) using enhanced location based positions (location information) with wireless devices. Trilateration may rely on multiple inputs from various devices to assist in initial fix and subsequent improvements for the fixed nodes' location determination involving latitude, longitude and altitude.

Generally, the concept of how eLBS with fixed nodes takes place is important for the enhanced position to be achieved using a multitude of devices. As the need to improve location services the accuracy and confidence of the actual 3-dimensional coordinates of the fixed node needs to have a high degree of confidence and precision. The confidence and precision of the three-dimensional coordinates, (latitude, longitude and altitude) need to be established for each of the antennas with a LTE site in support of the position reference signal (PRS).

With LTE new (pico) or small cell sites required for providing coverage and network capacity for LTE and LTE-A will be located at street level or even indoors, where GPS reception is poor or non-existent.

An important aspect for LTE is clock synchronization, which may be achieved with IEEE 1588 in lieu of GPS information. However, a LTE cell site that relies on backhaul being provided by a donor LTE cell site, and IEEE 1588 is not viable since it is relevant to the donor cell site. Therefore, GPS could be replied on for timing synchronization in the situation for the donor cell sites. In addition, eLBS for Fixed Infrastructure Nodes may assist or improve the use of GPS for timing synchronization by providing its timing to the remote cell site that is in a GPS stressed environment.

In a GPS stressed environment, eLBS FID may be used to provide a GPS clock signal to an eNodeB in a the remote site. The GPS clock signal that is relayed may also be used to improve the determination of the geodetic location (latitude, longitude and altitude) of the remote eNodeB in a GPS stressed environment.

In LTE networks, the Evolved Serving Mobile Location Center (E-SMLC) is responsible for provision of accurate assistance data and calculation of position. Positioning over LTE is generally enabled by LPP. The LPP call flows are procedure-based, and the main functions of LPP are to provision the E-SMLC with the positioning capabilities of the UE (a) to transport assistance data from the E-SMLC to the UE (b) to provide the E-SMLC with co-ordinate position information or UE measured signals (c) to report errors during the positioning session. The LPP system may also be used to support "hybrid" positioning such as via observed time difference of arrival (OTDOA) and augmentation of a global navigation satellite system (A-GNSS).

In the case of network based positioning techniques, the E-SMLC may require information from the eNodeB (such as receive-transmit time difference measurements for supporting ECID). A protocol called the LPP-Annex (LPPa) is used to transport this information. LPP OTDOA ECID A-GNSS eXtensions To LPP (LPPe) LPP was designed to enable the key positioning methods (with enhancements) available on 2G and 3G networks, and provide the minimum set of data necessary for positioning.

Overcoming some limitation for positioning of the mobile in LTE the Primary Reference Signal (PRS) introduced in 3GPP is transmitted from the eNodeB from antenna port 6. While the PRS is a great enhancement its functionality is reliant upon the coordinate of the antenna for transmitting the PRS and not the location coordinate of the eND. eLBS for FIN however is able to improve the coordinate determination for the antenna using PRS and therefore provide the needed coordinates needed for the PRS itself.

To achieve a 3-dimensional position (latitude, longitude and altitude) with a high confidence of its correctness or rather confidence a fixed infrastructure node using eLBS FIN Trilateration can obtain a 3-dimensional position using a variety of different devices.

As part of the eLBS FID process in a LTE network, a SON may enable a network to configure, organize, and optimize itself without manual intervention. The LTE architecture using a CSBD with the use of SON may have the complete knowledge of the network.

A fixed infrastructure node, in this example a CBSD 2202, equipped with the ability of determining its geographic location in a LTE network may utilize SON functions to determine its latitude, longitude, and altitude allowing for precise geo coordination in a 3.5 GHz license area.

This may be useful in scenarios where an eNodeB is added to the CBSD network, when an eNodeB is introduced into the network but prior to providing service. Though the current discussion focuses on eNodeBs and LTE SON architecture in a CSBD, the concept may be extended to other FIDs with similar capabilities and applicable network architectures.

In this embodiment, the GPS position determination may be assisted by the use of other fixed infrastructure devices as well as wireless devices where Fixed Infrastructure Device (FID) A is unable to obtain GPS synchronization since it can only obtain information from 3 satellites instead of the minimum 4 required for an initial position location determination.

In an embodiment, FID (A) and FID (B) may discover each. The two FIBs can then establish communication between each other. Once FID(A) and FID(B) discover each other FID(A) initiates a request assistance in determining GPS location from FID(B). FID(B) responds to FID(A) and establish the distance between FIB(A) and FIB(B). This can include bearing direction measurement as well. GPS timing information is then sent either with the Ranging and Bearing information response from FID(B) or as a separate communication to FID(A).

FID(A) having the ranging information, and potentially bearing, to FID(B) is able to offset the GPS timing information FID(B) provides to FID(A) from a GPS source that FID(A) is unable to receive information from.

In an embodiment in which FID(A) is only able to obtain initial information from two GPS satellites, Satellite (1) and Satellite (2). In this embodiment, FID(B) sends to FID(A) not only GPS timing information but also positional information for the third GPS satellite the FID(A) needs.

In another embodiment in which only 1 satellite, Satellite (1), is visible to FID(A). In this embodiment, FID(B) provides GPS satellite information about three satellites to FID(A).

In an embodiment, several FIDs may communicate with each other in order to share location information to include latitude, longitude, and altitude data with each other. The various FIDs can be of the same infrastructure type, i.e. LTE eNodeBs, LTE small cells, LTE femto cells, Wi-Fi access points, Bluetooth Beacons or other radio access devices. The FIDs can also be of mixed infrastructure or technology types where for example FID (A) is a LTE small cell, FID (B) is WiFi Access point, FID (C) is a Bluetooth Beacon and FID (T) is another other wireless technology platform.

In an embodiment, various FIDs may communicate and share location information, to include latitude, longitude, and altitude and optionally bearing information, between each other. Additionally, it is possible to have wireless devices access the FID utilizing eLBS for the wireless device to provide an enhanced location update for the FID to use.

In an embodiment, the FID may already have determined a latitude, longitude, and/or altitude or location, however the wireless devices, or other FIDs, can be used to improve the accuracy of the FIDs latitude, longitude, and/or altitude measurements or to verify its location information.

In an embodiment, a single wireless device providing location information, to include latitude, longitude, and altitude information to FID. In other embodiments, multiple wireless devices may provide location information to the FID enabling the FID to determine its position using wireless devices that it can communicate with.

Another embodiment may include the FID turning on and acquiring its initial positional fix by using GPS, Cell ID, WiFi ID, enhanced LoranC or other location determination methods. The FID can also obtain its near term positional fix estimate from small cells used in interior locations, QC codes, and/or RFID chips.

Once an initial fix is obtained regardless of its accuracy, a decision is made to determine if additional improvements are desired. The trilateration portion of eLBS will perform calculations to determine its location with regards to other wireless devices both fixed and mobile.

A number of different communication formats may be used when an FID requests a position update from other devices. The specific formats and communication medium can vary, however the concept is that the initial position is determined through the use of time of flight (TOF) through making two message inquiries. Additionally, the RSSI can be read as well. By knowing the TOF and RSSI the distance from one device to another can be better determined.

Once the initial handshake has taken place the FID and/or wireless devices will exchange its location information with another FID or wireless device. The other FID or wireless device will also provide known points and device providing its location information to include any or all of latitude, longitude, altitude, relative bearing information and/or a confidence value regarding the information.

In an embodiment, trilateration may include Dead Reckoning for use with Fixed Infrastructure Devices not because the FID are moving but because when they are initially installed Dead Reckoning can be used to help determine the initial latitude, longitude, and/or altitude for the device as it gets moved toward the install point. For example, if the FID is to be installed in a GPS stressed environment then an initial GPS fix can be obtained. The FID is then moved into the GPS stressed environment for installation having Dead Reckoning used to provide one method of making latitude, longitude, and/or altitude adjustments for its move to the new location. This can also be used where the object the FID is affixed to moves, such as a building having moved due to an earthquake, or taller buildings where the communication devices are mounted on the upper floors that may sway, or relocation, repair or improvement of the FID or what the FID is affixed to.

Figure 27:
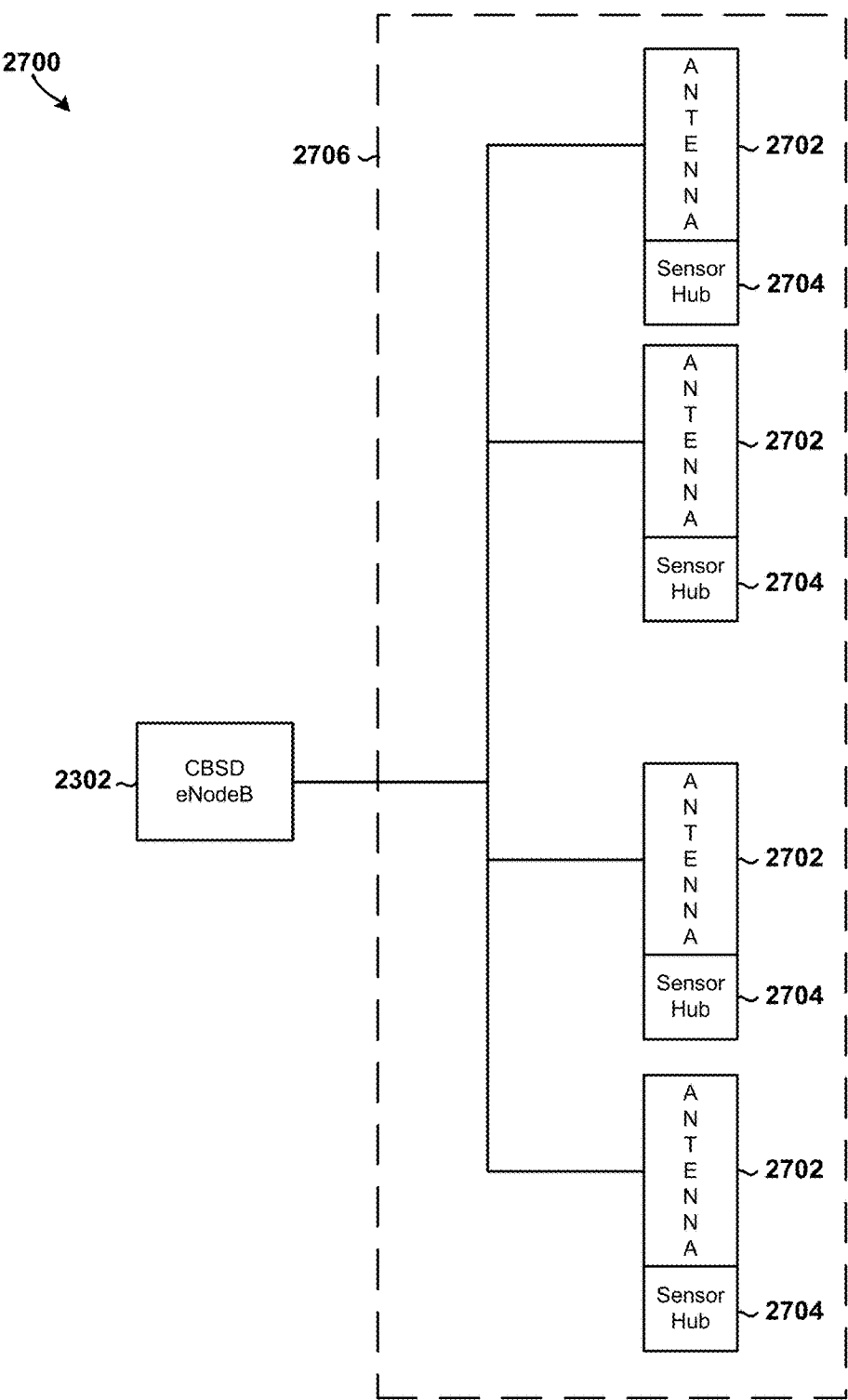
FIG. 27 is a component block diagram illustrating various components in a distributed antenna system that includes a sensor hub in accordance with the various embodiments.

FIG. 27 illustrates a system 2700 in which a small cell, CBSD 2202 or CBSD eNodeB 2302 is used in a distributed antenna configuration 2706. The individual antennas 2702 are fitted with a sensor hub 2704 which provides input into the enhanced location algorithm (e.g., eLBS component, eLBS FID component, eLBS FIN component, etc.) to determine the actual location of each antenna node within the CBSD 2202 itself. The sensor hub associated with the antenna allows for a more precise initial fix, and with the advent of additional Ue's in proximity to the antenna 2702, a more accurate latitude, longitude, and altitude position (e.g., a final location estimation set, a final location value, a best location estimate, etc.). The LTE Ue (2404) may have the capability of selecting which antenna (e.g., 2702a or 2702b) it will use to communicate with the LTE network through the LTE eNB 2802.

Figure 28A:
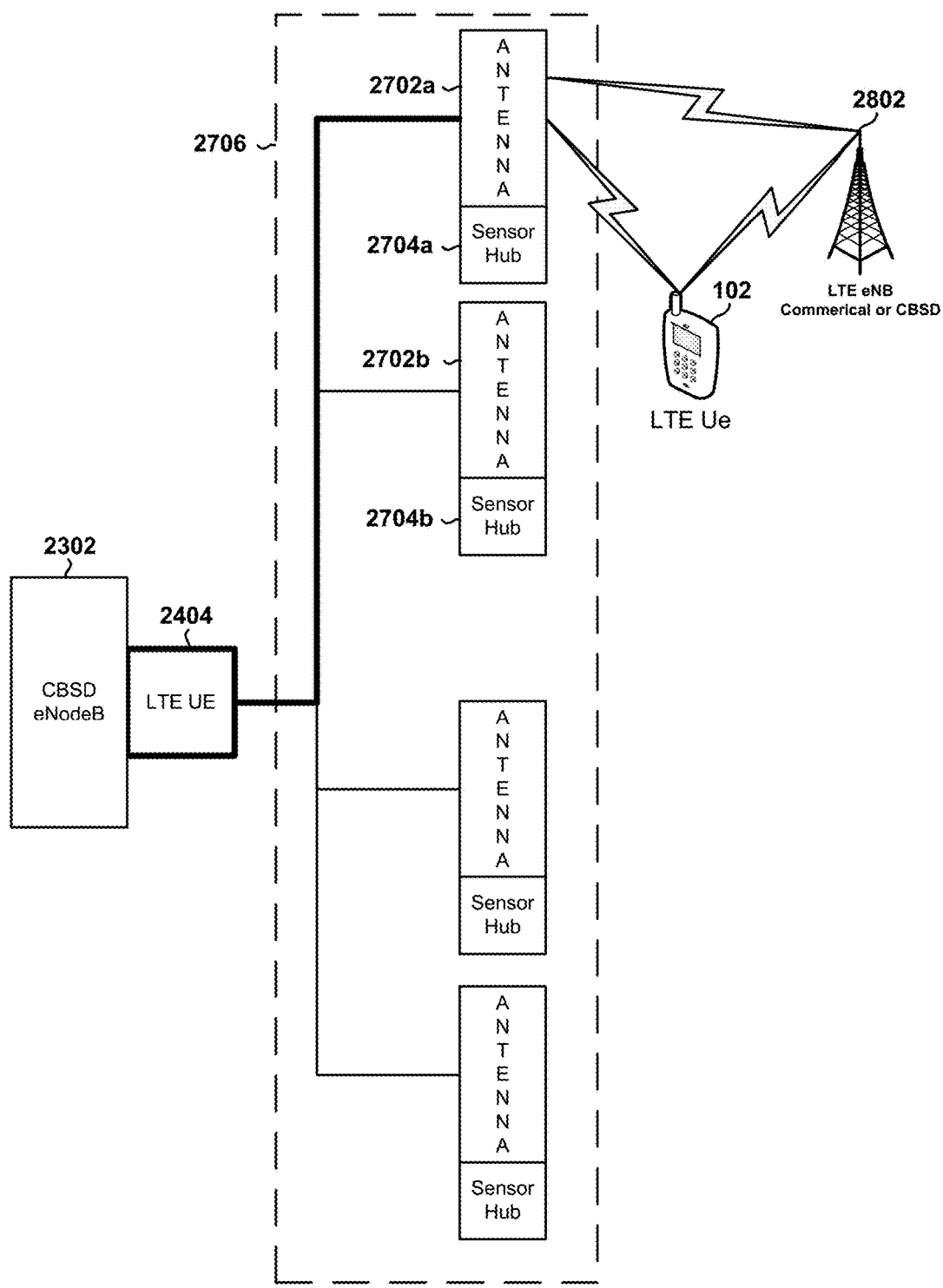
FIGS. 28A and 28B are component block diagrams illustrating various logical and functional components, communication links, and information flows in a system that includes a distributed antenna system configured to perform location based operations in accordance with the various embodiments.

FIG. 28A illustrates that there is no need to have a LTE Ue with each antenna 2702 (e.g., antenna 2702a and antenna 2702b) in the distributed antenna configuration 2706 since the CBSD eNodeB 2302 may be outfitted with a single LTE Ue integrated into it. In particular, FIG. 28 A illustrates that the antenna 2702a used for the CBSD eNodeB 2302 may be treated as a LTE Ue to connect to the commercial LTE eNodeB 2802 (or another CBSD eNodeB 2302) which has been permitted to transmit. That is, the CBSD eNodeB 2302 may be able to have the LTE Ue that is part of the CBSD eNodeB 2302 use each of the individual antennas 2702 one by one to obtain a more precise latitude, longitude, and altitude (e.g., a final location estimation set, a final location value, a best location estimate, etc.).

Figure 28B:
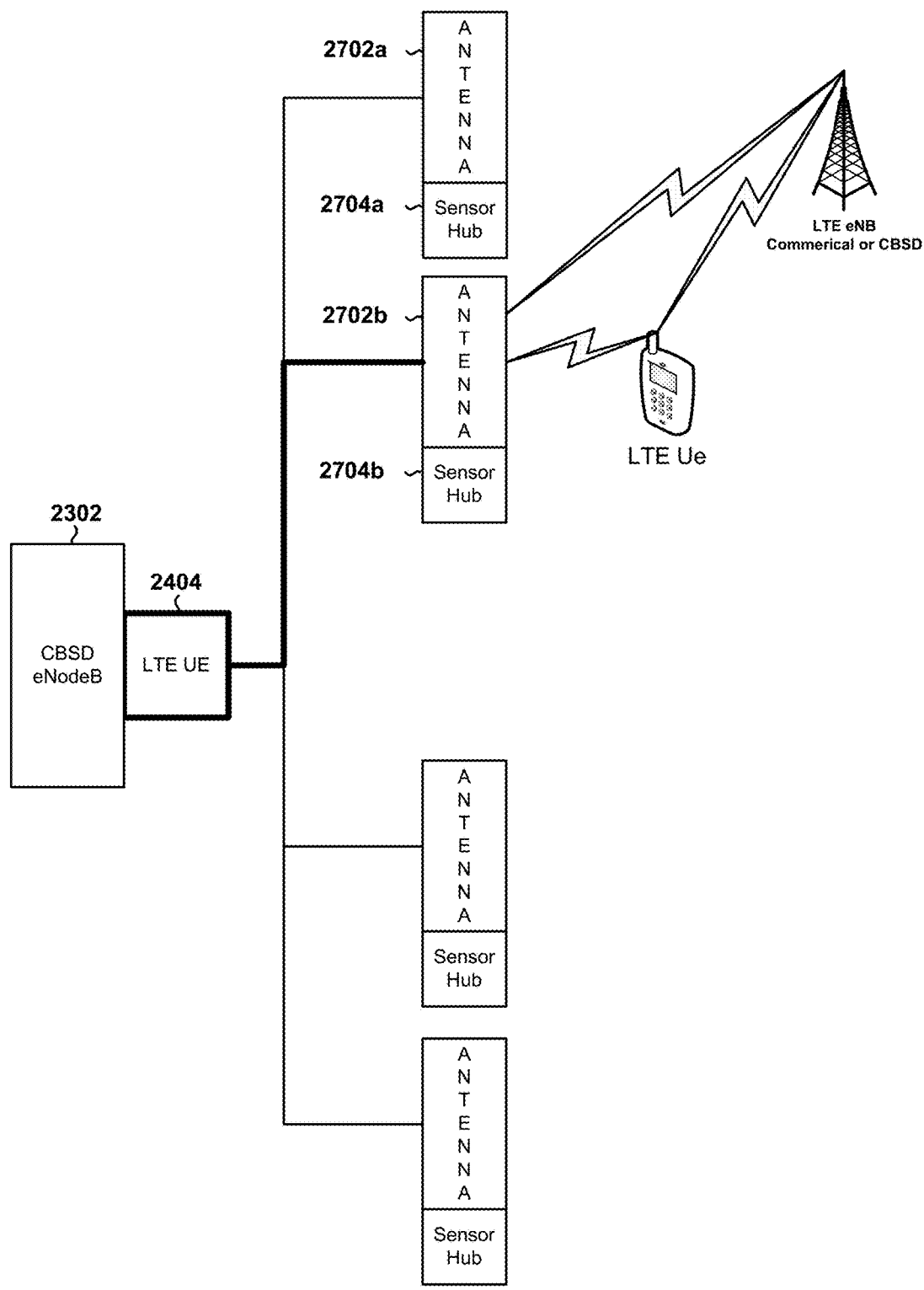

FIG. 28B illustrates a step in the process where a second antenna 2702b in the distributed antenna configuration 2706 may be used by the CBSD eNodeB 2302 for the LTE Ue that may be integrated with the CBSD eNodeB 2302. One skilled in the art may recognize the multiple variants to this type of configuration where any number of antennas or combinations of antennas for a DAS environment may be utilized either in series or parallel. Additionally, with the use of the sensor hub 2704 (e.g., sensor hub 2704a and sensor hub 2704b) it is possible to have the antennas communicate with each other, thereby employing eLBS to improve their latitude, longitude, and altitude coordinates (e.g., to compute a final location estimation set, a final location value, a best location estimate, etc.).

Figure 29:
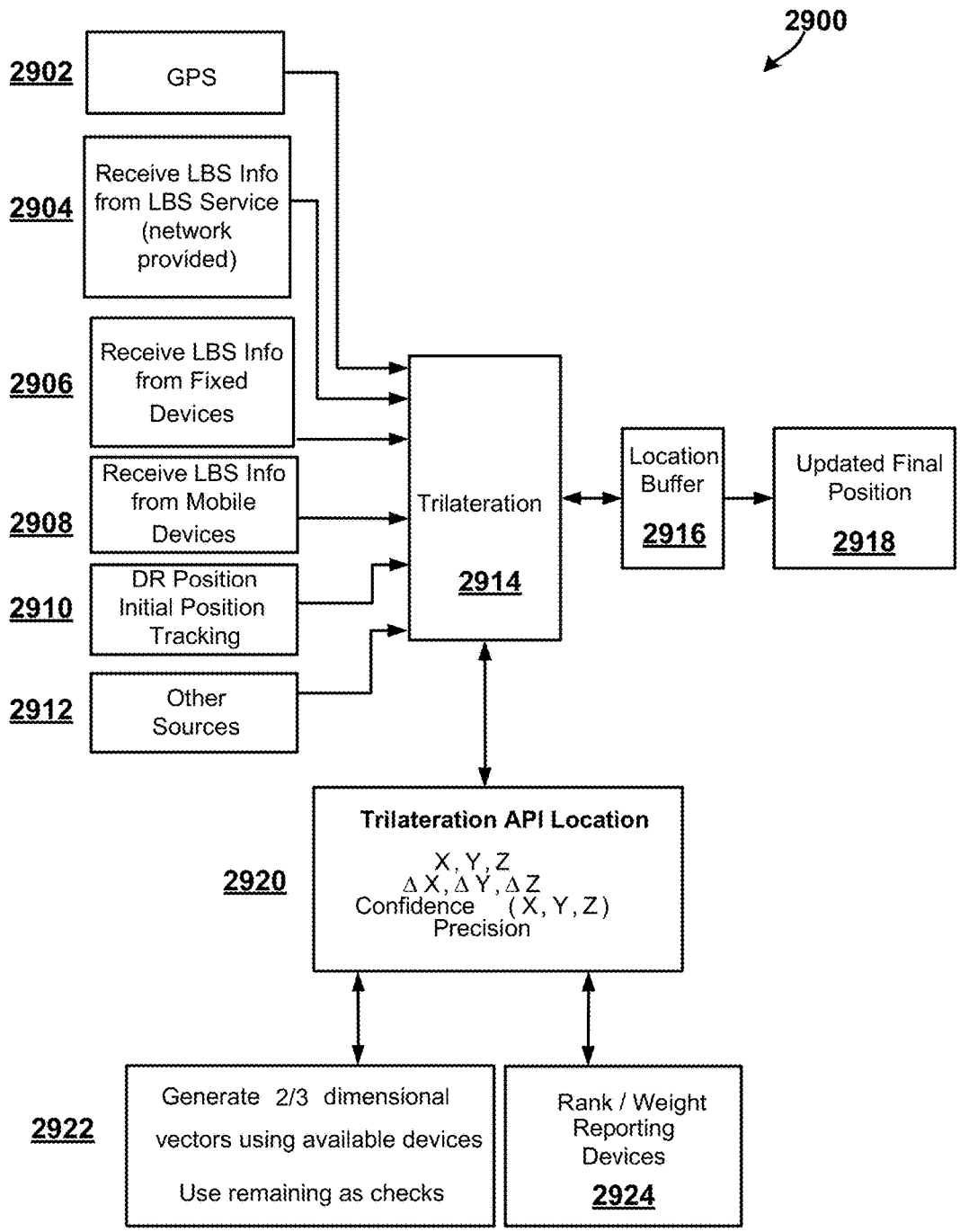
FIG. 29 is a sequence diagram illustrating an embodiment hybrid lateration method by which wireless devices may gain access to the network and perform enhanced location based operations.

FIG. 29 illustrates a high level algorithm that may be used for establishing the latitude, longitude, and altitude of the CBSD 2202 node or the antenna location in a DAS network for a CBSD 2202. More specifically, FIG. 29 illustrates various components, information flows, and operations in an example fixed infrastructure device system that is configured to perform enhanced location based service (eLBS) trilateration operations in accordance with an embodiment. The system includes location information inputs including GPS, CellID, WiFi ID 2902, LBS info (network provided) 2904, LBS info from fixed devices 2906, LBS info from mobile devices 2908, updated dead reckoning 2910 and other sources 2912.

The system also includes a trilateration component 2914. In blocks 2920-2924, the fixed infrastructure device/trilateration component 2914 may use the received input data to perform trilateration operations (e.g., trilateration API location operations, etc.), determine the geographical coordinates (e.g., latitude, longitude, and altitude coordinates) of the mobile device, generate a trilateration position estimate value, generate a final position set (e.g., a final location estimate value), generate an updated final position set (e.g., x, y and z coordinates, an updated position estimate value, more precise information, etc.), and send the updated final position set to the output/storage component 2914. The trilateration operations may include operations for implementing any or all of the techniques discussed in this application, including time of arrival, angle of arrival, mobile-to-mobile trilateration, lateration, multilateration, triangulation, etc.

In the example illustrated in FIG. 29, in block 2920, the fixed infrastructure device generates/computes/receives trilateration location values (X, Y, Z), a time value, trilateration location delta values ($\Delta X$, $\Delta Y$, $\Delta Z$), confidence values ($C_X$, $C_Y$, $C_Z$), and one or more precision values, the combination of which may be stored or used as a waypoint (or a data set or estimate value). In block 2924, the fixed infrastructure device may rank or assign weights to the current or historical waypoints (i.e., previously computed waypoints). In block 2922, the fixed infrastructure device may generate two or three dimensional vectors using the waypoints (current and/or historic). In an embodiment, the fixed infrastructure device may generate the vectors based on their rank/weights (e.g., by including/using only waypoints having a rank that exceeds a threshold value).

As mentioned above, the trilateration component 2914 may send the computed updated final position set to the output/storage component. The output/storage component may store the updated final position set in a location buffer 2916 or the illustrated updated final position datastore 2918. In block 2918, the output/storage component may use the updated final position set (more precise location information) to provide a location based service. Additionally, the output/storage component may send the updated final position set 2918 to other devices, such as to a network server or the other mobile devices in the communication group.

FIG. 29 includes dead reckoning for use with fixed infrastructure devices, not because the FID are moving, but because when they are initially installed, dead reckoning could be used to help determine the initial latitude, longitude, and/or altitude for the device as it gets moved toward the install point. For example, if the FID is to be installed in a GPS stressed environment then an initial GPS fix can be obtained prior to entering the GPS stressed environment. The FID is then moved into the GSP stressed environment for installation having dead reckoning used to provide one method of making latitude, longitude, and/or altitude adjustments for its move to the new location. This can also be used where the object the FID is affixed to moves, such as a building having moved due to an earthquake, or taller buildings where the communication devices are mounted on the upper floors that may sway, or relocation, repair or improvement of the FID or what the FID is affixed to.

Thus, FIG. 29 indicates the various inputs (i.e. inputs 2902-2912) that make up a eLBS Trilateration process for Fixed Infrastructure Nodes (FIN) or FIN trilateration process 2900. The output for the FIN trilateration process 2900 is a location defining three (3) points from which a reliable positional determination can take place. This embodiment is similar to the embodiment illustrated in FIG. 31 and described above. However, in this embodiment, because the trilateration process is being used to better determine the location of a fixed infrastructure device, the dead reckoning data of block 2910 is used to determine the initial position when installing the node or its antenna. Also, eLBS FIN Trilateration process shown in FIG. 29 utilizes inputs from GPS, Cell ID, WiFi ID, Beacons, RFIDs, Mobile Devices (Ue's) or other external devices that provide a location position of the device in blocks 2902 through 2912, which are similar to the operations in block 3102 through 3112 described above. The external devices can be both active and passive devices.

The eLBS FIN Trilateration process may also use dead reckoning when placing the installing the node or antenna where the antenna or node has sensors, incorporated in it including GPS, Accelerometer, two and three-dimensional Gyro, Compass, and barometers and other advanced sensors enabling the device to estimate how far it has transverses over a particular period of time in any three dimensions in space from a predetermined fixed reference point. The eLBS FIN Trilateration method may also utilize other mobile devices to obtain its position relative to those devices. The mobile devices used for positioning may be non-stationary, enabling multiple waypoints to be established at discrete periods of time. The eLBS FIN Trilateration operations with other mobile devices may be unique in this case because the mobile devices rely on the eNB to obtain position information. By utilizing an iterative process with eLBS FIN trilateration, the actual position of the eNB and the eNB's antenna used for the position reference signal (PRS) may be better determined, thereby enhancing the location determination for the mobile device.

The trilateration system illustrated in FIG. 29 includes location information inputs including GPS 2902, LBS info (network provided) 2904, LBS info from fixed devices 2906, LBS info from mobile devices 2908, initial dead reckoning 2910 and other sources 2912.

The system also includes a trilateration component 2914. In blocks 2920-2924, the fixed infrastructure device/trilateration component 2914 may use the received input data to perform trilateration operations (e.g., trilateration API location operations, etc.), determine the geographical coordinates (e.g., latitude, longitude, and altitude coordinates) of the mobile device, generate a trilateration position estimate value, generate a final position set (e.g., a final location estimate value), generate an updated final position set (e.g., x, y and z coordinates, an updated position estimate value, more precise information, etc.), and send the updated final position set to the output/storage component 3114. The trilateration operations may include operations for implementing any or all of the techniques discussed in this application, including time of arrival, angle of arrival, mobile-to-mobile trilateration, lateration, multilateration, triangulation, etc.

In the example illustrated in FIG. 29, in block 2920, the fixed infrastructure device generates/computes/receives trilateration location values (X, Y, Z), a time value, trilateration location delta values ($\Delta X$, $\Delta Y$, $\Delta Z$), confidence values ($C_X$, $C_Y$, $C_Z$), and one or more precision values, the combination of which may be stored or used as a waypoint (or a data set or estimate value). In block 2924, the fixed infrastructure device may rank or assign weights to the current or historical waypoints (i.e., previously computed waypoints). In block 2922, the fixed infrastructure device may generate two or three dimensional vectors using the waypoints (current and/or historic). In an embodiment, the fixed infrastructure device may generate the vectors based on their rank/weights (e.g., by including/using only waypoints having a rank that exceeds a threshold value).

As mentioned above, the trilateration component 2914 may send the computed updated final position set to the output/storage component. The output/storage component may store the updated final position set in a location buffer 2916 or the illustrated updated final position datastore 2918. In block 2918, the output/storage component may use the updated final position set (more precise location information) to provide a location based service. Additionally, the output/storage component may send the updated final position set 2918 to other devices, such as to a network server or the other mobile devices in the communication group.

The eLBS Trilateration process at a high level shown in FIG. 29 may also use a kalman filter approach used for the trilateration process involving various external devices which the anchor eNB (e.g., the anchor device, AD, or the device that receives location information from an external device or ED) and the eNB's antenna determines its position from but the various external trilateration position is fed into another Kalman filter process which also uses as inputs from other external devices and systems which are reporting what the current devices location (latitude, longitude and altitude) is.

The output of the entire eLBS trilateration process is a position location (latitude, longitude and altitude) which is used by the FIN device to report its current position (latitude, longitude and altitude) or use that position for another function including the enhanced position for each of the antennas used for the PRS.

Figure 30A:
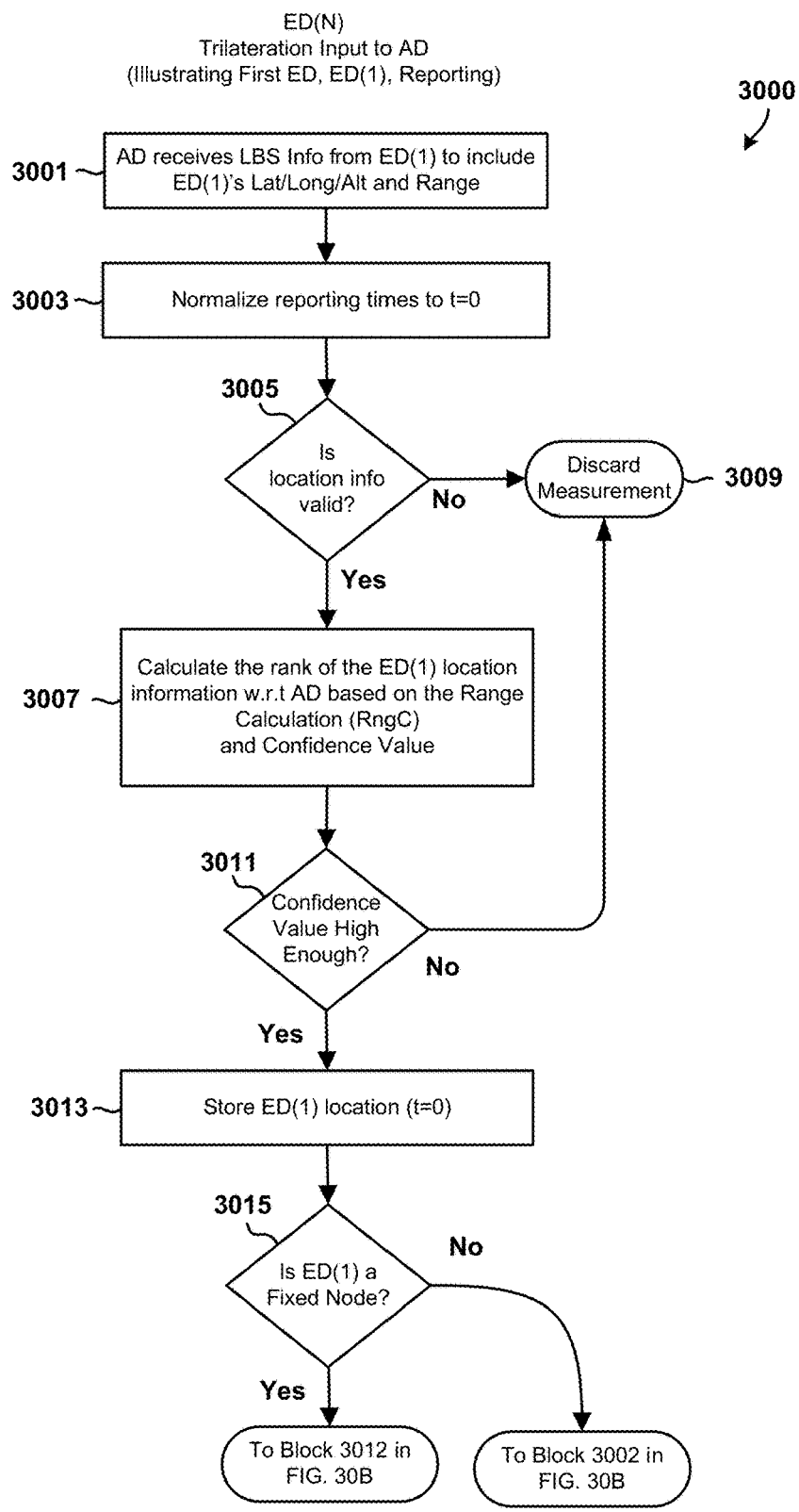
FIGS. 30A through 30D are a process flow diagrams illustrating various operations in a system configured to perform enhanced location based operations using fix infrastructure devices (eLBS FID, eLBS FIN, etc.) to determine the locations of one or more CBSDs in accordance with some various embodiments.
Figure 30B:
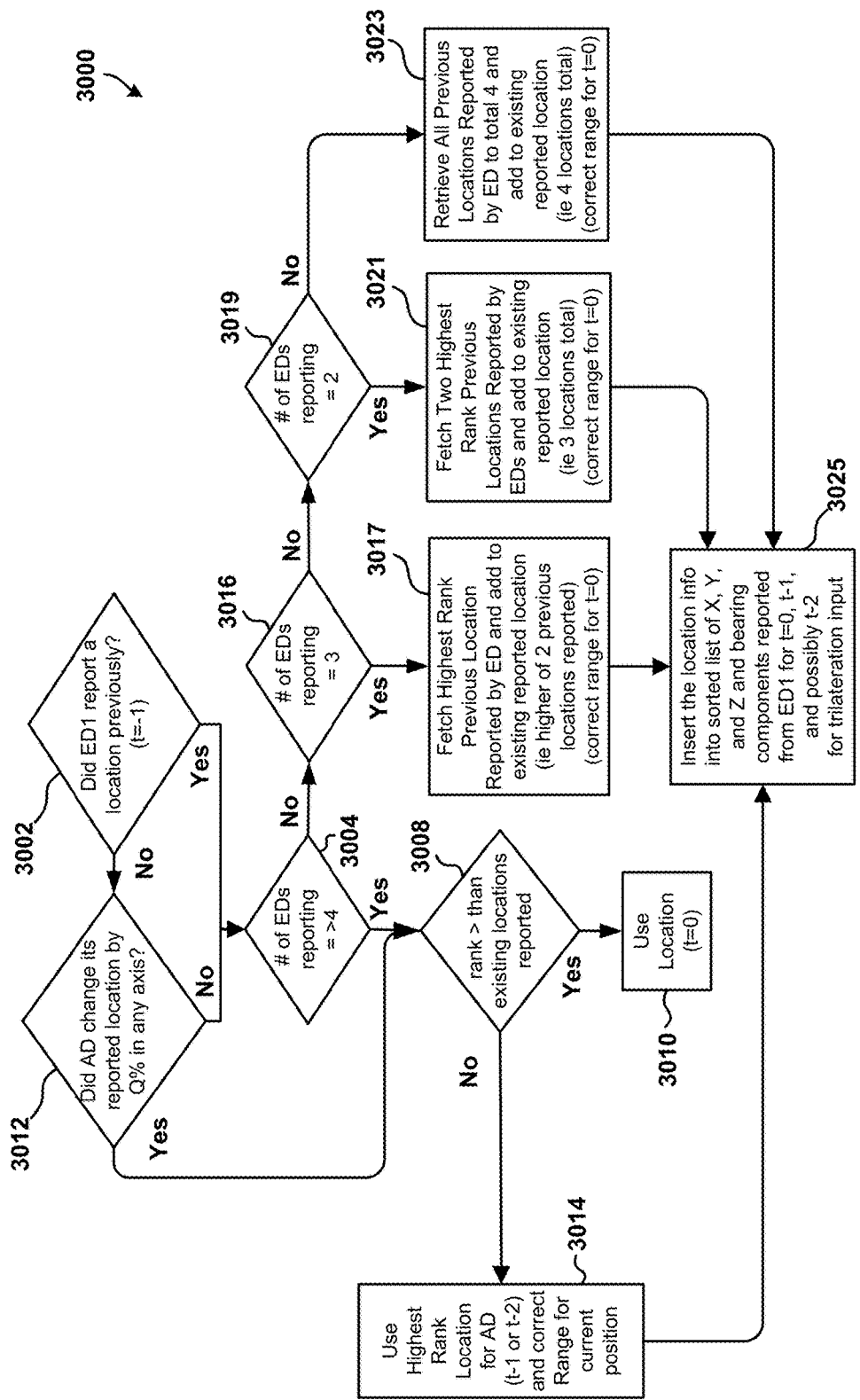

FIGS. 30A and 30B illustrate methods for receiving and using (e.g., in an anchor device (AD)) an external device's (ED's) position information to provide an enhanced location based service. The anchor device or "AD" may be any mobile or fixed wireless device (e.g., a CBSD, an anchor eNodeB, beacon, etc.) that receives location information from other devices (e.g., wireless transceivers in the communication group, LTE UEs, etc.). The external devices or "EDs" may be any device (e.g., CBSD eNodeB, LTE UE, network server, wireless transceiver, etc.) that sends location information to the AD. Thus, in various embodiments, the ED may be a fixed infrastructure node (FIN) or a mobile device (Ue). In an embodiment, the AD may be a CBSD 2202. In an embodiment, one or more of the EDs may be CBSDs 2202.

In the methods illustrated in FIGS. 30A and 30B, the AD may be configured to determine the ED's relative position (e.g., relative to itself) and compare the determined relative position to a range value provided by the ED. The range value may be value that is calculated in the ED, and which identifies a distance between the ED and the AD. For ease of legibility, the method illustrated in FIG. 30A represents an example for receiving data from a single device. It should be understood that, in other embodiments, the same or similar operations may be performed based on information received from multiple devices.

At block 3001, an AD may receive location information (e.g., LBS information, etc.) from ED(1), which may be a fixed or mobile device. The location information may include a latitude value, a longitude value, an altitude value, range information, and a time value. In an embodiment, the location information may be a waypoint. In block 3003, the AD may normalize the location information timing to a time (e.g., t=0). Said another way, the AD may normalize its measured location and/or received location information to a common time (e.g., based on the processors cycle) so that the ad-hoc positions reported by all the EDs and other sensors are normalized (or synchronized) to a unified time. In some embodiments, in block 3003, the AD may perform a pseudo synchronization method. In some embodiments, after normalizing/synchronizing the location information timing, the AD may determine and assign a confidence value to each unit of location information (e.g., each waypoint, etc.) provided by each ED. In block 3004, the AD may calculate a rank for the received information (e.g., with respect to the current device, etc.) based on the range calculation (RngC) and confidence value.

In determination block 3005, the AD may determine whether the received location information is valid. Validity may be determined on a variance between expected and actual relative positions. For example, the AD may be configured to compute or determine an expected position (or expected relative position) based on previous trilateration results, previous dead reckoning results, or data received from other external sensors or devices. In some embodiments, the location may be calculated based on the location information provided to the AD by the ED.

In response to determining that location information is not valid, (i.e., determination block 3005="No"), the AD may discard the measurement in block 3009. If a location value is determined to not be valid and/or has a confidence that is too low (i.e., does not exceed a threshold value), it can be temporarily stored and marked to be discarded. If the AD receives location information from several EDs having low confidence values associated with the location information which were initially determined not to be valid, but the EDs reported location information have high precision, the AD may take those low confidence measurements as being valid. In this case the measurements have the marker for discarding removed and are stored for use in block 3007. In response to determining that a location information is valid, (i.e., determination block 3005="Yes") the AD may use the information in block 3007.

In particular, in block 3007, the AD may calculate a rank for location information provided by ED(1) with respect to AD based on the range calculation and confidence value of the location information provided by ED(1). In determination block 3011, the AD may determine whether the location information provided by ED(1) has a sufficiently high confidence value. In response to determining that the location information provided by ED(1) does not have a sufficiently high confidence value (i.e., determination block 3011="No"), the AD may mark the location information provided by ED(1) to be discarded in block 3009. This is similar to the AD making a determination that the information is not valid, but the location information has a confidence value, and range value/calculation associated with it. In response to determining that a location information has a sufficiently high confidence value, the AD, in block 3013, may stores the location information as a waypoint (e.g., as a current location waypoint) for ED(1) in its location database.

With reference to FIG. 30B, in determination block 3002, the AD may determine whether the ED previously reported a location (or sent a valid waypoint, etc.). In response to determining the ED did not previously report a location, (i.e., determination block 3002="No"), in determination block 3012, the AD may determine whether the AD moved (or changed its reported location) by more than a distance or a percentage value in any axis or direction.

In response to determining that the AD changed its position by a set percentage in any axis (i.e., determination block 3012="Yes"), the AD may determine whether a rank value associated with reported location information (or reported waypoint) exceeds (e.g., is greater than, etc.) the ranks of the other stored or received location information (or received waypoints) in determination block 3008. In response to determining that the rank value associated with reported location information does not exceed the ranks of the other stored or received location information, in block 3014, the AD may select and use the highest ranked waypoint, which may be a previously computed and stored waypoint for AD (e.g., for t=t−1 or t=t−2 etc.) with its range corrected to the t=0 for the current position of AD. In block 3025, the AD may insert the waypoint into a sorted list of coordinates X, Y, and Z and bearing components reported from ED1 for t=0, t=t−1, or possibly t=t−2 accordingly.

In response to determining that the AD did not move (or change its reported location) by more than the distance or percentage value in any axis or direction (i.e., determination block 3012="No"), that the AD is stationary, or that the ED did report a location (i.e., determination block 3002="Yes"), the AD may determine whether four or more EDs are currently reporting location information (or whether waypoints where received from four or more devices) in determination block 3004. In response to determining that four or more EDs are reporting location information (i.e., determination block 3004="Yes"), the AD may determine whether a rank value associated with reported location information (or reported waypoint) exceeds (e.g., is greater than, etc.) the ranks of the other stored or received location information (or received waypoints) in determination block 3008.

In response to determining that the rank of the reported waypoint exceeds the ranks of the other stored or received waypoints (i.e., determination block 3008="Yes"), in block 3010 the AD may store the location information (or received waypoint) in memory and/or mark the information as being suitable for use as the current location waypoint or location information for t=0. On the other hand, in response to determining that the rank of the reported waypoint does not exceed the ranks of the other stored or received waypoints (i.e., determination block 3008="No"), the AD may select and use the highest-ranking waypoint/location information in block 3014.

In response to determining that four or more EDs are not reporting location information (i.e., determination block 3004="No"), in determination block 3016 the AD may determine whether three EDs are currently reporting location information. In response to determining that three EDs are reporting location information (i.e., determination block 3016="Yes"), in block 3017 the AD may retrieve the highest-ranking location information or the highest ranked stored waypoint from memory. The highest ranked stored waypoint may be a previously reported waypoint (received from any of the reporting EDs) that has the highest rank. The retrieved waypoint may be added to the existing three reported waypoints (i.e., the waypoints received from each of the three reporting EDs) to obtain a total of four waypoints. The waypoints may time normalized to t=0 and range corrected for t=0, and in block 3025, the AD may insert the waypoints into a sorted list of coordinates X, Y, and Z and bearing components reported from ED1 for t=0, t=t−1, or possibly t=t−2 accordingly.

In response to determining that three EDs are not reporting location information (i.e., determination block 3016="No"), in determination block 3019 the AD may determine whether two EDs are currently reporting location information. In response to determining that two EDs are reporting location information (i.e., determination block 3019="Yes"), in block 3021 the AD may retrieve two previously reported highest ranked waypoints (received from any of the reporting EDs). The AD may add the retrieved waypoints to the existing two reported waypoints to obtain a total of four way points. The previously reported waypoints may be time normalized to t=0 and range corrected for t=0. In block 3025, the AD may insert the waypoints into a sorted list of coordinates X, Y, and Z and bearing components reported from ED1 for t=0, t=t−1, or possibly t=t−2 accordingly.

In response to determining that two EDs are not reporting location information (i.e., determination block 3019="No"), in block 3023 the AD may retrieve three of the highest ranked previously reported waypoints stored in memory to obtain a total of four waypoints. The previously reported waypoints may be time normalized to t=0 and range corrected for t=0. In block 3025, the AD may insert the waypoints into a sorted list of coordinates X, Y, and Z and bearing components reported from ED1 for t=0, t=t−1, or possibly t=t−2 accordingly.

Block 3025 uses the waypoints in the sorted list as input for the various method for trilateration disclosed in this application, including the methods for determining the position location accuracy (using the trilateration) for multiple devices reporting locations. The output of the AD's trilateration for each EDs, the reported positions, may be ranked with respect to each other based on accuracy and confidence. Using these values, possibly discarding or ignoring those values which are considered inferior or invalid, provides for achieving highest position location accuracy to be achieved. The output of the eLBS trilateration operations may be a position/location (or waypoint) that is used by a device to report its current position (or for other functions, such as to provide an enhanced location based service).

Figure 30C:
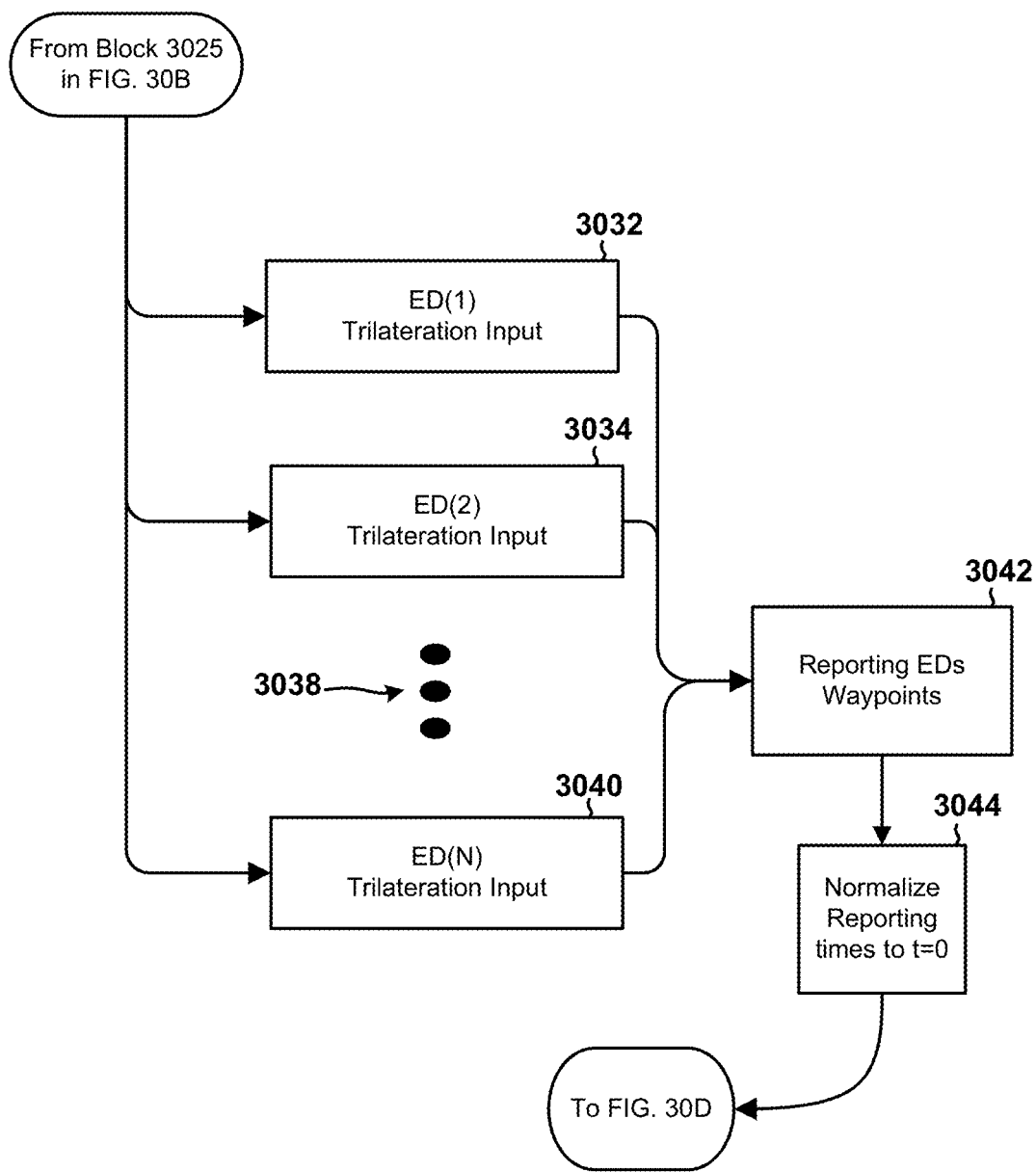
Figure 30D:
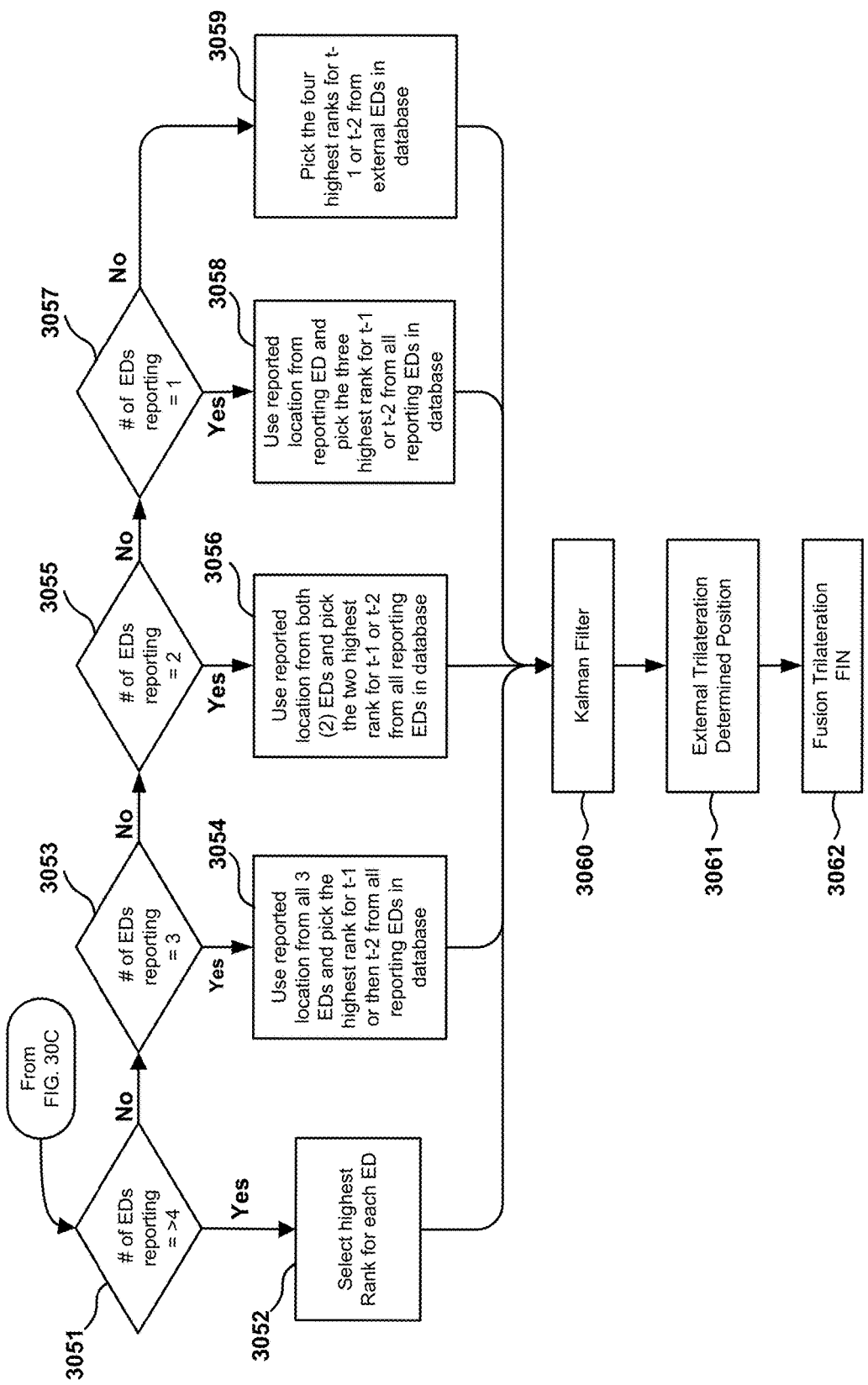

FIGS. 30C and 30D illustrate processes for determining the position location accuracy (e.g., for determining the latitude, longitude, and altitude of a CBSD 2202 node or antenna in DAS for a CBSD 2202) using the trilateration methods for multiple devices reporting locations. In particular, FIG. 30C illustrates the output of block 3025 (illustrated in FIG. 30B) may be used (for each reporting ED, which may be a fixed infrastructure device (FID) or fixed infrastructure node (FID)) as trilateration input. Block 3032 illustrates the trilateration input for a first ED, ED(1), which is process 3000 for ED(1). Block 3034 illustrates the trilateration input for a second ED, ED(2) which is process 3000 for ED(2). Block 3038 illustrates one or more EDs providing trilateration input. Block 3040 illustrates the trilateration input for an Nth ED, ED(N) which is process 3000 for ED(N). All of the trilateration input may combined in block 3042 as reporting EDs waypoints. All of the separate ED's waypoints may be normalized to a time, t=0, in block 3044.

With reference to FIG. 30D, in determination block 3051, the AD may determine whether four or more EDs are reporting location information. In response to determining four or more EDs are reporting location information (i.e., determination block 3051="Yes"), in block 3052, the AD may select the highest ranked waypoint reported for each ED. The AD may provide the selected waypoints as inputs to a kalman filter in block 3060.

In response to determining fewer than four EDs are reporting location information (i.e., determination block 3051="No"), in determination block 3053, the AD may determine whether three EDs are reporting location information. In response to determining three EDs are reporting location information (i.e., determination block 3053="Yes"), in block 3054, the AD may use the reported waypoints from all three EDs and selects the highest ranked previously reported waypoint for t=t-1 and/or t=t-2 for any ED in the database (and in so doing obtains a total of four waypoints). The AD may then provide the four waypoints to a kalman filter in block 3060.

In response to determining that fewer than three EDs are reporting location information (i.e., determination block 3053="No"), in determination block 3055 the AD may determine whether two EDs are reporting location information. In response to determining two EDs are reporting location information (i.e., determination block 3055="Yes"), in block 3056 the AD may use the reported waypoints for both EDs and select the two highest ranked previously reported waypoints for t=t-1 and/or t=t-2 (for any reporting ED in the database) to obtain a total of four waypoints. The AD may provide these four waypoints to the kalman filter in block 3060.

In response to determining that fewer than two EDs are reporting location information (i.e., determination block 3055="No"), in determination block 3057 the AD may determine whether one ED is reporting location information. In response to determining that one ED is reporting location information (i.e., determination block 3057="Yes"), in block 3058 the AD may use the reported waypoint and the three highest ranked previously reported waypoints for t=t-1 and/or t=t-2 for the any EDs in the database to obtain a total of four waypoints. The AD may provide these four waypoints to the kalman filter in block 3060.

In response to determining no EDs are reporting location information, (i.e., determination block 3055="No"), in block 3059 the AD may retrieve the four highest ranked waypoints, and provides these four waypoints to a Kalman filter in block 3060.

The kalman filter in block 3060 may be used to generate an external trilateration determined position 3061 for time period 0 (t=0). This value may be fed as input to the fusion trilateration process 3062 to generate filtered LBS data (e.g., a filtered LBS estimate value, etc.). The kalman filter 3060 may be a procedure, algorithm, method, technique, or sequence of operations for accomplishing the function of a kalman filter.

All the reporting EDs may be compared to each other, ranked prior to being sent to a kalman filter with the appropriate matrix and weighting factors.

The trilateration operations discussed above with reference to FIGS. 32-35 may be performed/conducted for various sources. The fusion trilateration operations discussed above enable the device to generate more robust position/location information having high confidence values (e.g., for accuracy, precision, etc.).

In the example illustrated in FIG. 30D, the anchor eNB or sub device (shown in FIGS. 45 and 46) of the eNB may receive location information (latitude, longitude and altitude) from external sources (such as other FIN or UEs), and may determine whether the location reported is indeed valid. Validity is based on relative position to itself and the confidence the reporting device position is correct. However, if the FIN eNB or sub device does not have confidence in its location (latitude, longitude and altitude) and several of the external devices also report similar positions which may be initially discarded the eNB may take those degraded measurements as possibly being within validity.

The eNB after determining quickly the validity of the reported device location (latitude, longitude and altitude) stores the value in its database. The eNB also normalizes the measurement to a common time based on the processors cycle so the ad-hoc positions reported by all the devices and other sensors are normalized or rather synchronized to a unified time.

Several decisions are made regarding the measurement received as well as the need to obtain previous positions or rather waypoints (WP) based on the number of devices reporting to the anchor eNB or its sub device.

The output of the eNB FIN trilateration process for each device is then feed into another process which utilizes the best reported positions (latitude, longitude and altitude) from all the reporting and devices that did report so the best position estimate (latitude, longitude and altitude) may be achieved. This process is shown in FIGS. 30C and 30D for FIN devices and/or mobile devices (since the FIN are fixed and not moving). In some embodiments, a FIN that is determined to have moved/moving may be treated as a mobile device in the trilateration process.

In example illustrated in FIG. 30D, all the FIN's or devices reporting are compared to each other and then ranked prior to being sent to a Kalman filter with the appropriate matrix and weighting factors provides an External Trilateration FIN Determined Position for time period 0 (t=0). And this value is then fed to the Fusion Trilateration. Also, in the example illustrated in FIG. 30D, all the UE's or devices reporting are compared to each other and then ranked prior to be sent to a Kalman filter with the appropriate matrix and weighting factors provides an External UE Trilateration Determined Position (latitude, longitude and altitude) value for time period 0 (t=0). And this value (trilateration input value) may be fed to the Fusion Trilateration subsystem or component.

Figure 31A:
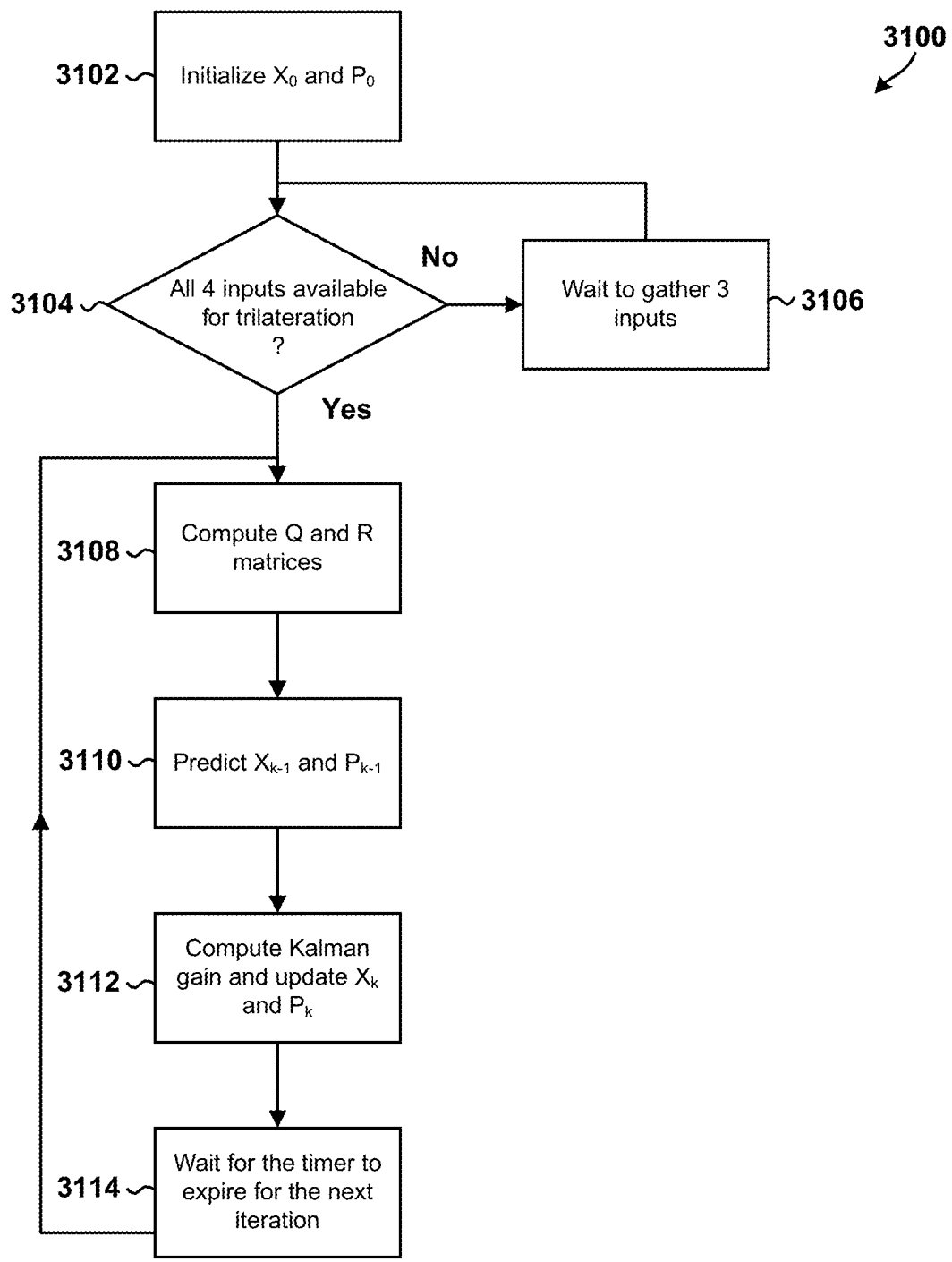
FIGS. 31A and 31B are a process flow diagrams illustrated in method of using a Kalman filter to determine the locations of one or more CBSDs in accordance with some embodiments.

FIG. 31A depicts an embodiment of a logic flow block diagram that may be used for the position algorithm that may be used for each axis for the determination of the latitude, longitude and altitude. The X axis may represent latitude, the Y axis may represent the longitude, and the Z axis may represents the altitude. The labels of the axis is arbitrary and would be understood by one of ordinary skill in the art to be labels for convenience purposes. The embodiment illustrated in FIG. 31A may be run in parallel for each of the components X, Y, and Z.

More specifically, FIG. 31A is a flow diagram illustrating a process 3100 using 3D Kalman filter for determining the latitude, longitude and altitude of the CBSD 2202 or the individual antennas of a DAS configuration for a CBSD 2202. The inputs, illustrated in block 3102, may include latitude X, longitude Y and altitude Y and the covariance $P_0$. These inputs may be used in the kalman filter matrix for either the Ue or FIN trilateration process. In block 3104, a determination is made as to whether four or more inputs are available for trilateration (e.g., 4 waypoints, etc.). If the answer is "No," then the system pauses to gather the missing inputs, block 3106. After a suitable amount of time, another determination is made as illustrated in block 3102 to determine whether all 4 inputs are now available for trilateration.

If all of the inputs are available, then the Q and R matrices of the Kalman algorithm are determined in block 3108, where "R" is a matrix representing the variance of the measurements and "Q" is a covariance matrix. In some embodiments, the Q matrix of the Kalman filter may be represented via Q matrix information structure, and R matrix of the Kalman filter may be represented via R matrix information structure.

In block 3110, the updating process of the position begins. A location estimate for a Cartesian coordinate system may be represented by the expression: $L_k = [x, y, z, v_x, v_y, v_z, a_x, a_y, a_z]$.

The new position $(X,Y,Z)_{k-1}$ at time k−1 and with a covariance $P_{k-1}$ at time k−1 is predicted based on the previous position and the Q and R matrices.

In block 3110, the Kalman gain "K" is computed for the current time interval. The gain may be a product of the estimated covariance, and the measurement variance "R," and may thus be represented by the expression: $K_k = P_k^- \cdot H^T \cdot (H \cdot P_k^- \cdot H^T + R)^{-1}$ Kalman gain depends on the current state estimate and the accuracy of the measurements. As the accuracy of the measurements increase the Kalman gain will be high placing higher weight on the measurements. After computing the Kalman gain, the systems waits for the timer to expire before performing another iteration.

Figure 31B:
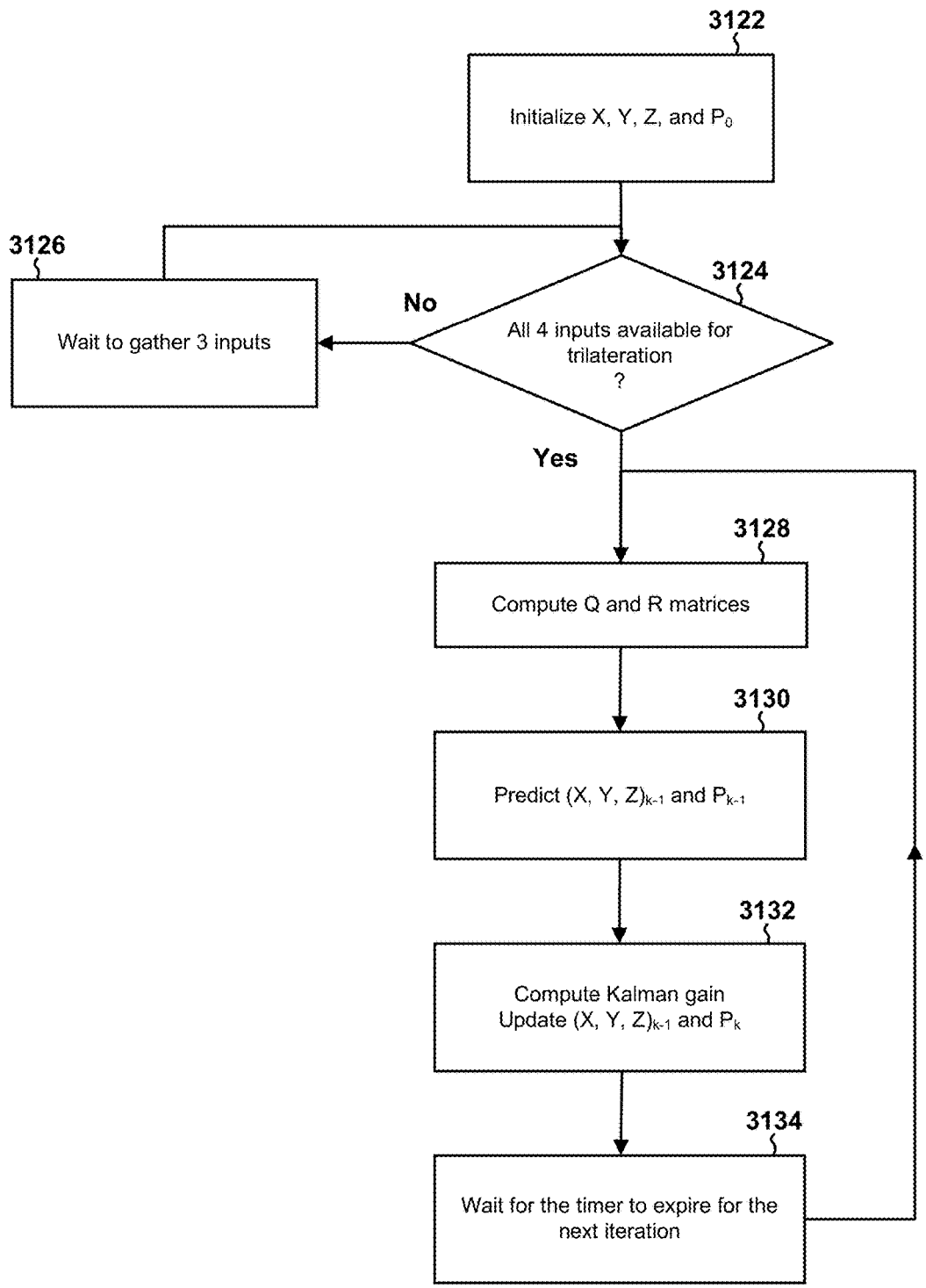

FIG. 31B depicts an embodiment of a logic flow block diagram that may be used for a kalman filter algorithm flow involving a combined axis approach for determining the latitude, longitude and altitude of the CBSD 2202 or the individual antennas of a DAS configuration for a CBSD 2202. The embodiment illustrated in FIG. 31B may be run in parallel for each of the components X, Y, and Z.

FIG. 31B is similar to the process shown in FIG. 31A except it utilizes a single axis for the Kalman filter separating out latitude, longitude and altitude separately. That is, in block 3122, an initial latitude $X_0$ and an initial covariance $P_0$ are provided as a pair, an initial longitude $Y_0$ and an initial covariance $P_0$ are provided as a pair and an initial altitude $Y_0$ and an initial covariance $P_0$ are provided as a pair. Preferably the method is run such that the latitude, longitude, and altitude components are processed in parallel, i.e. at the same time.

In box 3124, a determination is made as to whether all four of the inputs are available for trilateration. If the answer is "No," then the system pauses to gather the missing inputs, block 3106. After a suitable amount of time, another determination is made as illustrated in block 3122 to determine whether all 4 inputs are now available for trilateration.

If all of the inputs are available, then the Q and R matrices of the Kalman algorithm are determined in block 3128, where "R" is a matrix representing the variance of the measurements and "Q" is a covariance matrix. Corresponding to the method illustrated in FIG. 31A, the latitude, longitude and altitude at time k−1 are calculated, block 3130 followed by calculation of the Kalman gain, block 3132.

In block 3132, the Kalman gain is computed separately for the latitude, longitude and altitude. In block 3134, the system waits for a timer to expire before moving to the next iteration.

Figure 32A:
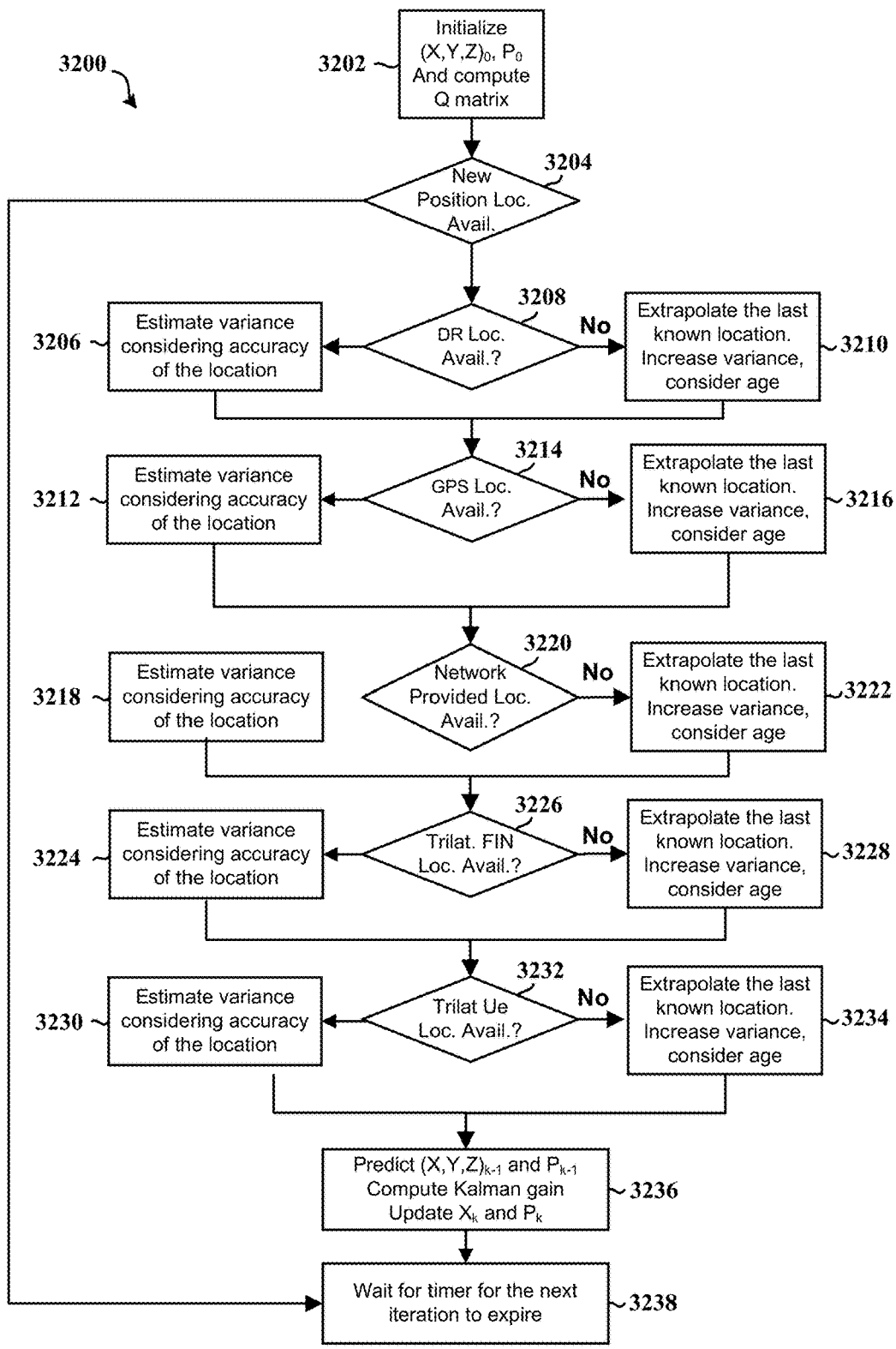
FIGS. 32A and 32B are component block diagrams illustrating various additional logical and functional components, information flows, and data suitable for use in various embodiments.
Figure 32B:
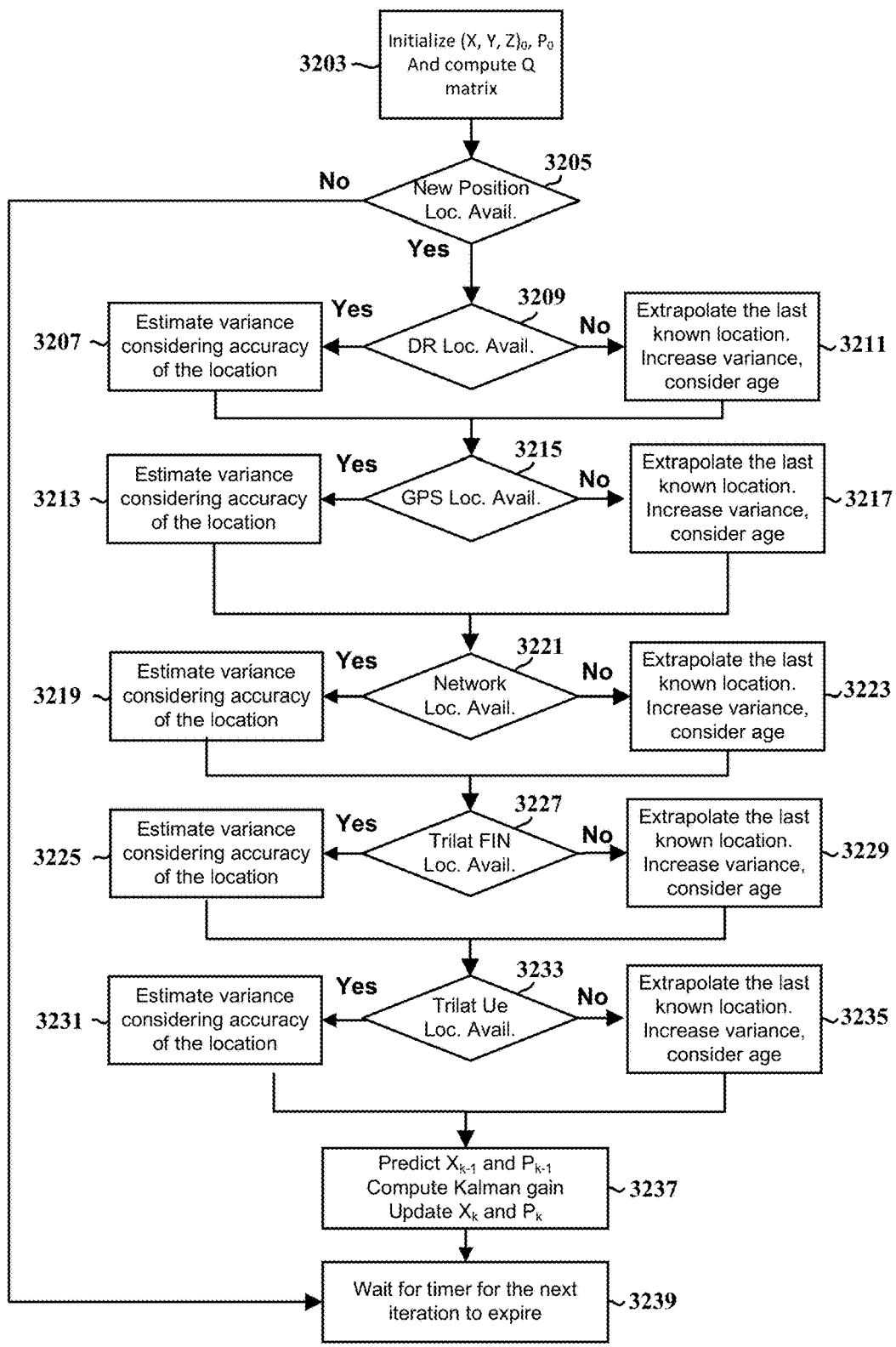

FIG. 32A depicts an embodiment of a logic flow block diagram that may be used for a determination of the latitude, longitude, and altitude of a CBSD 2202 or the CBSD DAS antenna using a single axis approach. FIG. 32B is similar to FIG. 32A except it depicts an embodiment for a process for determining the final position of the CBSD 2202 using a three-dimensional approach. The process applies to both a CBSD 2202 node as well as to the individual antennas used in a CBSD DAS network.

In particular, FIG. 32A depicts a method 3200 using a 3D eLBS Kalman filter process flow used for final determination of the FIN's (e.g., CBSD 2202 or the CBSD DAS antenna) latitude, longitude and altitude position using all the available sources that the eLBS algorithm has available to it. In block 3202, the initial latitude $X_0$, longitude $Y_0$, altitude $Z_0$ and the initial covariance $P_0$ are provided. In addition, the covariance matrix is calculated. In block 3204, a determination is made as to whether new position location information is available. If the determination is "No", then the system weights until the next iteration to expire. However, if new position location information is available, then the system determines if additional dead reckoning location information is available in block 3208. If no additional dead reckoning location information is available, then the system extrapolates the last known location and increases the variance considering the age of the location data in block 3210. If additional dead reckoning location information is available, then an estimate of the variance is made considering the accuracy of the location in block 3206.

Then, the system determines if any new GPS location data is available in block 3214. If new GPS location data is available, then an estimate of the variance is made considering the accuracy of the location in block 3212. If no new GPS location data is available, then the extrapolation is made based on the last known location, block 3216. Additionally the variance is increased considering the age of the location data.

Next, the system considers network provided location data in block 3218. If data is available, then an estimate of the variance is made considering the accuracy of the location in block 3218. If no network data is available, then the extrapolation of the last known location is made, block 3222. Additionally, the variances increased considering the age of the data. Next a determination is made as to whether there is additional trilateration FIN location data available in block 3226. If data is available, then an estimate of the variance is made considering the accuracy of the location in block 3224. If no network data is available, then the extrapolation of the last known location is made, block 3228. Additionally, the variances are increased considering the age of the data.

Next, the system determines if there is an additional trilateration data from mobile devices available in block 3232. If so, then an estimate of the variance is made considering the accuracy of the location in block 3230. If the answer is "No", then the location is extrapolated based on the last known location in block 3234. In addition, the variance is increased considering the age of the information.

All of the above additional location information is then used to predict a new location $(X,Y,Z)_{k-1}$ and a new variance $P_{k-1}$ in box 3236. In addition, the Kalman gain is calculated. Then, the system waits for the next time iteration to expire in block 3238.

FIG. 32B is similar to that depicted in FIG. 32A for establishing the final determination of the FIN. However, the process involves a single axis calculation where latitude is calculated separately than longitude and altitude. The three outputs are then combined for a composite latitude, longitude and altitude position for the FIN.

In block 3203, the initial latitude $X_0$, and the initial covariance $P_0$ are provided. In addition, the covariance matrix is calculated. In block 3205, a determination is made as to whether new position location information is available. If the determination is "No", then the system weights until the next iteration to expire. However, if new position location information is available, then the system determines if additional dead reckoning location information is available in block 3209. If no additional dead reckoning location information is available, then the system extrapolates the last known location and increases the variance considering the age of the location data in block 3211. If additional dead reckoning location information is available, then an estimate of the variance is made considering the accuracy of the location in block 3207.

Then, the system determines if any new GPS location data is available in block 3215. If new GPS location data is available, then an estimate of the variance is made considering the accuracy of the location in block 3213. If no new GPS location data is available, then the extrapolation is made based on the last known location, block 3217. Additionally the variance is increased considering the age of the location data.

Next, the system considers network provided location data in block 3219. If data is available, then an estimate of the variance is made considering the accuracy of the location in block 3219. If no network data is available, then the extrapolation of the last known location is made, block 3223. Additionally, the variances increased considering the age of the data. Next a determination is made as to whether there is additional trilateration FIN location data available in block 3227. If data is available, then an estimate of the variance is made considering the accuracy of the location in block 3225. If no network data is available, then the extrapolation of the last known location is made, block 3229. Additionally, the variances are increased considering the age of the data.

Next, the system determines if there is an additional trilateration data from mobile devices available in block 3233. If so, then an estimate of the variance is made considering the accuracy of the location in block 3231. If the answer is "No", then the location is extrapolated based on the last known location in block 3235. In addition the variance is increased considering the age of the information.

All of the above additional location information is then used to predict a new latitude location $X_{k-1}$ and a new variance $P_{k-1}$ in box 3237. In addition, the Kalman gain is calculated. Similar calculation are performed for longitude and altitude. Then, the system waits for the next time iteration to expire in block 3239.

An embodiment is drawn to a method of performing trilateration for fixed infrastructure nodes (FIN) using enhanced location based positions (location information) with wireless devices. The method includes using multiple inputs from a plurality of devices to assist in initial fix and subsequent improvements for the fixed nodes' location determination involving latitude, longitude and altitude. Another embodiment is drawn to a computing device including a processor configured with processor-executable instructions to perform operations recited above. Another embodiment includes a computing device including means for performing functions of the operations recited above. An embodiment is drawn to a non-transitory processor-readable storage medium having stored thereon processor-executable instructions to cause a processor to perform operations recited above.

An embodiment is drawn to a method of performing trilateration for fixed infrastructure nodes (FIN) using enhanced location based positions (location information) with wireless devices. The method includes initializing X, Y, Z and P0 values, determining whether all four inputs (e.g., X, Y, Z and P0) are available for trilateration and computing Q and R matrices. The method also includes predicting (X, Y, Z)k−1 and Pk−1 values, computing Kalman gain and updating (X,Y,Z)k and Pk values. Another embodiment includes a computing device having a processor configured with processor-executable instructions to perform operations recited above. Another embodiment includes a computing device including means for performing functions of the operations recited above. Another embodiment includes a non-transitory processor-readable storage medium having stored thereon processor-executable instructions to cause a processor to perform operations recited above.

An embodiment is drawn to method of performing trilateration for fixed infrastructure nodes (FIN) using enhanced location based positions (location information) with wireless devices. The method includes initializing X0 and P0 values, determining whether all four inputs are available for trilateration and computing Q and R matrices. The method also includes predicting Xk−1 and Pk−1 values, computing Kalman gain and updating Xk and Pk values. In an embodiment, the method further includes determining whether new location information is available, such as whether DR location information is available, GPS location information is available, Network Provided location information is available, Trilateration FIN location information is available, Trilateration Ue location information is available. The method also includes estimating a variance considering accuracy of the location in response to determining new location information is available (e.g., in response to determining that new DR location information is available, new GPS location information is available, new Network Provided location information is available, new Trilateration FIN location information is available, new Trilateration Ue location information is available, etc.). The method also includes extrapolating the last known location and increasing variance, considering the age of the location, in response to determining new location information is not available (e.g., in response to determining that the new location information is not DR location information is available, is not GPS location information, is not Network Provided location information, is not Trilateration FIN location information, is not Trilateration Ue location information, etc.). An embodiment is drawn to a computing device including a processor configured with processor-executable instructions to perform operations recited above. Another embodiment is drawn to a computing device, comprising means for performing functions of the operations recited above. An embodiment is drawn to a non-transitory processor-readable storage medium having stored thereon processor-executable instructions to cause a processor to perform operations recited above.

An embodiment is drawn to a method of providing a location based service in a fixed wireless device. The embodiment includes determining via a processor of a fixed wireless device whether information obtained via a geospatial system of the fixed wireless device is accurate and collecting location information from a plurality of fixed wireless devices in a communication group in response to determining that the information obtained via the geospatial system of the fixed wireless device is not accurate. The embodiment also includes computing more precise location information for the fixed wireless device based on the location information collected from the plurality of fixed wireless devices, the more precise location information including three-dimensional location and position information and using the computed more precise location information to provide the location based service. In an embodiment, a fixed wireless device sends GPS timing information to another fixed wireless device. In another embodiment, mobile devices provide three-dimensional location and position information to a fixed wireless device.

In an embodiment, a fixed wireless device relays three-dimensional location and position information from another fixed wireless device. In an embodiment, a communication group providing three-dimensional location and position information comprises of both fixed and mobile wireless devices. In an embodiment, an in network based location server provides three-dimensional location and position information. In an embodiment, a network based location server provides three-dimensional location and position information in addition to other fixed and mobile wireless devices. In an embodiment, the fixed wireless device is a fixed infrastructure device, such as a small cell device, a femto cell device, or a beacon device that has GPS capabilities.

In an embodiment, the fixed wireless device further comprises a sensor hub comprising at least one of an accelerometer, a 2 or 3 axis gyro, a compass, an altimeter or a GPS transceiver. Another embodiment is drawn to a computing device including a processors configured with processor-executable instructions to perform operations recited in any of the processes recited above. Another embodiment is drawn to a computing device including means for performing functions of the operations recited in any of the processes discussed above. Another embodiment is drawn to a non-transitory processor-readable storage medium having stored thereon processor-executable instructions to cause a processor to perform operations recited in any of the processes discussed above.

An embodiment is drawn to a method of performing trilateration for fixed infrastructure nodes (FIN) using enhanced location based positions (location information) with wireless devices. The method includes, using multiple inputs from a plurality of devices to assist in initial fix and subsequent improvements for the fixed nodes' location determination involving latitude, longitude and altitude. The multiple inputs comprise inputs from one or more of a global position system (GPS), a network provided location based services (LBS), a mobile device LBS, a dead reckoning or external devices. The dead reckoning input comprises dead reckoning position data collected during an initial positioning of the FIN.

In an embodiment, the external devices are active devices. In an embodiment, the external devices are passive devices. In an embodiment, the trilateration process comprises determining a new position based on initial latitude (X), longitude (Y), altitude (Z), changes in latitude ($\Delta X$), longitude ($\Delta Y$), altitude ($\Delta Z$), confidence values ($C_x$, $C_y$, $C_z$) and a time value $\Delta t$. In an embodiment, the method includes initializing X, Y, Z and P0 values, determining whether all four inputs (e.g., X, Y, Z and P0) are available for trilateration and computing Q and R matrices. The method also includes predicting $(X, Y, Z)_{k-1}$ and $P_{k-1}$ values, computing Kalman gain and updating $(X,Y,Z)_k$ and $P_k$ values. The P0 values and $P_{k-1}$ values are covariance and the Q and R matrices are associated with the kalman filter.

In an embodiment, the trilateration process generates three-dimensional vectors. In an embodiment, the method further includes ranking the multiple inputs based on the confidence values. In an embodiment, inputs having confidence values below a predetermined threshold are discarded. In an embodiment, the trilateration process uses a kalman filter. In an embodiment, the trilateration process uses at least three points to make a positional determination. In an embodiment, the trilateration process is performed iteratively.

In an embodiment, the inputs are provided from at least one mobile device and include time and range information. In an embodiment, providing range information includes sending a request from the FIN to the mobile device for position information, receiving from the mobile device position information and a time the mobile device took from receiving the request to when the position information was transmitted to the FIN and subtracting the time the mobile device took from receiving the request to when the position information was transmitted to the FIN from a total elapse time from sending the request for position updates to receiving the position information.

An embodiment of the method further includes determining whether new location information is available, estimating a variance considering accuracy of the location in response to determining new location information is available and extrapolating a last known location and increasing variance, considering the age of the location, in response to determining new location information is not available. In an embodiment, the multiple inputs from the global position system (GPS), the network provided location based services (LBS), the mobile device LBS, the dead reckoning or the external devices is processed sequentially. In an embodiment, the multiple inputs from the global position system (GPS), the network provided location based services (LBS), the mobile device LBS, the dead reckoning or the external devices is processed simultaneously.

In an embodiment, if the new position is different from the previously reported location position by a threshold value in any axis, the trilateration process is continued. In an embodiment, the threshold value is in a range of 1-5%. In an embodiment, the multiple inputs include angle of arrival (AOA) information. In an embodiment, the network provided location based services comprises a multiple input, multiple output (MIMO) configuration.

Some embodiments may include methods of providing a location based service on a first fixed wireless device, which may include determining whether the first fixed wireless device is able to establish a location fix based on information obtained via a geospatial system, collecting location information from a communication group in response to determining the first fixed wireless device is unable to establish a location fix, in which the communication group includes at least a second wireless device, computing a new three-dimensional location fix for the first fixed wireless device based on the location information collected from the communication group, the new location information including three-dimensional location and position information, and providing location based service based on the new three-dimensional location fix.

In an embodiment, collecting location information from the communication group may include receiving GPS timing information from a second wireless device in the communication group. In a further embodiment, the second wireless device may be a fixed wireless device. In another embodiment, the second wireless device may be a mobile wireless device.

In a further embodiment, collecting location information from the communication group may include receiving, by the first fixed wireless device, location information from a first member of the communication group that was forwarded to the first member from a second member of the communication group. In a further embodiment, collecting location information from the communication group may include receiving, by the first fixed wireless device, location information that was forwarded by the first member of the communication group from a fixed wireless device (or a mobile wireless device) that is outside of the communication group.

In a further embodiment, collecting location information may further include collecting three-dimensional location information from a network based location server. In a further embodiment, determining whether the first fixed wireless device is able to establish a location fix based on information obtained via a geospatial system may include determining whether a fixed infrastructure device (e.g., a cell tower antenna, an eNodeB, a small cell device, a femto cell device, a WiFi access node, a beacon device, etc.) is able to establish a location fix based on information obtained via a geospatial system. In some embodiments, the first fixed wireless device includes the geospatial system. In other embodiments, the first fixed wireless device does not include the geospatial system.

In a further embodiment, the method may include determining whether information obtained via the geospatial system is accurate, collecting location information from a plurality of devices in the communication group response to determining that the information obtained via the geospatial system is not accurate, computing more precise location information (or a waypoint) based on the collected location information, the more precise location information including three-dimensional information, and using the computed more precise location information to provide the location based service.

In a further embodiment, the method may include establishing a first connection to a data network, in which the first connection is not a cellular data uplink transmission path, obtaining location information for a current location of the first fixed wireless device via the first connection, determining a variance between the received location information and a locally determined location, determining whether the variance exceeds a threshold value, collecting additional location information from a plurality of transceivers in the communication group in response to determining that the variance exceeds the threshold value, computing more precise location information (or a waypoint) based on the location information collected from the plurality of transceivers, and using the more precise location information to provide the location based service.

In a further embodiment, the method may include collecting location information from a plurality of mobile devices in a communication group, computing more precise location information (or a waypoint) based on the location information collected from the plurality of mobile devices, and using the computed more precise location information to provide the location based service, in which computing the more precise location information includes using horizontal data to determine a position relative to the Earth's surface, using vertical data to determine a height of the position relative to sea level, and generating three-dimensional information based on the determined position and the determined height.

Further embodiments may include a first fixed wireless device that includes a processor configured with processor-executable instructions to perform operations that include determining whether the first fixed wireless device is able to establish a location fix based on information obtained via a geospatial system, collecting location information from a communication group in response to determining the first fixed wireless device is unable to establish a location fix, in which the communication group includes at least a second wireless device, computing a new three-dimensional location fix for the first fixed wireless device based on the location information collected from the communication group, the new location information including three-dimensional location and position information, and providing location based service based on the new three-dimensional location fix.

In an embodiment, the processor may be configured with processor-executable instructions to perform operations such that collecting location information from the communication group includes receiving GPS timing information by the first fixed wireless device from the at least a second wireless device. In an embodiment, the processor may be configured with processor-executable instructions to perform operations such that collecting location information from the communication group includes collecting location information from a second wireless device in the communication group. In an embodiment, the processor may be configured with processor-executable instructions to perform operations such that collecting location information from the communication group includes collecting location information from a fixed wireless device. In an embodiment, the processor may be configured with processor-executable instructions to perform operations such that collecting location information from the communication group includes collecting location information from a mobile wireless device.

In a further embodiment, the processor may be configured with processor-executable instructions to perform operations such that collecting location information from the communication group includes receiving by the first fixed wireless device location information that was forwarded by a first member of the communication group from a second member of the communication group. In a further embodiment, the processor may be configured with processor-executable instructions to perform operations such that collecting location information from the communication group includes receiving, by the first fixed wireless device, location information that was forwarded by the first member of the communication group from a fixed wireless device or a mobile wireless device that is outside of the communication group. In a further embodiment, the processor may be configured with processor-executable instructions to perform operations such that collecting location information further includes collecting a three-dimensional location information from a network based location server.

In a further embodiment, the processor may be configured with processor-executable instructions to perform operations such that collecting location information from the communication group includes receiving location information in a fixed infrastructure device (e.g., a cell tower antenna, an eNodeB, a small cell device, a femto cell device, a WiFi access node, a beacon device, etc.) In a further embodiment, the processor may be configured with processor-executable instructions to perform operations such that determining whether the first fixed wireless device is able to establish a location fix based on information obtained via a geospatial system includes determining whether a fixed infrastructure device (e.g., a cell tower antenna, an eNodeB, a small cell device, a femto cell device, a WiFi access node, a beacon device, etc.) is able to establish a location fix based on information obtained via a geospatial system.

In a further embodiment, the processor may be configured with processor-executable instructions to perform operations further including determining whether information obtained via the geospatial system is accurate, collecting location information from a plurality of devices in the communication group response to determining that the information obtained via the geospatial system is not accurate, computing more precise location information (or a waypoint) based on the collected location information, the more precise location information including three-dimensional information, and using the computed more precise location information to provide the location based service.

In a further embodiment, the processor may be configured with processor-executable instructions to perform operations further including establishing a first connection to a data network, in which the first connection is not a cellular data uplink transmission path, obtaining location information for a current location of the first fixed wireless device via the first connection, determining a variance between the received location information and a locally determined location, determining whether the variance exceeds a threshold value, collecting additional location information from a plurality of transceivers in the communication group in response to determining that the variance exceeds the threshold value, computing more precise location information (or a waypoint) based on the location information collected from the plurality of transceivers, and using the more precise location information to provide the location based service.

In a further embodiment, the processor may be configured with processor-executable instructions to perform operations further including collecting location information from a plurality of mobile devices in a communication group, computing more precise location information (or a waypoint) based on the location information collected from the plurality of mobile devices, and using the computed more precise location information to provide the location based service, in which computing the more precise location information includes using horizontal data to determine a position relative to the Earth's surface, using vertical data to determine a height of the position relative to sea level, and generating three-dimensional information based on the determined position and the determined height. Further embodiments include a non-transitory server-readable storage medium having stored thereon processor-executable instructions configured cause a first fixed wireless device to perform operations that include determining whether the first fixed wireless device is able to establish a location fix based on information obtained via a geospatial system, collecting location information from a communication group in response to determining the first fixed wireless device is unable to establish a location fix, in which the communication group includes at least a second wireless device, computing a new three-dimensional location fix for the first fixed wireless device based on the location information collected from the communication group, the new location information including three-dimensional location and position information, and providing location based service based on the new three-dimensional location fix. In an embodiment, the stored processor-executable instructions may be configured to cause a processor to perform operations such that collecting location information from the communication group includes receiving GPS timing information by the first fixed wireless device from the at least a second wireless device.

In a further embodiment, the stored processor-executable instructions may be configured to cause a processor to perform operations such that collecting location information from a communication group includes collecting information from a second wireless device in the communication group, the second wireless device being fixed wireless device or a mobile wireless device.

In a further embodiment, the stored processor-executable instructions may be configured to cause a processor to perform operations such that collecting location information from the communication group includes receiving by the first fixed wireless device location information that was forwarded by a first member of the communication group from a second member of the communication group. In a further embodiment, the stored processor-executable instructions may be configured to cause a processor to perform operations such that collecting location information from the communication group includes receiving, by the first fixed wireless device, location information that was forwarded by the first member of the communication group from a fixed wireless device or a mobile wireless device that is outside of the communication group. In a further embodiment, the stored processor-executable instructions may be configured to cause a processor to perform operations such that collecting location information further includes collecting a three-dimensional location information from a network based location server.

In a further embodiment, the stored processor-executable instructions may be configured to cause a processor to perform operations such that determining whether the first fixed wireless device is able to establish a location fix based on information obtained via a geospatial system includes determining whether a fixed infrastructure device (e.g., a cell tower antenna, an eNodeB, a small cell device, a femto cell device, a WiFi access node, a beacon device, etc.) is able to establish a location fix based on information obtained via a geospatial system. In a further embodiment, the stored processor-executable instructions may be configured to cause a processor to perform operations that further include determining whether information obtained via the geospatial system is accurate, collecting location information from a plurality of devices in the communication group response to determining that the information obtained via the geospatial system is not accurate, computing more precise location information (or a waypoint) based on the collected location information, the more precise location information including three-dimensional information, and using the computed more precise location information to provide the location based service.

In a further embodiment, the stored processor-executable instructions may be configured to cause a processor to perform operations that further include establishing a first connection to a data network, in which the first connection is not a cellular data uplink transmission path, obtaining location information for a current location of the first fixed wireless device via the first connection, determining a variance between the received location information and a locally determined location, determining whether the variance exceeds a threshold value, collecting additional location information from a plurality of transceivers in the communication group in response to determining that the variance exceeds the threshold value, computing more precise location information (or a waypoint) based on the location information collected from the plurality of transceivers, and using the more precise location information to provide the location based service.

In a further embodiment, the stored processor-executable instructions may be configured to cause a processor to perform operations that further include collecting location information from a plurality of mobile devices in a communication group, computing more precise location information (or a waypoint) based on the location information collected from the plurality of mobile devices, and using the computed more precise location information to provide the location based service, in which computing the more precise location information includes using horizontal data to determine a position relative to the Earth's surface, using vertical data to determine a height of the position relative to sea level, and generating three-dimensional information based on the determined position and the determined height.

The various embodiments may also include methods of determining a location of a mobile device via enhanced location based trilateration, the method including receiving, via a processor of the mobile device, location information from one or more external devices, the received location information including a waypoint from each of the one or more external devices, each waypoint including a coordinate value, an altitude value and a range value, the range value identifying a distance from a external device to the mobile device, determining the validity of each of the received waypoints, performing normalization operations to normalize the received valid waypoints, assigning an overall ranking to each of the normalized waypoints, assigning an device-specific ranking to each of the normalized waypoints, and storing the normalized waypoints in memory, selecting four waypoints from memory based on a combination of the overall ranking and the device-specific ranking associated with each waypoint, applying the four selected waypoints to a kalman filter to generate a final location waypoint, and using the generated final location waypoint to provide a location based service.

In an embodiment, receiving location information from one or more external devices may include receiving location information from one or more of a mobile device, a device having a Cell ID, a WiFi device, a Bluetooth device, an RFID device, a GPS device, a location beacon transmitting device, and external trilateration location information. In a further embodiment, determining the validity of each of the received waypoints may include determining a range value for each waypoint included in the received location information, and determining the validity of each of the received waypoints based on its corresponding range value. In a further embodiment, determining the validity of each of the received waypoints may include determining a confidence value for each waypoint included in the received location information, and determining the validity of each of the received waypoints based on its corresponding confidence value. In a further embodiment, receiving location information from one or more external devices may include establishing communication links to each of a plurality of external devices in a communication group, and receiving location information from only the external devices in the communication group.

In a further embodiment, selecting four waypoints from memory based on a combination of the overall ranking and the device-specific ranking associated with each waypoint may include selecting one of the waypoints included in the received location information and three previously generated waypoints from the memory. In a further embodiment, selecting four waypoints from memory based on a combination of the overall ranking and the device-specific ranking associated with each waypoint may include selecting two of the waypoints included in the received location information and two previously generated waypoints from the memory. In a further embodiment, selecting four waypoints from memory based on a combination of the overall ranking and the device-specific ranking associated with each waypoint may include selecting three of the waypoints included in the received location information and one previously generated waypoints from the memory.

The various embodiments may also include methods, and mobile computing devices configured to implement the methods, of determining a location of a mobile device. The methods may include determining an approximate location of the mobile device, grouping the mobile device with a wireless transceiver in proximity to the mobile device to form a communication group, sending the determined approximate location of the mobile device to the wireless transceiver, receiving on the mobile device location information from the wireless transceiver, and determining a more precise location of the mobile device based on the location information received from the wireless transceiver. As part of determining its approximate location, the mobile device may estimate its position and/or generate a position estimate. It could be beneficial for these position estimates to include latitude, longitude and elevation information that is accurate to within one (1) meter (and many times within one meter accuracy).

In some embodiments, the mobile device may be equipped with a "sensor fusion" system/component. The sensor fusion component may be configured to collect and use information from sensors in the mobile device to further improve the location position determinations. As such, the sensor fusion component may allow the device to better determine its approximate location and/or to generate a better position estimate (e.g., a more precise value, more accurate coordinates, etc.).

In further embodiments, the mobile device may be configured to receive (e.g., via an antenna coupled to one or more of its processors, etc.) location information from a multitude of external devices, and use this information to better determine its approximate location and/or to generate a better position estimate (e.g., a more precise value, more accurate coordinates, etc.).

In some embodiments, the mobile device may be configured to receive the location information was waypoints. A waypoint may be an information structure that includes one or more information fields, component vectors, location information, position information, coordinate information, etc. In some embodiments, each waypoint may include coordinate values (e.g., x and y coordinates, latitude and longitude values, etc.), an altitude value, a time value, a timestamp, ranking values, confidence values, precision values, a range value, and an information type identifier (e.g., GPS, Loran C, sensor, combined, etc.). The coordinate and altitude value may identify the three-dimensional location of the corresponding external device. The timestamp may identify the time that the location was determined/captured. The range value may identify a distance between the external device and the mobile device. In some embodiments, a waypoint may also be, or may include, a location estimate value, a location set, or any other similar location information suitable for adequately conveying or communicating location information.

In an embodiment, the mobile device may be configured to receive location information in the form of a first waypoint from a first external device, a second waypoint from a second external device, a third waypoint from a third external device, and a fourth waypoint from a forth external device. The mobile device may use any combination of the received waypoints (e.g., first through fourth waypoints) in conjunction with stored and historical information (e.g., previously computed waypoints, movement information, etc.) to determine or compute its approximate and/or more precise location with a high degree of accuracy.

In some embodiments, the mobile device may be configured to perform advanced location based operations (e.g., advanced sensor fusion operations) to generate location information (e.g., a location estimate set/value), use a differential $RMS^2$ method (or any other method known in the art) compute confidence values, and compare the computed confidence values to one or more threshold values to determine whether there is a sufficiently high degree of confidence in the accuracy of the generated location information (e.g., location estimate set/value). In some embodiments, the mobile device may be configured to compute a confidence value between 0.0 and 1.0 that identifies a confidence level in the accuracy of the measurement for each data field in the location estimation set (e.g., a confidence value for each of the latitude, longitude and altitude data fields, etc.). For example, confidence values of 0.90, 0.95, and 0.91 may indicate that the x, y, and z coordinates are accurate within 30 meters between 90 and 95 percent of the time.

In some embodiments, the mobile device may be configured to also compute a precision value that identifies, or which is indicative of, the repeatability factor of the computation/measurements over multiple measurements. The precision value may be used to determine how often the device reports the same position/location (i.e., based on evaluating multiple reports indicating that the device has not moved more than X meters, etc.), which may be used to determine the precision of the measurement (e.g., within 1 meter, etc.). The precision value may also be used to determine the likelihood that repeating the computation (e.g., using the same inputs or input sources) will result in substantially the same values.

Further embodiments may include a computing device having a processor configured with processor-executable instructions to perform various operations corresponding to any of the methods discussed in this application.

Further embodiments may include a computing device having various means for performing functions corresponding to any of the method operations discussed in this application.

Further embodiments may include a non-transitory processor-readable storage medium having stored thereon processor-executable instructions configured to cause a processor to perform various operations corresponding to any of the method operations discussed in this application.

Figure 33:
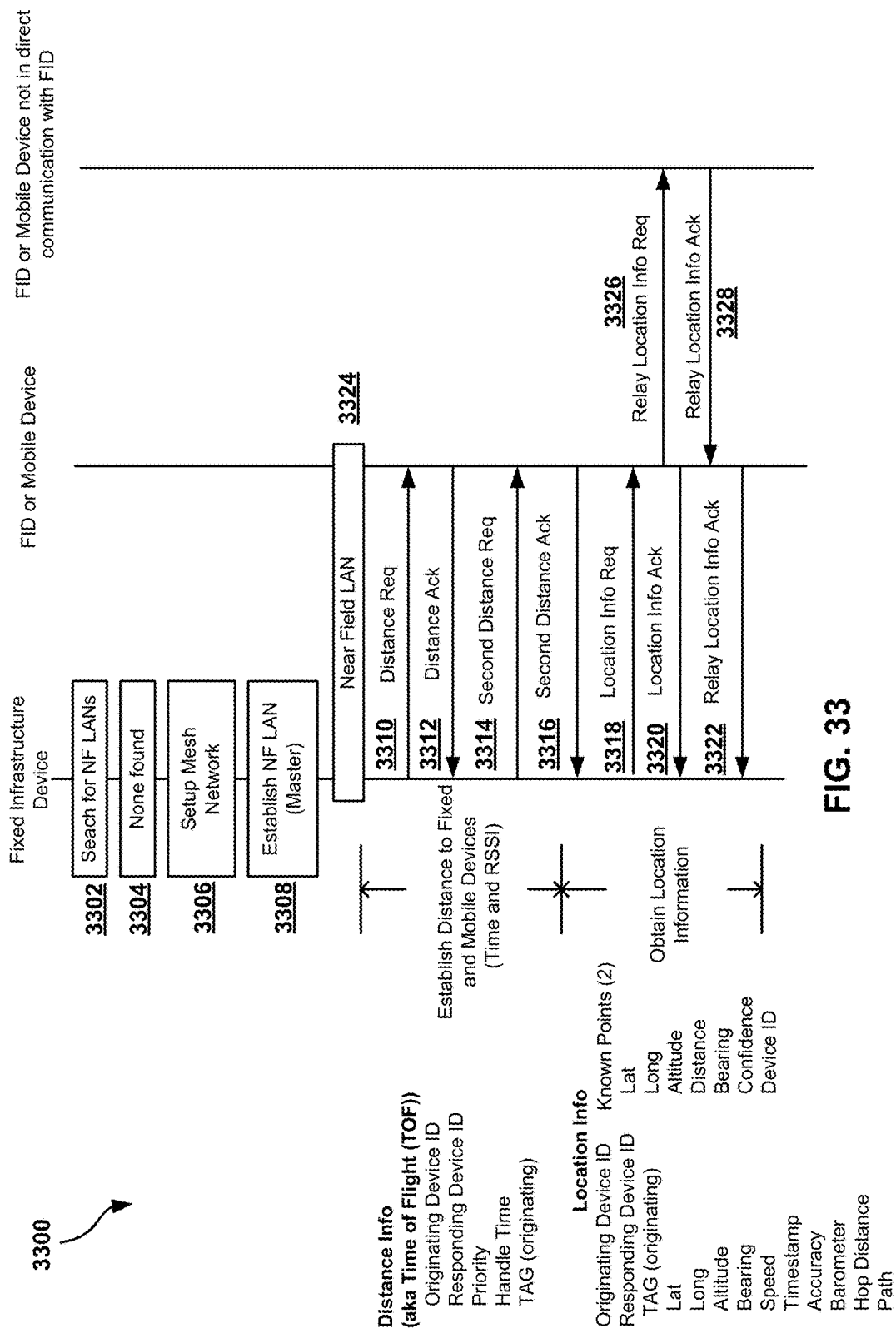
FIG. 33 is a call flow diagram that illustrates example components and information flows in a system that is configured to perform location based operations to determine the locations of one or more CBSDs in accordance with an embodiment.

FIG. 33 illustrates an embodiment of possible communication formats for where an FID requests a position update from other devices. The specific formats and communication medium may vary. However, the initial position may be determined via the use of time of flight (TOF) and two message inquiries. Additionally, the RSSI may be read. By determining the TOF and RSSI, the distance from one device to another may be determined faster and with a higher degree of accuracy.

Once the initial handshake has taken place the FID and/or mobile devices may exchange location information with another FID or mobile device. The other FID or mobile device may also provide known points, and device providing its location information to include any or all of a waypoint, latitude, longitude, altitude, relative bearing information and/or a confidence value regarding the information.

FIG. 33 also illustrates the use of relaying the information request message is shown. The number of hops this path may take is also reported. This relaying enables FID and mobile devices and other FID that are not initially in direct communication with each other to establish communications pathways for Trilateration.

Various embodiments for providing a location based service in a fixed wireless device may include determining via a processor of a fixed wireless device (or fixed infrastructure device) whether information obtained via a geospatial system of the fixed wireless device is accurate. Additionally, the methods may include collecting location information from a plurality of fixed wireless devices in a communication group in response to determining that the information obtained via the geospatial system of the fixed wireless device is not accurate. Next, the methods include computing more precise location information for the fixed wireless device based on the location information collected from the plurality of fixed wireless devices (the more precise location information including three-dimensional location and position information), and using the computed more precise location information to provide the location based service.

Further embodiments may include methods, and computing devices configured to implement the methods, of performing trilateration for fixed infrastructure nodes (FIN) using enhanced location based positions (location information) with wireless devices. The trilateration may rely on multiple inputs from various devices to assist in initial fix and subsequent improvements for the fixed nodes' location determination involving latitude, longitude and altitude.

Generally, the concept of how eLBS with fixed nodes (fixed infrastructure devices, fixed infrastructure nodes, etc.) takes place is important for the enhanced position to be achieved using a multitude of devices. As the need to improve location services the accuracy and confidence of the actual three-dimensional coordinates of the fixed node needs to have a high degree of confidence and precision. The confidence and precision of the three-dimensional coordinates, (latitude, longitude and altitude) need to be established for each of the antennas with a LTE site in support of the position reference signal (PRS).

With LTE new (pico) or small cell sites required for providing coverage and network capacity for LTE and LTE-A will be located at street level or even indoors, where GPS reception is poor or non-existent.

An item useful for LTE is Clock synchronization and this is now being achieved with IEEE 1588 in place of GPS. However, a LTE cell site that relies on backhaul being provided by a donor LTE cell site, the IEEE1588 is not viable since it is relevant to the donor cell site. Therefore GPS will be relied on for timing synchronization in the situation for donor cell sites in LTE. eLBS for Fixed Infrastructure Nodes can assist or improve the use to GPS for timing synchronization by providing its timing to the remote cell site that is in a GPS stressed environment.

In a GPS stressed environment eLBS for FIN can provide a GPS clock signal to the eNB of the remote site. The GPS clock signal that is relayed can also be used to improve the determination of the geodedic location (latitude, longitude and altitude) of the remote eNB that is in a GPS stressed environment.

In LTE the Evolved Serving Mobile Location Center (E-SMLC) is responsible for provision of accurate assistance data and calculation of position. In the current art Positioning over LTE is enabled by LPP. LPP call flows are procedure based where the main functions of LPP are to provision the E-SMLC with the positioning capabilities of the UE (a) to transport Assistance Data from the E-SMLC to the UE (b) to provide the E-SMLC with co-ordinate position information or UE measured signals (c) to report errors during the positioning session. LPP can also be used to support "hybrid" positioning such as oTDoA+A-GNSS.

In the case of network based positioning techniques, the E-SMLC may require information from the eNodeB (such as receive-transmit time difference measurements for supporting ECID). A protocol called the LPP-Annex (LPPa) is used to transport this information. LPP OTDOA ECID A-GNSS eXTensions To LPP (LPPe) LPP was designed to enable the key positioning methods (with enhancements) available on 2G and 3G networks, and provide the minimum set of data necessary for positioning.

Overcoming some limitation for positioning of the mobile in LTE the Primary Reference Signal (PRS) introduced in 3GPP is transmitted from the eNB from antenna port 6. While the PRS is a great enhancement its functionality is reliant upon the coordinate of the antenna for transmitting the PRS and not the location coordinate of the eNB. eLBS for FIN however is able to improve the coordinate determination for the antenna using PRS and therefore provide the needed coordinates needed for the PRS itself.

To achieve a three-dimensional position (latitude, longitude and altitude) with a high confidence of its correctness or rather confidence a fixed infrastructure node using eLBS FIN Trilateration can obtain a three-dimensional position using a variety of different devices.

The wireless device location determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Frequency Division Multiple Access (FDMA) network, a Time Division Multiple Access (TDMA) network, an OFDMA network, a 3GPP LTE network, a WiMAX (IEEE 802.16) network, and so on. A CDMA network may implement one or more radio access technologies (RATs) such as CDMA2000, Wideband-CDMA (W-CDMA), and so on. CDMA2000 includes IS-95, IS-2000, and IS-856 standards. W-CDMA is described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN, and/or WPAN.

The various embodiments may include enhancements to the current location based service methodologies used for wireless mobile communications. Determining the location of the wireless device in a wireless network is becoming more and more important in recent years both for commercial and public safety positioning applications. Services and applications based on accurate knowledge of the location of a wireless device are becoming more prevalent in the current and future wireless communication systems Additionally Public Safety is also embarking on the use of commercial cellular technology, LTE, as a communication protocol of choice. Of specific importance is the need for improved situation awareness at an incident with first responders.

Presently GPS provides a good estimate of the wireless devices current location under optimum conditions. However, in many situations and especially in building and urban environments the ability to utilize GPS for position location determination is hampered and many times is not usable. The network based solutions for determining the wireless devices location, while good, has many problems with locating the wireless device within buildings and in urban areas. The introduction of wireless network systems such as the third-generation partnership project (3GPP) long-term evolution (LTE) present new capabilities has the ability in the public safety band to provide excellent coverage in urban and indoor environments. Although the wireless mobile networks can provide coverage in urban and in-building environments the location information position accuracy has limitations.

Better positional location accuracy and confidence has many advantages for use in emergency location services, commercial location services, internal location services and lawful intercept location services. The various embodiments provide the ability to improve the positional location information for both new and existing wireless networks.

For commercial applications, the ability to have the wireless device improve location specific information within a multiple story building, in an urban environment or within a mall provides both network radio resource improvements and has unique advertising targeting capabilities as well as applications for improved fleet management, asset tracking and various machine to machine communications applications where positional determination is required to be highly accurate. For commercial users the need for improves position location information accuracy is most needed for in-building environments where the location of the wireless device can be more accurately pin pointed for location based services.

The advantage of law enforcement with improved positional information will enable the tracking of wireless devices inside a building to enable determination of what floor or part of the building the device is being used is located without the need for replacing radio beacons or location aware access points.

For emergency services the advantage comes to better positional location of the part in need of assistance especially in an urban environment where the positional information is most problematic with existing techniques.

For first responders, this enhancement enables wireless devices which are in the same scene to help augment their position coordinates with each other in a controlled ad-hoc environment. The positional information shared not only includes latitude and longitude but also altitude and velocity. Since this information involves a small amount of data the wireless devices can have the E-SMLC in the case of LTE share the information both on net and off-net.

The use of sensors including accelerometers, gyroscopes, magnetometers and pressure sensors along with GPS receivers with wireless devices is becoming more prevalent. Therefore, the enhancements for positional location will give the E-SMLC in the case of LTE the ability to not only utilize GPS or Network derived coordinate information but also to have an augmentation with sensors associated the wireless device which can include accelerometers, gyroscopes, magnetometer and pressure sensors for refining and reducing some of the positional uncertainties that are in inherent to wireless positional determination.

Wireless mobile network like LTE the position location information accuracy needs to be improved for in building environments in addition to providing more accurate location information about where the wireless devices are actually located. Whether the wireless device is used by a first responder, commercial cellular user or a combination of both.

Positional location improvement enables improved situation awareness, improved telemetry, and improved overall communication with the incident commander. In addition, the wireless devices proximity location to other wireless devices can and may change dynamically allowing for resources to be added and/or reassigned as the need arises for operational requirements.

Figure 34A:
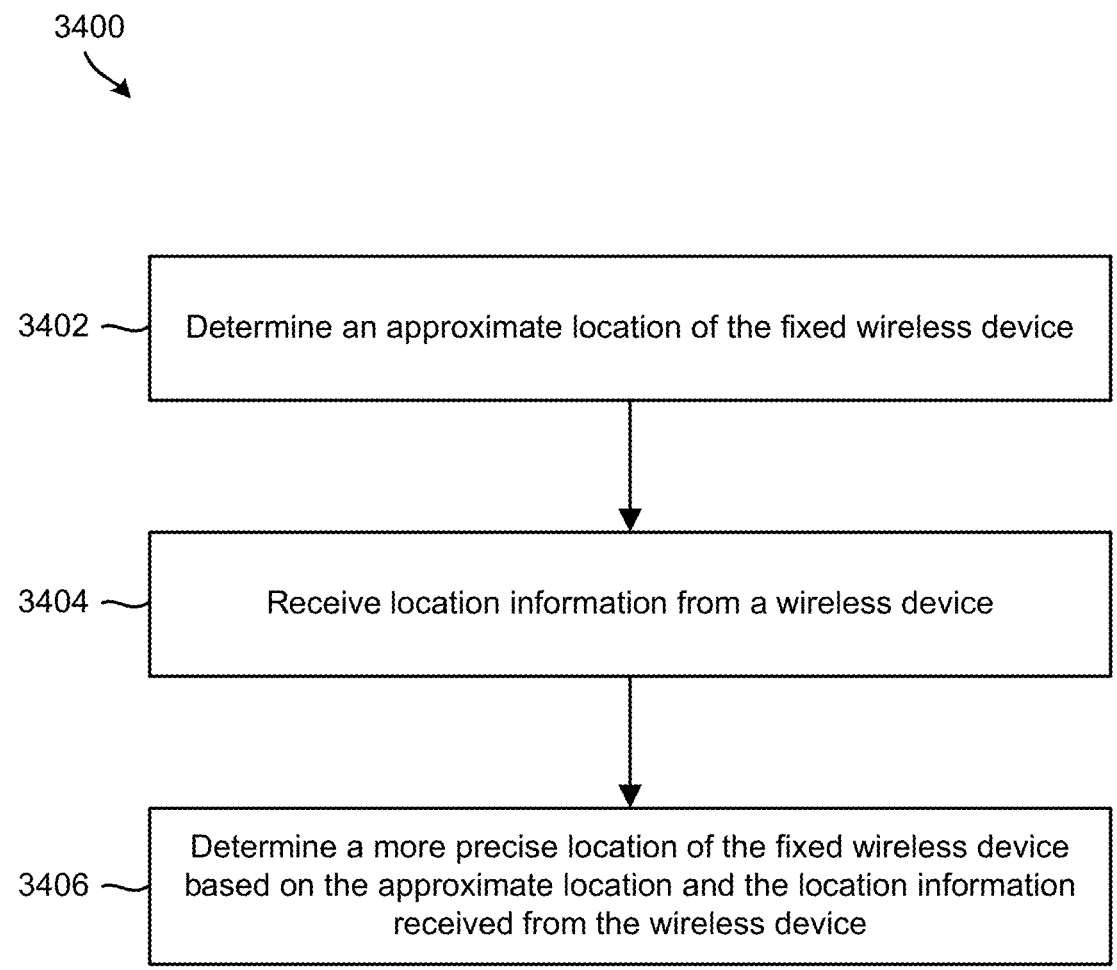
FIGS. 34A through 34C are a process flow diagrams illustrating method of determining a more precise location of the fixed wireless device and providing an enhanced location based service (eLBS) in accordance with the various embodiments.
Figure 34B:
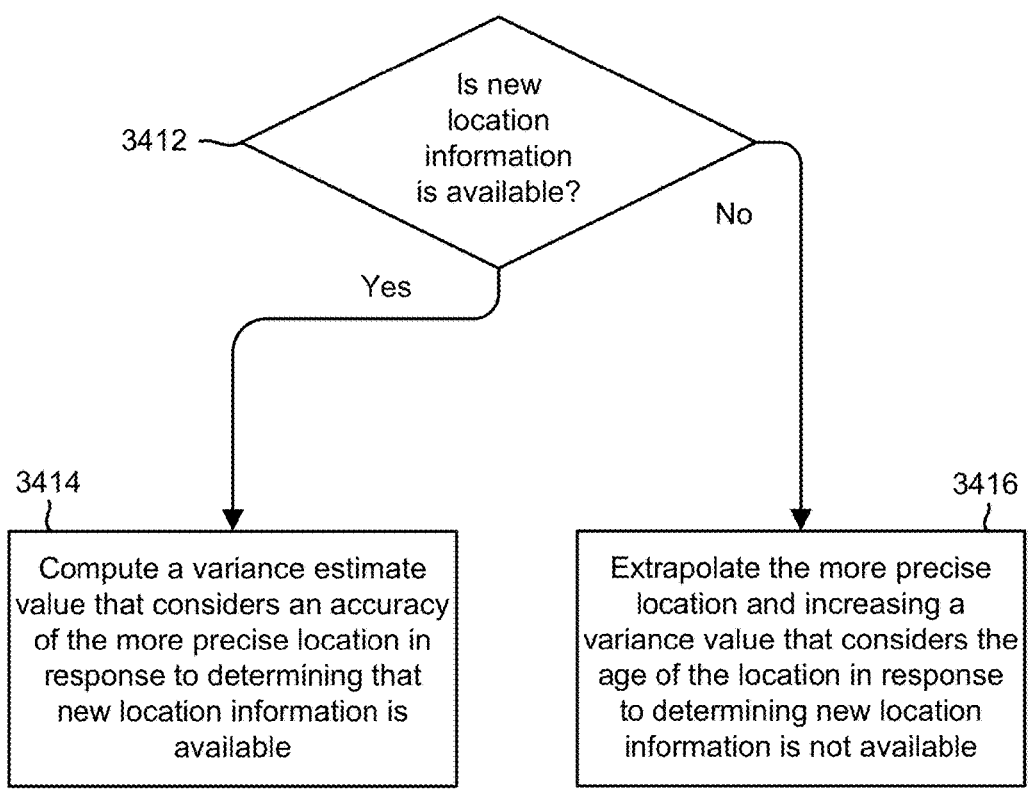
Figure 34C:
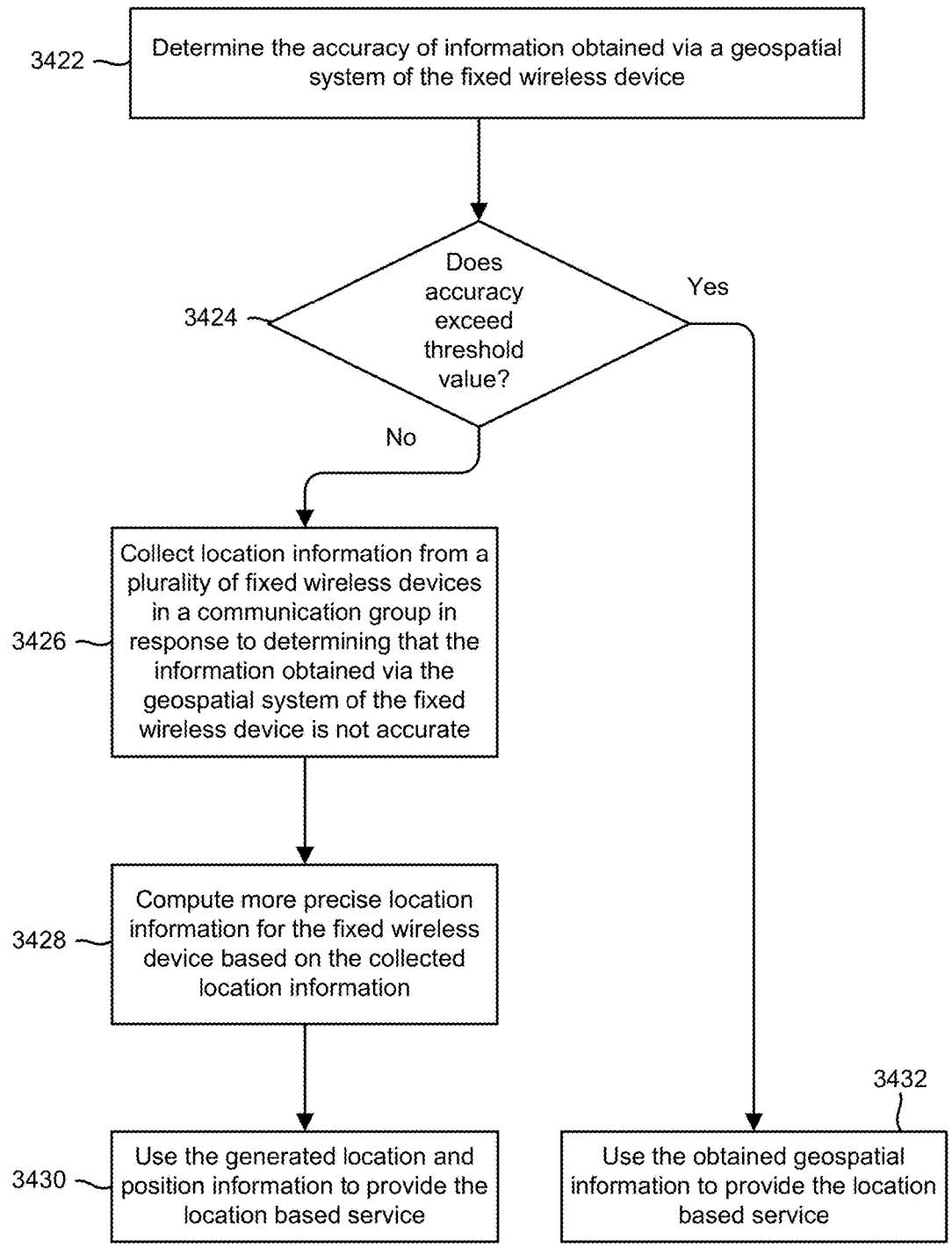

FIGS. 34A through 34C illustrate a method 3400 of determining a more precise location of the fixed wireless device and providing an enhanced location based service (eLBS) in accordance with various embodiment. The operations of method 3400 may be performed by a processor, microcontroller, or control unit in a fixed wireless device.

With reference to FIG. 34A, in block 3402, a processor in a fixed wireless device may determine an approximate location of the fixed wireless device (e.g., current waypoint, initial waypoint, etc.). In some embodiments, the fixed wireless device includes a sensor hub, and determining the approximate location of the fixed wireless device includes determining the approximate location based on information received from the sensor hub. In block 3404, the processor may receive location information from a wireless device (e.g., mobile device, etc.). In block 3406, the processor may determine a more precise location of the fixed wireless device (e.g., by generating a longitude value, a latitude value, and an altitude value, etc.) based on the approximate location and the location information received from the wireless device. In some embodiments, the more precise location includes generating location information for each of a plurality of individual antennas in a distributed antenna system (e.g., distributed antenna configuration 2706 illustrated in FIG. 27) coupled to the fixed wireless device. In some embodiments, the fixed wireless device may be a CBSD 2202 (illustrated in FIG. 22) or CBSD eNodeB 2302 (illustrated in FIG. 23).

With reference to FIG. 34B, in determination block 3412, the processor may determine whether new location information is available. In response to determining that new location information is available (i.e., determination block 3412="Yes"), in block 3414, the processor may compute a variance estimate value that considers an accuracy of the more precise location information. In response to determining that new location information is not available (i.e., determination block 3412="No"), in block 3416, the processor may extrapolate the more precise location information and increase a variance value that considers the age of the location (e.g., via the methods 3100, 3200, etc. discussed above).

With reference to FIG. 34C, in block 3422, the processor may obtain information via a geospatial system of the fixed wireless device and determine the accuracy of the information obtained via the geospatial system. In determination block 3424, the processor may determine whether the determined accuracy of the information obtained via the geospatial system exceeds a threshold value (or is otherwise sufficiently accurate). In response to determining that the accuracy of the information obtained via the geospatial system does exceeds the threshold value (i.e., determination block 3424="Yes"), in block 3432, the processor may use the obtained geospatial information to determine its current location and/or provide the location based service. In response to determining that the information obtained via the geospatial system of the fixed wireless device is not accurate or that the accuracy of the information obtained via the geospatial system does not exceed the threshold value (i.e., determination block 3424="No"), in block 3426, the processor may collect location information from a plurality of fixed wireless devices in a communication group. In block 3428, the processor may compute more precise location information for the fixed wireless device based on the collected location information. In block 3430, the processor may use the generated location and position information to provide the location based service.

Figure 35:
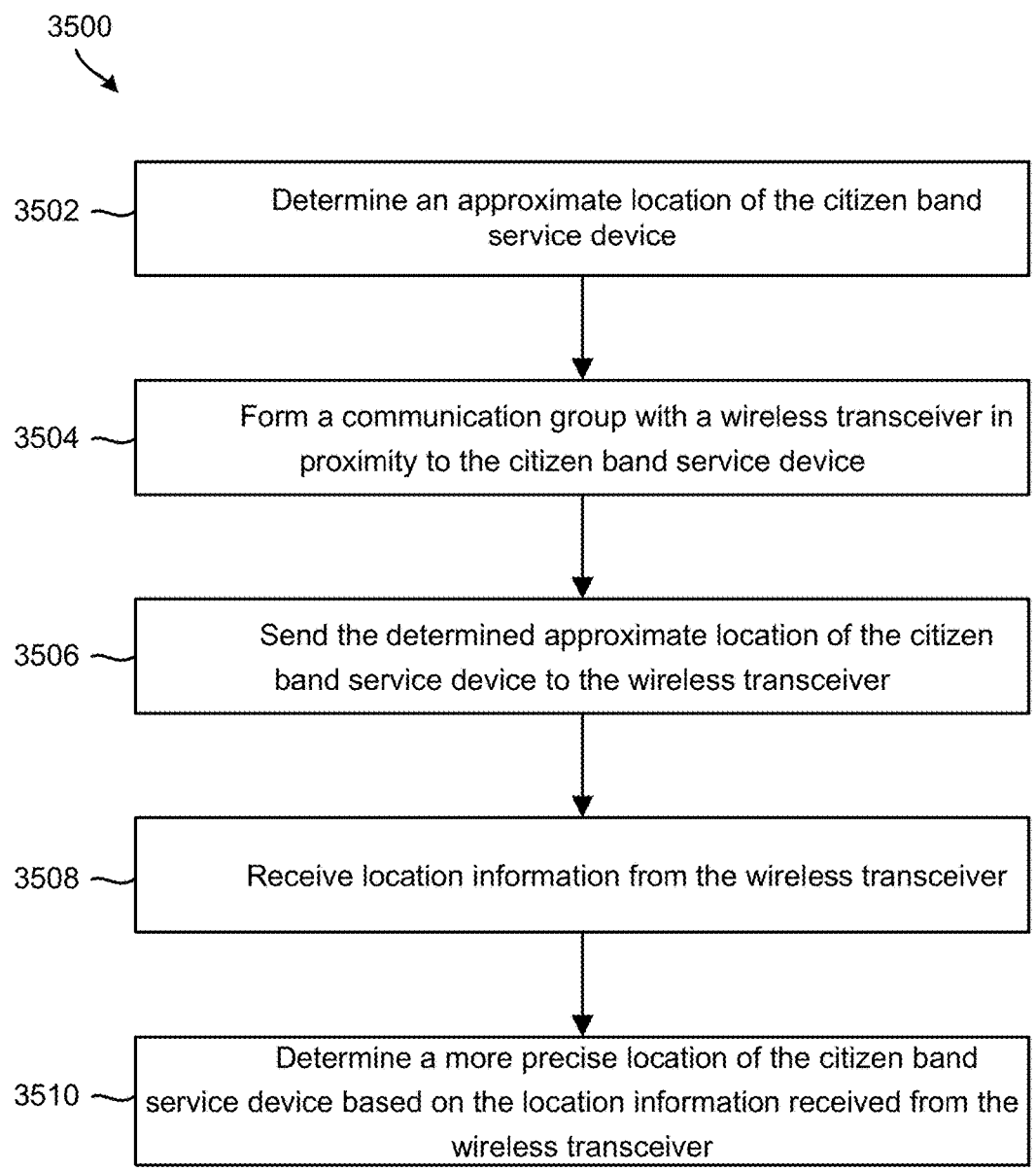
FIG. 35 is a process flow diagram illustrating a method of determining a location of a citizen band service device and providing a location based service in accordance with an embodiment.

FIG. 35 illustrates a method 3500 of determining a more precise location of a citizen band service device in accordance with an embodiment. The operations of method 3500 may be performed by a processor, microcontroller, or control unit in a citizen band service device, such as the CBSD 2202 (illustrated in FIG. 22) or CBSD eNodeB 2302 (illustrated in FIG. 23). In block 3502, a processor in a citizen band service device may determine an approximate location of the citizen band service device. In block 3504, the processor may form a communication group with a wireless transceiver in proximity to the citizen band service device. In block 3506, the processor may send the determined approximate location of the citizen band service device to the wireless transceiver. In block 3508, the processor may receive location information from the wireless transceiver. In block 3510, the processor may determine a more precise location of the citizen band service device based on the location information received from the wireless transceiver.

The various embodiments include methods of determining the latitude, longitude and altitude of an eNodeB, micro cell, pico cell, small cell, beacon, access point or another fixed wireless device in a GPS stressed environment. The various embodiments also include methods of adding enhanced location based service (eLBS) fixed infrastructure device (FID) functionality to a citizen band service device (CBSD) node to enhance its ability to report more accurate geo-location information. The various embodiments also include methods of providing an enhanced location based service (eLBS) in a wireless device, including determining an improved location of the wireless device using a citizen band service device (CBSD), and using the improved location to providing the eLBS in the wireless device. In an embodiment, determining the improved location of the wireless device include generating a longitude, a latitude, and an altitude measurement.

In a further embodiment, determining the improved location of the wireless device using CBSD includes determining the improved location using the 3.5 GHz band. In a further embodiment, the method may include using LTE infrastructure to determine the improved location and provide the eLBS. In a further embodiment, the method may include using low-power small cell technologies, such as Long-Term Evolution for unlicensed spectrum ("LTE-U") and License Assisted Access ("LAA"), or using UMTP or WiFi to determine the improved location and/or provide the eLBS. In a further embodiment, the wireless device is one of a wireless device, and a fixed device. In a further embodiment, the wireless device is a fixed infrastructure device, such as a small cell device, a femto cell device, or a beacon device that has GPS capabilities. In a further embodiment, determining the improved location of the wireless device using CBSD includes determining the improved location of the wireless device using a CBSD eNodeB. In a further embodiment, the CBSD eNodeB is functionally integrated with a sensor hub. In a further embodiment, the CBSD eNodeB is functionally integrated with a LTE Ue with eLBS capabilities. In a further embodiment, the method may include initializing X, Y, Z and $P_O$ values, determining whether all four inputs (e.g., X, Y, Z and $P_O$) are available for trilateration, computing Q and R matrices, predicting $(X, Y, Z)_{k-1}$ and $P_{k-1}$ values, computing Kalman gain, and updating $(X,Y,Z)_k$ and $P_k$ values.

In a further embodiment, the method may include determining whether new location information is available, such as whether DR location information is available, GPS location information is available, Network Provided location information is available, Trilateration FIN location information is available, Trilateration Ue location information is available, estimating a variance considering accuracy of the location in response to determining new location information is available (e.g., in response to determining that new DR location information is available, new GPS location information is available, new Network Provided location information is available, new Trilateration FIN location information is available, new Trilateration Ue location information is available, etc.), and extrapolating the last known location and increasing variance, considering the age of the location, in response to determining new location information is not available (e.g., in response to determining that the new location information is not DR location information is available, is not GPS location information, is not Network Provided location information, is not Trilateration FIN location information, is not Trilateration Ue location information, etc.).

In a further embodiment, the method may include determining via a processor of a fixed wireless device whether information obtained via a geospatial system of the fixed wireless device is accurate, collecting location information from a plurality of fixed wireless devices in a communication group in response to determining that the information obtained via the geospatial system of the fixed wireless device is not accurate, computing more precise location information for the fixed wireless device based on the location information collected from the plurality of fixed wireless devices, the more precise location information including three-dimensional location and position information, and using the computed more precise location information to provide the location based service. In a further embodiment, the latitude, longitude and altitude are determined for individual antennas for a distributed antenna system or sector antennas.

The various embodiments also include methods of determining a more precise location of the fixed wireless device and providing an enhanced location based service (eLBS), which may include determining, via a processor in a fixed wireless device, an approximate location of the fixed wireless device, receiving, via the processor, location information from a wireless device, and determining a more precise location of the fixed wireless device based on the approximate location and the location information received from the wireless device. In an embodiment, determining the more precise location of the fixed wireless device based on the approximate location and the location information received from the wireless device includes generating a longitude value, a latitude value, and an altitude value. In a further embodiment, determining the more precise location of the wireless device based on the approximate location and the location information received from the fixed wireless device includes generating location information for each of a plurality of individual antennas in a distributed antenna system of the fixed wireless device.

In a further embodiment, receiving location information from the fixed wireless device includes receiving location information from another fixed wireless device. In a further embodiment, the wireless device is a mobile computing device, and the fixed wireless device is a citizen band service device. In a further embodiment, the fixed wireless device is an eNodeB, small cell device, a femto cell device, or a beacon device that has GPS capabilities. In a further embodiment, the fixed wireless device is an eNodeB, small cell device, a femto cell device, or a beacon device that does not have GPS capabilities. In a further embodiment, the fixed wireless device includes a sensor hub, and determining the approximate location of the fixed wireless device includes determining the approximate location based on information received from the sensor hub.

In a further embodiment, the information received from sensor hub includes information collected from one or more of an accelerometer, a two-axis gyroscope, a three-axis compasses, altimeters, or barometers. In a further embodiment, the fixed wireless device includes a distributed antenna, and the distributed antenna includes one or more sensor hubs. In a further embodiment, the method may include determining whether new location information is available, computing a variance estimate value that considers an accuracy of the more precise location in response to determining that new location information is available, and extrapolating the more precise location and increasing a variance value that considers the age of the location in response to determining new location information is not available.

In a further embodiment, determining whether new location information is available includes determining whether new dead reckoning location information is available, whether new GPS location information is available, whether new network-provided location information is available, and whether new trilateration location information is available. In a further embodiment, the method may include determining via a processor of a fixed wireless device whether information obtained via a geospatial system of the fixed wireless device is accurate, collecting location information from a plurality of fixed wireless devices in a communication group in response to determining that the information obtained via the geospatial system of the fixed wireless device is not accurate, computing more precise location information for the fixed wireless device based on the location information collected from the plurality of fixed wireless devices, the more precise location information including three-dimensional location and position information, and using the computed more precise location information to provide the location based service.

Further embodiments include a fixed wireless device that includes a processor configured with processor-executable instructions to perform operations including determining an approximate location of the fixed wireless device, receiving location information from a wireless device, and determining a more precise location of the fixed wireless device based on the approximate location and the location information received from the wireless device. In an embodiment, the processor may be configured with processor-executable instructions to perform operations such that determining the more precise location of the fixed wireless device based on the approximate location and the location information received from the wireless device includes generating a longitude value, a latitude value, and an altitude value.

In a further embodiment, the processor may be configured with processor-executable instructions to perform operations such that determining the more precise location of the wireless device based on the approximate location and the location information received from the fixed wireless device includes generating location information for each of a plurality of individual antennas in a distributed antenna system of the fixed wireless device. In a further embodiment, the processor may be configured with processor-executable instructions to perform operations such that receiving location information from the fixed wireless device includes receiving location information from another fixed wireless device.

In a further embodiment, the processor may be configured with processor-executable instructions to perform operations such that receiving the location information from the wireless device includes receiving in a citizen band service device location information from a mobile computing device.

In a further embodiment, the processor may be configured with processor-executable instructions to perform operations such that receiving the location information from the wireless device includes receiving in an eNodeB, small cell device, a femto cell device, or a beacon device that has GPS capabilities from the wireless device. In a further embodiment, processor may be configured with processor-executable instructions to perform operations such that receiving the location information from the wireless device includes receiving the location information in an eNodeB, small cell device, a femto cell device, or a beacon device that does not have GPS capabilities from the wireless device.

In a further embodiment, including a sensor hub, in which the processor may be configured with processor-executable instructions to perform operations such that determining the approximate location of the fixed wireless device includes determining the approximate location based on information received from the sensor hub. In a further embodiment, the processor may be configured with processor-executable instructions to perform operations such that determining the approximate location based on information received from the sensor hub includes determining the approximate location based on information collected from one or more of an accelerometer, a two-axis gyroscope, a three-axis compasses, altimeters, or barometers. In a further embodiment, including a distributed antenna coupled to the processor, in which the distributed antenna includes one or more sensor hubs.

In a further embodiment, the processor may be configured with processor-executable instructions to perform operations further including determining whether new location information is available, computing a variance estimate value that considers an accuracy of the more precise location in response to determining that new location information is available, and extrapolating the more precise location and increasing a variance value that considers the age of the location in response to determining new location information is not available. In a further embodiment, the processor may be configured with processor-executable instructions to perform operations such that determining whether new location information is available includes determining whether new dead reckoning location information is available, whether new GPS location information is available, whether new network-provided location information is available, and whether new trilateration location information is available.

In a further embodiment, the processor may be configured with processor-executable instructions to perform operations further including determining whether information obtained via a geospatial system of the fixed wireless device is accurate, collecting location information from a plurality of fixed wireless devices in a communication group in response to determining that the information obtained via the geospatial system of the fixed wireless device is not accurate, computing more precise location information for the fixed wireless device based on the location information collected from the plurality of fixed wireless devices, the more precise location information including three-dimensional location and position information, and using the computed more precise location information to provide the location based service.

Further embodiments include a non-transitory computer readable storage medium having stored thereon processor-executable software instructions configured to cause a processor in a fixed wireless device to perform operations that may include determining an approximate location of the fixed wireless device, receiving location information from a wireless device, and determining a more precise location of the fixed wireless device based on the approximate location and the location information received from the wireless device. In an embodiment, the stored processor-executable instructions may be configured to cause a processor to perform operations such that determining the more precise location of the fixed wireless device based on the approximate location and the location information received from the wireless device includes generating a longitude value, a latitude value, and an altitude value.

In a further embodiment, the stored processor-executable instructions may be configured to cause a processor to perform operations such that determining the more precise location of the wireless device based on the approximate location and the location information received from the fixed wireless device includes generating location information for each of a plurality of individual antennas in a distributed antenna system of the fixed wireless device. In a further embodiment, the stored processor-executable instructions may be configured to cause a processor to perform operations such that receiving location information from the fixed wireless device includes receiving location information from another fixed wireless device.

In a further embodiment, the stored processor-executable instructions may be configured to cause a processor to perform operations such that receiving the location information from the wireless device includes receiving in a citizen band service device location information from a mobile computing device. In a further embodiment, the stored processor-executable instructions may be configured to cause a processor to perform operations such that receiving the location information from the wireless device includes receiving in an eNodeB, small cell device, a femto cell device, or a beacon device that has GPS capabilities from the wireless device. In a further embodiment, the stored processor-executable instructions may be configured to cause a processor to perform operations such that receiving the location information from the wireless device includes receiving the location information in an eNodeB, small cell device, a femto cell device, or a beacon device that does not have GPS capabilities from the wireless device.

In a further embodiment, the fixed wireless device includes a sensor hub, and the stored processor-executable instructions may be configured to cause a processor to perform operations such that determining the approximate location of the fixed wireless device includes determining the approximate location based on information received from the sensor hub. In a further embodiment, the stored processor-executable instructions may be configured to cause a processor to perform operations such that determining the approximate location based on information received from the sensor hub includes determining the approximate location based on information collected from one or more of an accelerometer, a two-axis gyroscope, a three-axis compasses, altimeters, or barometers.

In a further embodiment, the fixed wireless device includes a distributed antenna, the distributed antenna includes one or more sensor hubs, and the stored processor-executable instructions may be configured to cause a processor to perform operations such that determining the approximate location of the fixed wireless device includes determining the approximate location based on information received from the one or more sensor hubs. In a further embodiment, the stored processor-executable instructions may be configured to cause a processor to perform operations further including determining whether new location information is available, computing a variance estimate value that considers an accuracy of the more precise location in response to determining that new location information is available, and extrapolating the more precise location and increasing a variance value that considers the age of the location in response to determining new location information is not available.

In a further embodiment, the stored processor-executable instructions may be configured to cause a processor to perform operations such that determining whether new location information is available includes determining whether new dead reckoning location information is available, whether new GPS location information is available, whether new network-provided location information is available, and whether new trilateration location information is available. In a further embodiment, the stored processor-executable instructions may be configured to cause a processor to perform operations further including determining whether information obtained via a geospatial system of the fixed wireless device is accurate, collecting location information from a plurality of fixed wireless devices in a communication group in response to determining that the information obtained via the geospatial system of the fixed wireless device is not accurate, computing more precise location information for the fixed wireless device based on the location information collected from the plurality of fixed wireless devices, the more precise location information including three-dimensional location and position information, and using the computed more precise location information to provide the location based service.

The various embodiments also include methods of determining a location of a citizen band service device and providing a location based service that include determining, via a processor in the citizen band service device, an approximate location of the citizen band service device, forming, via the processor, a communication group with a wireless transceiver in proximity to the citizen band service device, sending the determined approximate location of the citizen band service device to the wireless transceiver, receiving, via the processor, location information from the wireless transceiver, and determining a more precise location of the citizen band service device based on the location information received from the wireless transceiver. In an embodiment, the method may include sending the determined more precise location to a spectrum access system component. In a further embodiment, the citizen band service device is a fixed infrastructure device.

In a further embodiment, the fixed infrastructure device is an eNodeB, micro cell, pico cell, small cell, beacon, access point or fixed wireless device. In a further embodiment, the method may include using the determined more precise location to provide a location based service. In a further embodiment, the method may include determining, via the processor, whether the citizen band service device is able to acquire satellite signals and navigation data from a geospatial system, and deter mining, via a processor, whether information obtained via the geospatial system is accurate in response to determining that citizen band service device is able to acquire satellite signals and navigation data from a geospatial system, in which forming the communication group with the wireless transceiver in proximity to the citizen band service device includes forming the communication group in response to determining that the citizen band service device is not able to acquire satellite signals or navigation data from the geospatial system, or determining that the information obtained via the geospatial system is not accurate.

In a further embodiment, the method may include collecting additional location information from a plurality of other devices in the communication group, in which determining the more precise location of the citizen band service device based on the location information received from the wireless transceiver includes determining the more precise location of the citizen band service device based on a combination of the location information received from the wireless transceiver and the additional location information received from the plurality of other devices. In a further embodiment, receiving location information from the wireless transceiver includes receiving a latitude coordinate, a longitude coordinate, and an altitude coordinate, and determining the more precise location of the citizen band service device based on the location information received from the wireless transceiver includes generating a latitude value, a longitude value, and an altitude value for the citizen band service device. In a further embodiment, receiving the location information from the wireless transceiver includes receiving the location information from one or more external devices, the received location information includes a waypoint from each of the one or more external devices, each waypoint includes a coordinate value, an altitude value and a range value, and each range value identifies a distance between one of the external devices and the citizen band service device.

In a further embodiment, the method may include determining the validity of each of the received waypoints, performing normalization operations to normalize the received valid waypoints, assigning an overall ranking to each of the normalized waypoints, assigning a device-specific ranking to each of the normalized waypoints, and storing the normalized waypoints in memory, and selecting four waypoints from memory based on a combination of the overall ranking and the device-specific ranking associated with each waypoint, in which determining the more precise location of the citizen band service device based on the location information received from the wireless transceiver includes applying the four selected waypoints to a kalman filter to generate a final location waypoint. In a further embodiment, receiving the location information from the wireless transceiver includes receiving a plurality of inputs from a plurality of devices, the received plurality of inputs including two or more of a global position system (GPS) data input, a network provided location based service (LBS) data input, a mobile device LBS data input, a dead reckoning data input collected during an initial positioning of the FIN, and an external device data input, and determining the more precise location of the citizen band service device based on the location information received from the wireless transceiver includes using the received plurality of inputs to generate an initial positional fix, setting a current waypoint based the generated initial positional fix, using the received plurality of inputs to generate updated location information, and updating the current waypoint based on the generated updated location information.

Further embodiments include a citizen band service device, including a processor configured with processor-executable instructions to perform operations including determining an approximate location of the citizen band service device, forming a communication group with a wireless transceiver in proximity to the citizen band service device, sending the determined approximate location of the citizen band service device to the wireless transceiver, receiving location information from the wireless transceiver, and determining a more precise location of the citizen band service device based on the location information received from the wireless transceiver. In an embodiment, the processor may be configured with processor-executable instructions to perform operations further including sending the determined more precise location to a spectrum access system component.

In a further embodiment, the processor may be configured with processor-executable instructions to perform operations such that determining the approximate location of the citizen band service device includes determining the approximate location of a fixed infrastructure device. In a further embodiment, the processor may be configured with processor-executable instructions to perform operations such that determining the approximate location of the fixed infrastructure device includes determining the approximate location of an eNodeB, micro cell, pico cell, small cell, beacon, access point or fixed wireless device. In a further embodiment, the processor may be configured with processor-executable instructions to perform operations further including using the determined more precise location to provide the enhanced location based service.

In a further embodiment, the processor may be configured with processor-executable instructions to perform operations further including determining whether the citizen band service device is able to acquire satellite signals and navigation data from a geospatial system, and determining whether information obtained via the geospatial system is accurate in response to determining that citizen band service device is able to acquire satellite signals and navigation data from a geospatial system, in which forming the communication group with the wireless transceiver in proximity to the citizen band service device includes forming the communication group in response to determining that the citizen band service device is not able to acquire satellite signals or navigation data from the geospatial system, or determining that the information obtained via the geospatial system is not accurate.

In a further embodiment, the processor may be configured with processor-executable instructions to perform operations further including collecting additional location information from a plurality of other devices in the communication group, in which determining the more precise location of the citizen band service device based on the location information received from the wireless transceiver includes determining the more precise location of the citizen band service device based on a combination of the location information received from the wireless transceiver and the additional location information received from the plurality of other devices. In a further embodiment, the processor may be configured with processor-executable instructions to perform operations such that receiving location information from the wireless transceiver includes receiving a latitude coordinate, a longitude coordinate, and an altitude coordinate, and determining the more precise location of the citizen band service device based on the location information received from the wireless transceiver includes generating a latitude value, a longitude value, and an altitude value for the citizen band service device.

In a further embodiment, the processor may be configured with processor-executable instructions to perform operations such that receiving the location information from the wireless transceiver includes receiving the location information from one or more external devices, the received location information includes a waypoint from each of the one or more external devices, each waypoint includes a coordinate value, an altitude value and a range value, and each range value identifies a distance between one of the external devices and the citizen band service device. In a further embodiment, the processor may be configured with processor-executable instructions to perform operations further including determining the validity of each of the received waypoints, performing normalization operations to normalize the received valid waypoints, assigning an overall ranking to each of the normalized waypoints, assigning a device-specific ranking to each of the normalized waypoints, and storing the normalized waypoints in memory, and selecting four waypoints from memory based on a combination of the overall ranking and the device-specific ranking associated with each waypoint, in which determining the more precise location of the citizen band service device based on the location information received from the wireless transceiver includes applying the four selected waypoints to a kalman filter to generate a final location waypoint.

In a further embodiment, the processor may be configured with processor-executable instructions to perform operations such that receiving the location information from the wireless transceiver includes receiving a plurality of inputs from a plurality of devices, the received plurality of inputs including two or more of a global position system (GPS) data input, a network provided location based service (LBS) data input, a mobile device LBS data input, a dead reckoning data input collected during an initial positioning of the FIN, and an external device data input, and determining the more precise location of the citizen band service device based on the location information received from the wireless transceiver includes using the received plurality of inputs to generate an initial positional fix, setting a current waypoint based the generated initial positional fix, using the received plurality of inputs to generate updated location information, and updating the current waypoint based on the generated updated location information.

Further embodiments include a non-transitory computer readable storage medium having stored thereon processor-executable software instructions configured to cause a processor in the citizen band service device to perform operations that may include determining an approximate location of the citizen band service device, forming a communication group with a wireless transceiver in proximity to the citizen band service device, sending the determined approximate location of the citizen band service device to the wireless transceiver, receiving location information from the wireless transceiver, and determining a more precise location of the citizen band service device based on the location information received from the wireless transceiver. In an embodiment, the stored processor-executable instructions may be configured to cause a processor to perform operations further including sending the determined more precise location to a spectrum access system component. In a further embodiment, the stored processor-executable instructions may be configured to cause a processor to perform operations such that determining the approximate location of the citizen band service device includes determining the approximate location of a fixed infrastructure device.

In a further embodiment, the stored processor-executable instructions may be configured to cause a processor to perform operations such that determining the approximate location of a fixed infrastructure device includes determining the approximate location of an eNodeB, micro cell, pico cell, small cell, beacon, access point or fixed wireless device. In a further embodiment, the stored processor-executable instructions may be configured to cause a processor to perform operations further including using the determined more precise location to provide a location based service. In a further embodiment, the stored processor-executable instructions may be configured to cause a processor to perform operations further including determining whether the citizen band service device is able to acquire satellite signals and navigation data from a geospatial system, and determining whether information obtained via the geospatial system is accurate in response to determining that citizen band service device is able to acquire satellite signals and navigation data from a geospatial system, in which forming the communication group with the wireless transceiver in proximity to the citizen band service device includes forming the communication group in response to determining that the citizen band service device is not able to acquire satellite signals or navigation data from the geospatial system, or determining that the information obtained via the geospatial system is not accurate.

In a further embodiment, the stored processor-executable instructions may be configured to cause a processor to perform operations further including collecting additional location information from a plurality of other devices in the communication group, in which determining the more precise location of the citizen band service device based on the location information received from the wireless transceiver includes determining the more precise location of the citizen band service device based on a combination of the location information received from the wireless transceiver and the additional location information received from the plurality of other devices. In a further embodiment, the stored processor-executable instructions may be configured to cause a processor to perform operations such that receiving location information from the wireless transceiver includes receiving a latitude coordinate, a longitude coordinate, and an altitude coordinate, and determining the more precise location of the citizen band service device based on the location information received from the wireless transceiver includes generating a latitude value, a longitude value, and an altitude value for the citizen band service device.

In a further embodiment, the stored processor-executable instructions may be configured to cause a processor to perform operations such that receiving the location information from the wireless transceiver includes receiving the location information from one or more external devices, the received location information includes a waypoint from each of the one or more external devices, each waypoint includes a coordinate value, an altitude value and a range value, and each range value identifies a distance between one of the external devices and the citizen band service device. In a further embodiment, the stored processor-executable instructions may be configured to cause a processor to perform operations further including determining the validity of each of the received waypoints, performing normalization operations to normalize the received valid waypoints, assigning an overall ranking to each of the normalized waypoints, assigning a device-specific ranking to each of the normalized waypoints, and storing the normalized waypoints in memory, and selecting four waypoints from memory based on a combination of the overall ranking and the device-specific ranking associated with each waypoint, in which determining the more precise location of the citizen band service device based on the location information received from the wireless transceiver includes applying the four selected waypoints to a kalman filter to generate a final location waypoint.

In a further embodiment, the stored processor-executable instructions may be configured to cause a processor to perform operations such that receiving the location information from the wireless transceiver includes receiving a plurality of inputs from a plurality of devices, the received plurality of inputs including two or more of a global position system (GPS) data input, a network provided location based service (LBS) data input, a mobile device LBS data input, a dead reckoning data input collected during an initial positioning of the FIN, and an external device data input, and determining the more precise location of the citizen band service device based on the location information received from the wireless transceiver includes using the received plurality of inputs to generate an initial positional fix, setting a current waypoint based the generated initial positional fix, using the received plurality of inputs to generate updated location information, and updating the current waypoint based on the generated updated location information.

The foregoing method descriptions and the process flow diagrams are provided merely as illustrative examples and are not intended to require or imply that the blocks of the various embodiments may be performed in the order presented. As may be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, components, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments may be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A method of providing an enhanced location based service (eLBS), comprising:
   determining, via a processor in a fixed wireless device, an approximate location of the fixed wireless device;
   receiving, via the processor, location information from a wireless device;
   determining a more precise location of the fixed wireless device based on the approximate location and the location information received from the wireless device;
   determining whether new location information is available;
   computing a variance estimate value that considers an accuracy of the more precise location in response to determining that new location information is available; and
   extrapolating the more precise location and increasing a variance value that considers the age of the more precise location in response to determining new location information is not available.

2. The method of claim 1, wherein determining the more precise location of the fixed wireless device based on the approximate location and the location information received from the wireless device comprises generating a longitude value, a latitude value, and an altitude value.

3. The method of claim 2, wherein determining the more precise location of the wireless device based on the approximate location and the location information received from the fixed wireless device comprises generating location information for each of a plurality of individual antennas in a distributed antenna system of the fixed wireless device.

4. The method of claim 1, wherein receiving location information from the fixed wireless device comprises receiving location information from another fixed wireless device.

5. The method of claim 1, wherein:
   the wireless device is a mobile computing device; and
   the fixed wireless device is a citizen band service device.

6. The method of claim 1, wherein the fixed wireless device is an eNodeB, small cell device, a femto cell device, or a beacon device that has GPS capabilities.

7. The method of claim 1, wherein the fixed wireless device is an eNodeB, small cell device, a femto cell device, or a beacon device that does not have GPS capabilities.

8. The method of claim 1, wherein:
   the fixed wireless device includes a sensor hub; and
   determining the approximate location of the fixed wireless device comprises determining the approximate location based on information received from the sensor hub.

9. The method of claim 8, wherein the information received from the sensor hub includes information collected from one or more of:
   an accelerometer;
   a two-axis gyroscope;
   a three-axis compasses;
   altimeters; or
   barometers.

10. The method of claim 1, wherein:
    the fixed wireless device includes a distributed antenna; and
    the distributed antenna includes one or more sensor hubs.

11. The method of claim 1, wherein determining the approximate location of the fixed wireless device comprises determining the approximate location of citizen band service device (CBSD).

12. The method of claim 1, wherein determining whether new location information is available comprises determining:
    whether new dead reckoning location information is available;
    whether new GPS location information is available;
    whether new network-provided location information is available; and
    whether new trilateration location information is available.

13. The method of claim 1, further comprising:
    determining, via the processor of the fixed wireless device, whether information obtained via a geospatial system of the fixed wireless device is accurate; and
    collecting location information from a plurality of fixed wireless devices in a communication group in response to determining that the information obtained via the geospatial system of the fixed wireless device is not accurate.

14. A fixed wireless device, comprising:
a processor configured with processor-executable instructions to perform operations comprising:
determining an approximate location of the fixed wireless device;
receiving location information from a wireless device;
determining a more precise location of the fixed wireless device based on the approximate location and the location information received from the wireless device;
determining whether new location information is available;
computing a variance estimate value that considers an accuracy of the more precise location in response to determining that new location information is available; and
extrapolating the more precise location and increasing a variance value that considers the age of the more precise location in response to determining new location information is not available.

15. The fixed wireless device of claim 14, wherein the processor is configured with processor-executable instructions to perform operations such that determining the more precise location of the fixed wireless device based on the approximate location and the location information received from the wireless device comprises generating a longitude value, a latitude value, and an altitude value.

16. The fixed wireless device of claim 15, wherein the processor is configured with processor-executable instructions to perform operations such that determining the more precise location of the wireless device based on the approximate location and the location information received from the fixed wireless device comprises generating location information for each of a plurality of individual antennas in a distributed antenna system of the fixed wireless device.

17. The fixed wireless device of claim 14, wherein the processor is configured with processor-executable instructions to perform operations such that receiving location information from the fixed wireless device comprises receiving location information from another fixed wireless device.

18. The fixed wireless device of claim 14, wherein the processor is configured with processor-executable instructions to perform operations such that receiving the location information from the wireless device comprises receiving in a citizen band service device location information from a mobile computing device.

19. The fixed wireless device of claim 14, wherein the processor is configured with processor-executable instructions to perform operations such that receiving the location information from the wireless device comprises receiving in an eNodeB, small cell device, a femto cell device, or a beacon device that has GPS capabilities from the wireless device.

20. The fixed wireless device of claim 14, wherein the processor is configured with processor-executable instructions to perform operations such that receiving the location information from the wireless device comprises receiving the location information in an eNodeB, small cell device, a femto cell device, or a beacon device that does not have GPS capabilities from the wireless device.

21. The fixed wireless device of claim 14, further comprising a sensor hub, wherein the processor is configured with processor-executable instructions to perform operations such that determining the approximate location of the fixed wireless device comprises determining the approximate location based on information received from the sensor hub.

22. The fixed wireless device of claim 21, wherein the processor is configured with processor-executable instructions to perform operations such that determining the approximate location based on information received from the sensor hub comprises determining the approximate location based on information collected from one or more of:
an accelerometer;
a two-axis gyroscope;
a three-axis compasses;
altimeters; or
barometers.

23. The fixed wireless device of claim 14, further comprising a distributed antenna coupled to the processor, wherein the distributed antenna includes one or more sensor hubs.

24. The fixed wireless device of claim 14, wherein the processor is configured with processor-executable instructions to perform operations such that determining the approximate location of the fixed wireless device comprises determining the approximate location of citizen band service device (CBSD).

25. The fixed wireless device of claim 14, wherein the processor is configured with processor-executable instructions to perform operations such that determining whether new location information is available comprises determining:
whether new dead reckoning location information is available;
whether new GPS location information is available;
whether new network-provided location information is available; and
whether new trilateration location information is available.

26. The fixed wireless device of claim 14, wherein the processor is configured with processor-executable instructions to perform operations further comprising:
determining whether information obtained via a geospatial system of the fixed wireless device is accurate; and
collecting location information from a plurality of fixed wireless devices in a communication group in response to determining that the information obtained via the geospatial system of the fixed wireless device is not accurate.

27. A non-transitory computer readable storage medium having stored thereon processor-executable software instructions configured to cause a processor in a fixed wireless device to perform operations comprising:
determining an approximate location of the fixed wireless device;
receiving location information from a wireless device;
determining a more precise location of the fixed wireless device based on the approximate location and the location information received from the wireless device
determining whether new location information is available;
computing a variance estimate value that considers an accuracy of the more precise location in response to determining that new location information is available; and
extrapolating the more precise location and increasing a variance value that considers the age of the more precise location in response to determining new location information is not available.

28. The non-transitory computer readable storage medium of claim 27, wherein the stored processor-executable instructions are configured to cause a processor to perform operations such that determining the more precise location of the fixed wireless device based on the approximate location and the location information received from the wireless device comprises generating a longitude value, a latitude value, and an altitude value.

29. The non-transitory computer readable storage medium of claim 28, wherein the stored processor-executable instructions are configured to cause a processor to perform operations such that determining the more precise location of the wireless device based on the approximate location and the location information received from the fixed wireless device comprises generating location information for each of a plurality of individual antennas in a distributed antenna system of the fixed wireless device.

30. The non-transitory computer readable storage medium of claim 27, wherein the stored processor-executable instructions are configured to cause a processor to perform operations such that receiving location information from the fixed wireless device comprises receiving location information from another fixed wireless device.

31. The non-transitory computer readable storage medium of claim 27, wherein the stored processor-executable instructions are configured to cause a processor to perform operations such that receiving the location information from the wireless device comprises receiving in a citizen band service device location information from a mobile computing device.

32. The non-transitory computer readable storage medium of claim 27, wherein the stored processor-executable instructions are configured to cause a processor to perform operations such that receiving the location information from the wireless device comprises receiving in an eNodeB, small cell device, a femto cell device, or a beacon device that has GPS capabilities from the wireless device.

33. The non-transitory computer readable storage medium of claim 27, wherein the stored processor-executable instructions are configured to cause a processor to perform operations such that receiving the location information from the wireless device comprises receiving the location information in an eNodeB, small cell device, a femto cell device, or a beacon device that does not have GPS capabilities from the wireless device.

34. The non-transitory computer readable storage medium of claim 27, wherein:
the fixed wireless device includes a sensor hub; and
the stored processor-executable instructions are configured to cause a processor to perform operations such that determining the approximate location of the fixed wireless device comprises determining the approximate location based on information received from the sensor hub.

35. The non-transitory computer readable storage medium of claim 34, wherein the stored processor-executable instructions are configured to cause a processor to perform operations such that determining the approximate location based on information received from the sensor hub comprises determining the approximate location based on information collected from one or more of:
an accelerometer;
a two-axis gyroscope;
a three-axis compasses;
altimeters; or
barometers.

36. The non-transitory computer readable storage medium of claim 27, wherein:
the fixed wireless device includes a distributed antenna;
the distributed antenna includes one or more sensor hubs; and
the stored processor-executable instructions are configured to cause a processor to perform operations such that determining the approximate location of the fixed wireless device comprises determining the approximate location based on information received from the one or more sensor hubs.

37. The non-transitory computer readable storage medium of claim 27, wherein the stored processor-executable instructions are configured to cause a processor to perform operations such that determining the approximate location of the fixed wireless device comprises determining the approximate location of citizen band service device (CBSD).

38. The non-transitory computer readable storage medium of claim 27, wherein the stored processor-executable instructions are configured to cause a processor to perform operations such that determining whether new location information is available comprises determining:
whether new dead reckoning location information is available;
whether new GPS location information is available;
whether new network-provided location information is available; and
whether new trilateration location information is available.

39. The non-transitory computer readable storage medium of claim 27, wherein the stored processor-executable instructions are configured to cause a processor to perform operations further comprising:
determining whether information obtained via a geospatial system of the fixed wireless device is accurate; and
collecting location information from a plurality of fixed wireless devices in a communication group in response to determining that the information obtained via the geospatial system of the fixed wireless device is not accurate.

* * * * *